United States Patent

Nakao et al.

Patent Number: 6,141,443
Date of Patent: Oct. 31, 2000

[54] CHARACTER EXTRACTION APPARATUS, DICTIONARY PRODUCTION APPARATUS, AND CHARACTER RECOGNITION APPARATUS USING BOTH APPARATUSES

[75] Inventors: Ichiro Nakao, Amagasaki; Mariko Takenouchi, Neyagawa; Saki Takakura, Higashi-Osaka; Satoshi Emura, Toyonaka, all of Japan

[73] Assignee: Matsushita Electric Industrial Co., Ltd., Osaka-fu, Japan

[21] Appl. No.: 09/187,131

[22] Filed: Nov. 5, 1998

Related U.S. Application Data

[62] Division of application No. 08/608,179, Feb. 28, 1996, Pat. No. 5,999,647.

[30] Foreign Application Priority Data

Apr. 21, 1995 [JP] Japan .................................... 7-096671
Apr. 25, 1995 [JP] Japan .................................... 7-099350
Apr. 28, 1995 [JP] Japan .................................... 7-106625

[51] Int. Cl.[7] .................................................. G06K 9/34
[52] U.S. Cl. ........................... 382/174; 382/209; 382/225
[58] Field of Search .................................... 382/224–229, 382/181, 187, 190, 195, 193, 197, 177, 171, 174, 209, 218

[56] References Cited

U.S. PATENT DOCUMENTS

| | | | |
|---|---|---|---|
| 4,103,287 | 7/1978 | Frank | 382/246 |
| 4,107,648 | 8/1978 | Frank | 382/246 |
| 5,034,991 | 7/1991 | Hagimae et al. | 382/209 |
| 5,093,868 | 3/1992 | Tanaka et al. | 382/177 |
| 5,384,864 | 1/1995 | Spitz | 382/174 |
| 5,410,611 | 4/1995 | Huttenlocher et al. | 382/177 |
| 5,572,604 | 11/1996 | Simard | 382/224 |
| 5,640,466 | 6/1997 | Huttenlocher et al. | 382/177 |
| 5,841,902 | 11/1998 | Tu | 382/187 |
| 5,909,508 | 6/1999 | Wakatani et al. | 382/225 |

FOREIGN PATENT DOCUMENTS

| | | | |
|---|---|---|---|
| 3-226198 | 10/1991 | Japan | H04N 13/04 |
| 3-260886 | 11/1991 | Japan | G06K 9/62 |
| 488591 | 3/1992 | Japan | G06K 9/68 |
| 4-111189 | 4/1992 | Japan | G06K 9/62 |
| 4-111190 | 4/1992 | Japan | G06K 9/68 |

*Primary Examiner*—Leo H. Boudreau
*Assistant Examiner*—Ishrat Sherali
*Attorney, Agent, or Firm*—Price and Gess

[57] ABSTRACT

A character extraction apparatus is provided for extracting character data for each character from a text image which is represented by first pixels corresponding to character images and second pixels corresponding to background images. The character extraction apparatus comprises a character row detecting means for detecting character rows from the text image and obtaining position data of each character row; a pixel array extracting means for extracting arrays of continuous first pixels in an area specified by the character row position data and computing position data of each of the arrays of continuous first pixels; a character array linking means for linking the arrays of continuous first pixels in the area based on the position data of the arrays of continuous first pixels; and a character extracting means for recognizing each set of arrays of continuous first pixels linked by the character array linking means as a character and outputting character data.

25 Claims, 56 Drawing Sheets

| array | Sx | Sy | Ex | Ey | black pixel area |
|---|---|---|---|---|---|
| R1 | 7 | 7 | 8 | 8 | |
| R2 | 7 | 11 | 8 | 22 | |
| R3 | 14 | 3 | 21 | 22 | |

501 502 503 504 505 506

| scanning line number | s | e |
|---|---|---|
| 7 | 7 | 8 |
| 8 | 7 | 8 |

507 508 509

| scanning line number | s | e |
|---|---|---|
| 11 | 7 | 8 |
| 12 | 7 | 8 |
| ⋮ | ⋮ | ⋮ |
| 21 | 7 | 8 |
| 22 | 7 | 8 |

| scanning line number | s | e |
|---|---|---|
| 3 | 18 | 20 |
| 4 | 17 | 21 |
| 5 | 16 | 21 |
| 6 | 16 | 17 |
| ⋮ | ⋮ | ⋮ |
| 21 | 16 | 17 |
| 22 | 16 | 17 |

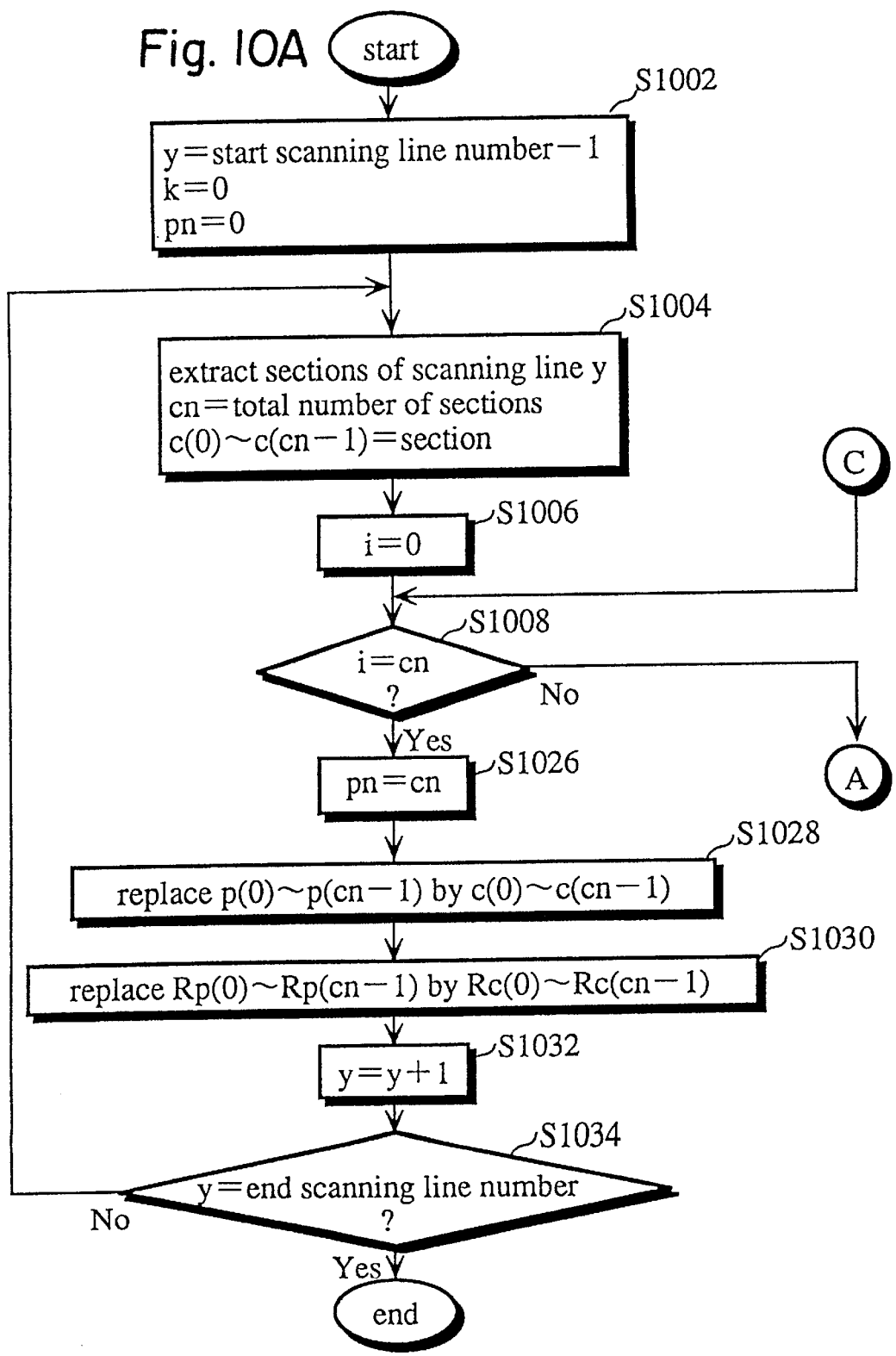

| (1,1) | (2,1) | (3,1) | (4,1) |
|---|---|---|---|
| (1,2) | (2,2) | (3,2) | (4,2) |
| (1,3) | (2,3) | (3,3) | (4,3) |
| (1,4) | (2,4) | (3,4) | (4,4) |

| | | | |
|---|---|---|---|
| 21 | 10 | 16 | 10 |
| 64 | 0 | 0 | 0 |
| 64 | 0 | 0 | 0 |
| 40 | 24 | 8 | 16 |
| 10 | 0 | 24 | 10 |
| 32 | 0 | 0 | 0 |
| 32 | 0 | 0 | 0 |
| 16 | 16 | 18 | 8 |
| 0 | 0 | 32 | 0 |
| 0 | 0 | 0 | 0 |
| 0 | 0 | 0 | 0 |
| 0 | 16 | 22 | 8 |
| 10 | 21 | 23 | 10 |
| 32 | 0 | 0 | 0 |
| 32 | 0 | 0 | 0 |
| 16 | 0 | 26 | 16 |
| 0 | 0 | 0 | 2 |
| 12 | 6 | 0 | 2 |
| 1 | 0 | 0 | 2 |
| 9 | 3 | 0 | 3 |
| 3 | 2 | 2 | 2 |
| 32 | 32 | 32 | 32 |
| 21 | 32 | 32 | 28 |
| 32 | 32 | 32 | 32 |

Fig. 25 o"236F"
15

| | | | |
|---|---|---|---|
| 4 | 0 | 7 | 16 |
| 27 | 0 | 0 | 13 |
| 41 | 9 | 0 | 0 |
| 7 | 17 | 7 | 0 |
| 0 | 0 | 24 | 8 |
| 0 | 0 | 20 | 13 |
| 0 | 9 | 24 | 0 |
| 3 | 20 | 28 | 8 |
| 20 | 13 | 32 | 4 |
| 22 | 4 | 18 | 0 |
| 0 | 0 | 27 | 4 |
| 0 | 9 | 41 | 18 |
| 4 | 20 | 7 | 0 |
| 27 | 18 | 0 | 0 |
| 41 | 0 | 0 | 13 |
| 7 | 0 | 10 | 17 |
| 18 | 1 | 2 | 19 |
| 19 | 2 | 2 | 17 |
| 17 | 1 | 1 | 17 |
| 18 | 2 | 1 | 17 |
| 30 | 32 | 32 | 24 |
| 29 | 24 | 18 | 30 |
| 24 | 27 | 32 | 28 |
| 30 | 32 | 28 | 30 |

Fig. 26

"character code"
width-height ratio
(1,1) direction density: direction value 1,2,3,4
(2,1) direction density: direction value 1,2,3,4
(3,1) direction density: direction value 1,2,3,4
(4,1) direction density: direction value 1,2,3,4
(1,2) direction density: direction value 1,2,3,4
(2,2) direction density: direction value 1,2,3,4
(3,2) direction density: direction value 1,2,3,4
(4,2) direction density: direction value 1,2,3,4
(1,3) direction density: direction value 1,2,3,4
(2,3) direction density: direction value 1,2,3,4
(3,3) direction density: direction value 1,2,3,4
(4,3) direction density: direction value 1,2,3,4
(1,4) direction density: direction value 1,2,3,4
(2,4) direction density: direction value 1,2,3,4
(3,4) direction density: direction value 1,2,3,4
(4,4) direction density: direction value 1,2,3,4
downward scanning: background value=1
(1,1)area, (2,1) area, (3,1) area, (4,1) area
scanning to the left: background value=1
(4,1)area, (4,2) area, (4,3) area, (4,4) area
upward scanning: background value=1
(1,4)area, (2,4) area, (3,4) area, (4,4) area
scanning to the right: background value=1
(1,1)area, (1,2) area, (1,3) area, (1,4) area
downward scanning: background value=2
(1,2)area, (2,2) area, (3,2) area, (4,2) area
scanning to the left: background value=2
(3,1)area, (3,2) area, (3,3) area, (3,4) area
upward scanning: background value=2
(1,3)area, (2,3) area, (3,3) area, (4,3) area
scanning to the right: background value=2
(2,1)area, (2,2) area, (2,3) area, (2,4) area

Fig. 28

| number of clusters (N) | data of cluster 1 | additive information | character code | attribute flag | average feature of cluster 1 |
|---|---|---|---|---|---|
| | data of cluster 2 | additive information | character code | attribute flag | average feature of cluster 2 |
| | ... | ... | ... | ... | ... |
| | data of cluster N | additive information | character code | attribute flag | average feature of cluster N |

Fig. 29

| | | | | | |
|---|---|---|---|---|---|
| 2901 | cluster No. | | | | 149 |
| 2902 | indentifier | | | | b-1 |
| 2903 | character code | | | | 2362 |
| 2904 | character type shape position | | | | English small letter vertically long/general general |

2905:

| | | | |
|---|---|---|---|
| 18 | | | |
| 1 | 27 | 7 | 19 |
| 11 | 21 | 1 | 23 |
| 2 | 2 | 4 | 8 |
| 7 | 0 | 0 | 0 |
| 0 | 31 | 1 | 1 |
| 0 | 7 | 8 | 11 |
| 11 | 11 | 4 | 1 |
| 15 | 19 | 0 | 0 |
| 1 | 30 | 1 | 1 |
| 3 | 24 | 2 | 2 |
| 2 | 29 | 3 | 0 |
| 1 | 29 | 2 | 18 |
| 6 | 25 | 2 | 20 |
| 11 | 3 | 6 | 33 |
| 9 | 7 | 11 | 8 |
| 0 | 14 | 21 | 2 |
| 9 | 26 | 30 | 30 |
| 5 | 0 | 11 | 4 |
| 4 | 1 | 11 | 2 |
| 2 | 1 | 4 | 30 |
| 31 | 32 | 27 | 32 |
| 31 | 32 | 31 | 31 |
| 32 | 32 | 31 | 32 |
| 32 | 32 | 31 | 31 |

Fig. 30

| | | | |
|---|---|---|---|
| cluster No. | | | 150 |
| indentifier | | | b-2 |
| character code | | | 2362 |
| character type | | | English small letter |
| shape | | | vertically long/general |
| position | | | general |
| 23 | | | |
| 9 | 22 | 6 | 11 |
| 4 | 27 | 3 | 0 |
| 0 | 0 | 0 | 0 |
| 0 | 0 | 0 | 0 |
| 2 | 31 | 1 | 10 |
| 6 | 12 | 16 | 41 |
| 12 | 4 | 7 | 6 |
| 25 | 8 | 0 | 0 |
| 1 | 30 | 2 | 0 |
| 2 | 28 | 3 | 0 |
| 1 | 10 | 0 | 0 |
| 7 | 42 | 5 | 18 |
| 1 | 25 | 6 | 22 |
| 22 | 9 | 5 | 40 |
| 7 | 5 | 15 | 5 |
| 0 | 12 | 29 | 3 |
| 17 | 32 | 32 | 32 |
| 16 | 1 | 17 | 9 |
| 6 | 1 | 17 | 11 |
| 13 | 13 | 11 | 30 |
| 26 | 28 | 19 | 32 |
| 31 | 32 | 30 | 32 |
| 31 | 32 | 30 | 32 |
| 31 | 32 | 29 | 29 |

Fig. 31

| | | | |
|---|---|---|---|
| cluster No. | | | 151 |
| indentifier | | | b-3 |
| character code | | | 2362 |
| character type | | | English small letter |
| shape | | | vertically long/general |
| position | | | general |
| 17 | | | |
| 4 | 29 | 4 | 15 |
| 6 | 23 | 6 | 29 |
| 4 | 0 | 1 | 4 |
| 4 | 0 | 0 | 0 |
| 1 | 31 | 2 | 6 |
| 2 | 10 | 21 | 17 |
| 10 | 1 | 2 | 2 |
| 30 | 26 | 0 | 0 |
| 2 | 32 | 2 | 0 |
| 4 | 26 | 1 | 0 |
| 0 | 1 | 0 | 0 |
| 2 | 55 | 9 | 13 |
| 4 | 27 | 3 | 21 |
| 26 | 4 | 6 | 46 |
| 4 | 2 | 15 | 5 |
| 0 | 11 | 29 | 3 |
| 22 | 26 | 31 | 31 |
| 7 | 1 | 17 | 7 |
| 5 | 1 | 17 | 4 |
| 4 | 4 | 7 | 31 |
| 32 | 32 | 26 | 31 |
| 32 | 32 | 30 | 31 |
| 32 | 32 | 31 | 30 |
| 32 | 32 | 27 | 27 |

Fig. 32

| | |
|---|---|
| cluster No. | 170 |
| indentifier | h-1 |
| character code | 2368 |
| character type | English small letter |
| shape | vertically long/general |
| position | general |

| | | | |
|---|---|---|---|
| 17 | | | |
| 1 | 27 | 7 | 18 |
| 7 | 24 | 2 | 20 |
| 2 | 1 | 3 | 5 |
| 5 | 0 | 0 | 0 |
| 1 | 31 | 1 | 4 |
| 2 | 7 | 12 | 16 |
| 11 | 8 | 4 | 2 |
| 19 | 19 | 0 | 0 |
| 2 | 30 | 2 | 0 |
| 0 | 27 | 2 | 0 |
| 2 | 30 | 1 | 0 |
| 6 | 28 | 1 | 12 |
| 1 | 26 | 5 | 3 |
| 3 | 29 | 0 | 24 |
| 2 | 28 | 6 | 2 |
| 14 | 27 | 30 | 30 |
| 6 | 0 | 2 | 1 |
| 15 | 23 | 2 | 2 |
| 1 | 1 | 2 | 31 |
| 31 | 32 | 26 | 31 |
| 32 | 32 | 32 | 31 |
| 31 | 31 | 31 | 31 |
| 32 | 32 | 32 | 32 |

Fig. 33

| Cluster No. | 171 |
|---|---|
| Identifier | h-2 |
| Character code | 2368 |
| Character type | English small letter |
| Shape | vertically long/general |
| Position | general |

25

| | | | |
|---|---|---|---|
| 10 | 22 | 6 | 14 |
| 4 | 27 | 2 | 6 |
| 0 | 0 | 1 | 1 |
| 1 | 0 | 0 | 0 |
| 1 | 30 | 1 | 5 |
| 6 | 11 | 16 | 32 |
| 11 | 7 | 10 | 4 |
| 13 | 15 | 0 | 0 |
| 0 | 31 | 1 | 0 |
| 0 | 31 | 2 | 0 |
| 0 | 28 | 0 | 0 |
| 1 | 34 | 1 | 29 |
| 1 | 21 | 10 | 35 |
| 11 | 16 | 1 | 17 |
| 2 | 26 | 8 | 35 |
| 9 | 23 | 2 | 4 |
| 15 | 31 | 32 | 32 |
| 19 | 13 | 8 | 2 |
| 1 | 14 | 1 | 14 |
| 16 | 16 | 10 | 29 |
| 27 | 28 | 26 | 32 |
| 31 | 32 | 31 | 32 |
| 31 | 32 | 32 | 32 |
| 31 | 32 | 32 | 32 |

Fig. 34

| | |
|---|---|
| Cluster No. | 172 |
| Identifier | h-3 |
| Character code | 2368 |
| Character type | English small letter |
| Shape | vertically long/general |
| Position | general |

| | |
|---|---|
| cluster No. | 150(b-2) |
| cluster No. | 171(h-2) |
| number of used features | 4 |
| used feature | 5 52 2 26 |

Fig. 37

```
cluster[27] (0-1)   width-height ratio : minimum: 15, maximum value: 24
cluster[28] (0-2)   width-height ratio : minimum: 13, maximum value: 38
cluster[29] (0-3)   width-height ratio : minimum: 14, maximum value: 36
cluster[30] (1-1)   width-height ratio : minimum: 22, maximum value: 81
cluster[31] (1-2)   width-height ratio : minimum: 26, maximum value: 67
cluster[32] (1-3)   width-height ratio : minimum: 20, maximum value: 37
cluster[33] (2-1)   width-height ratio : minimum: 13, maximum value: 25
cluster[34] (2-2)   width-height ratio : minimum: 16, maximum value: 28
cluster[35] (2-3)   width-height ratio : minimum: 20, maximum value: 40
```

| character No. | | 1st | 2nd | 3rd | 4th | 5th |
|---|---|---|---|---|---|---|
| 1 | cluster No.<br>similarity<br>character | 117<br>21<br>R | 110<br>17<br>P | 82<br>17<br>F | 200<br>15<br>p | 196<br>14<br>n |
| 2 | cluster No.<br>similarity<br>character | 173<br>19<br>i | 89<br>15<br>I | 188<br>12<br>l | 32<br>12<br>l | 183<br>12<br>j |
| 3 | cluster No.<br>similarity<br>character | 150<br>15<br>b | 171<br>14<br>h | 185<br>14<br>k | 65<br>13<br>A | 194<br>13<br>n |
| 4 | cluster No.<br>similarity<br>character | 197<br>18<br>o | 27<br>16<br>0 | 109<br>14<br>O | 154<br>13<br>c | 121<br>13<br>C |
| ⋮ | ⋮ | ⋮ | ⋮ | ⋮ | ⋮ | ⋮ |

Fig. 43

| character No. | | 1st | 2nd | 3rd | 4th | 5th |
|---|---|---|---|---|---|---|
| 1 | cluster No.<br>similarity<br>character | 117<br>21<br>R | 110<br>18<br>P | 82<br>17<br>F | 200<br>15<br>p | 196<br>14<br>n |
| 2 | cluster No.<br>similarity<br>character | 173<br>19<br>i | 89<br>17<br>I | 188<br>12<br>l | 32<br>12<br>l | 183<br>12<br>j |
| 3 | cluster No.<br>similarity<br>character | 171<br>15<br>h | 150<br>14<br>b | 185<br>14<br>k | 65<br>13<br>A | 194<br>13<br>n |
| 4 | cluster No.<br>similarity<br>character | 197<br>17<br>o | 27<br>16<br>0 | 109<br>14<br>O | 154<br>13<br>c | 121<br>13<br>C |
| ⋮ | ⋮ | ⋮ | ⋮ | ⋮ | ⋮ | ⋮ |

4301 points to the header row area; 4302 points to row 1.

| character rectangle | first rank candidate | | second rank candidate | | third rank candidate | |
|---|---|---|---|---|---|---|
| | character | evaluation value A | character | evaluation value A | character | evaluation value A |
| 4703 | s | 428 | S | 430 | G | 510 |
| 4704 | a | 410 | e | 520 | o | 600 |
| 4705 | m | 400 | w | 550 | W | 558 |
| 4706 | p | 350 | p | 352 | R | 400 |
| 4707 | I | 378 | l | 380 | t | 410 |
| 4708 | e | 432 | c | 535 | C | 540 |

Fig. 49

| character | uppermost Y-coordinate Uo | lowest Y-coordinate Lo | height Ho | width Wo |
|---|---|---|---|---|
| A | 98 | 0 | 98 | 90 |
| B | 98 | −2 | 100 | 86 |
| ⋮ | ⋮ | ⋮ | ⋮ | ⋮ |
| G | 98 | −2 | 100 | 95 |
| ⋮ | ⋮ | ⋮ | ⋮ | ⋮ |
| I | 99 | 0 | 99 | 30 |
| ⋮ | ⋮ | ⋮ | ⋮ | ⋮ |
| S | 98 | −2 | 100 | 83 |
| ⋮ | ⋮ | ⋮ | ⋮ | ⋮ |
| 1 | 98 | 0 | 98 | 25 |
| ⋮ | ⋮ | ⋮ | ⋮ | ⋮ |
| s | 67 | 0 | 67 | 58 |
| t | 90 | −1 | 91 | 38 |
| ⋮ | ⋮ | ⋮ | ⋮ | ⋮ |
| z | 67 | 0 | 67 | 70 |
| 0 | 98 | −2 | 100 | 65 |
| ⋮ | ⋮ | ⋮ | ⋮ | ⋮ |
| 9 | 98 | −2 | 100 | 66 |

Fig. 51

| character rectangle | uppermost y-coordinate Yu | lowest y-coordinate YL | height h | width w | type |
|---|---|---|---|---|---|
| 4703 | 42 | 14 | 28 | 18 | up |
| 4704 | 33 | 15 | 18 | 20 | up |
| 4705 | 31 | 14 | 17 | 28 | up |
| 4706 | 29 | 0 | 29 | 21 | low |
| 4707 | 43 | 14 | 29 | 7 | up |
| 4708 | 30 | 13 | 17 | 18 | up |

Fig. 52

| character rectangle | uppermost Y-coordinate U | lowest Y-coordinate L | height $H^*$ | width W |
|---|---|---|---|---|
| 4703 | 96.6 | 0.0 | 96.6 | 62.1 |
| 4704 | 65.5 | 3.4 | 62.1 | 70.0 |
| 4705 | 58.6 | 0.0 | 58.6 | 96.6 |
| 4706 | 51.7 | −48.3 | 100.0 | 72.4 |
| 4707 | 100.0 | 0.0 | 100.0 | 24.1 |
| 4708 | 55.2 | −3.4 | 58.6 | 62.1 |

Fig. 54

| character | similar character |
|---|---|
| A | no |
| B | no |
| C | yes |
| ⋮ | ⋮ |
| S | yes |
| ⋮ | ⋮ |
| a | no |
| ⋮ | ⋮ |
| s | yes |
| ⋮ | ⋮ |
| z | yes |
| 0 | yes |
| ⋮ | ⋮ |
| 9 | yes |

| character rectangle | uppermost y-coordinate Yu | lowest y-coordinate YL | height h | width w | type | corrected lowest position Yo' |
|---|---|---|---|---|---|---|
| 5602 | 35 | 7 | 28 | 18 | low | 7 |
| 5603 | 27 | 9 | 18 | 20 | up | 9 |
| 5604 | 26 | 9 | 17 | 28 | up | 9 |
| 5605 | 29 | 0 | 29 | 21 | low | 9 |
| 5606 | 40 | 11 | 29 | 7 | up | 11 |
| 5607 | 30 | 12 | 18 | 18 | up | 12 |

Fig. 58

| character rectangle | uppermost Y-coordinate U | lowest Y-coordinate L | height H* | width W |
|---|---|---|---|---|
| 5602 | 96.6 | 0.0 | 96.6 | 62.1 |
| 5603 | 62.1 | 0.0 | 62.1 | 70.0 |
| 5604 | 58.6 | 0.0 | 58.6 | 96.6 |
| 5605 | 70.0 | −31.0 | 100.0 | 72.4 |
| 5606 | 100.0 | 0.0 | 100.0 | 24.1 |
| 5607 | 62.1 | 0.0 | 62.1 | 62.1 |

CHARACTER EXTRACTION APPARATUS, DICTIONARY PRODUCTION APPARATUS, AND CHARACTER RECOGNITION APPARATUS USING BOTH APPARATUSES

This application is a divisional application under 37 C.F.R. §1.60 of prior patent application Ser. No. 08/608,179, filed on Feb. 28, 1996, for "CHARACTER EXTRACTION APPARATUS, DICTIONARY PRODUCTION APPARATUS, AND CHARACTER RECOGNITION APPARATUS USING BOTH APPARATUSES."

BACKGROUND OF THE INVENTION

1. Field of the Invention

This invention relates to a character recognition apparatus, more specifically to a character extraction apparatus for extracting characters from a text, a dictionary production apparatus for producing dictionaries used in character recognition, and a character recognition apparatus using both apparatuses.

2. Description of the Prior Art

Recently, there has been demand for character recognition apparatuses so that many such apparatuses have been brought onto the market. However, these conventional devices have been unable to meet the increasing demands for character recognition accuracy.

There are two major conventional methods for extracting characters from text images which have been input and through light/electricity conversion: a method with histogram of character rows, and a method of extracting arrays of black pixels.

A first character extraction apparatus with the histogram method comprises a character row extracting means, a histogram extracting means, and a character extracting means. The character row extracting means extracts position data for each character row from a text image. The histogram extracting means vertically and horizontally (character row direction) scans an area specified by the position data and its surroundings, and counts the number of black pixels for each scanning line. Thus, data for a histogram of black pixels is obtained for each character row area. The character extracting means, based on the obtained histogram data and using an assumed average character width, extracts characters from the character row.

A second character extraction apparatus with a method of extracting arrays of black pixels comprises a character row extracting means, an array extracting means, and a character extracting means. The character row extracting means extracts position data of character rows from a text image. The array extracting means extracts arrays of black pixels by putting labels to the arrays. More specifically, the array extracting means scans a character row area, and extracts arrays of black pixels in which black pixels are connected to each other in four vertical and horizontal directions or eight directions including diagonal directions, then assigns a same label to every pixel which belongs to a same array. The character extracting means assigns respective labels to the arrays. (Hideyuki Tamura, "Guide to Image Processing on Computer", Soken Shuppan, page 75.) The character extracting means segments the character row into characters with labels having their respective data.

In either of the above apparatuses, a character recognition means receives data for each character, and uses the data to recognize characters.

However, the first character extraction apparatus does not correctly extract characters if there are "gearing" characters or if character widths are not constant.

A "gearing" represents an overlapping of circumscribed rectangles of characters. For example, in word "modifying", a horizontal gearing may happen to characters "f" and "y". The overlapping may also happen to Italic type characters. Vertical gearing also may happen to characters such as "g" and "p" which have longer lower part. As for difference in character widths, characters such as "i" and "l" have shorter widths than "a", for example.

Even though the second character extraction apparatus has been made to overcome the defects of marginal histogram method, sometimes the apparatus does not extract characters such as "i" and "j", German characters with umlaut mark, or "broken" characters which miss some part due to obscure text image because they are divided into several parts.

Generally, character recognition apparatus extracts a set of pieces of feature data, referred to hereinafter as a "feature", from character data of each recognition object, and identify a character by comparing the feature with standard feature for character models stored in a built-in dictionary and selecting the most similar one.

The dictionary is made by a dictionary production apparatus. The dictionary production apparatus obtains average values of features from a lot of handwritten characters and different types of print characters for each character model, and stores the average values as standard features in the dictionary.

However, the dictionary is not sufficient to recognize handwritten characters which vary greatly at each performance even by a same writer or multi-font characters for which a plurality of shapes and sizes are available at printing. That is, the distribution of features are so complicated to deal with.

A dictionary generating apparatus using cluster analysis has been proposed to overcome the defect. The cluster analysis is a known general method for classifying different target objects, solid or numeral, into clusters based on a defined similarity ("Methods of Multivariate Statistical Analysis", Yutaka Tanaka and Kazumasa Wakimoto, Gendai-sugaku-sha, pp 230 to 244). The apparatus makes clusters of feature data values for each character. Average feature data values are obtained for each cluster and stored into a dictionary. As the number of clusters for a character increases, the recognition accuracy increases, but dictionary capacity increases as well.

However, in view of effective use of storage devices or execution time for recognizing characters, the less the number of clusters, the better the effectiveness. This is because the character recognition apparatus computes distances between features and average features of clusters. Therefore, as the number of clusters stored in the dictionary increases, the time taken for character recognition increases.

The above conditions, being contradictory to each other, determine the optimum number of clusters, that is the minimum number of clusters for realizing the maximum recognition ratio. However, to obtain the optimum number of clusters of a character, distribution of all the features of all the characters must be grasped because the number of clusters is affected by relation between features of different characters as well as affected by distribution of features of a same character.

However, grasping the distribution of all the features of all the characters and determining the optimum number of clusters for each character is not a practical way because a vast number of calculations are required for a vast number of source characters used to make a dictionary.

A first prior-art apparatus with cluster analysis, therefore, sets the same number of clusters for each character.

A second prior-art apparatus with cluster analysis (Japanese Laid-Open Patent Application No.1-36388) makes a dictionary by setting a same number of clusters, then arranges the number of clusters after experimenting character recognition with the dictionary.

A third prior-art apparatus with cluster analysis (Japanese Patent Publication No.5-082628) discloses a feature obtained for a cluster. The apparatus obtains a circumscribed rectangle of each character image, and divides the circumscribed rectangle into blocks by dividing it into L pieces horizontally and M pieces vertically. The apparatus assigns a direction value to each boundary pixel of the character image based on a direction to an adjacent boundary pixel. The apparatus obtains an outline direction density of each block by counting points of direction values in the block. The apparatus divides the circumscribed rectangle into other blocks by dividing it into P pieces horizontally and Q pieces vertically. Then, the apparatus obtains a background value by scanning the circumscribed rectangle from one side to the opposite side incrementing a value for each encounter with a black pixel, and obtains background density of each block by counting pixels of background values in the block.

A fourth prior-art apparatus with cluster analysis (Japanese Laid-Open Patent Application No.5-128307) provides a method for dealing with broken characters and connected characters. The apparatus recognizes extracted characters as independent characters. The apparatus also links independent characters for every combination unless the width of the linked ones does not exceeds a predetermined width. The apparatus then evaluates both independent characters and linked characters, compares them, and selects one with highest evaluation, and identifies the character.

Furthermore, a first prior-art character recognition apparatus provides a method for discerning pictures and drawings. The apparatus judges whether each "fragment" of a picture or drawing is a character.

However, these prior-art apparatuses have problems to be solved. The first prior-art apparatus has low character recognition ratio if the number of clusters per character is small. Therefore, a lot of clusters are required to increase the recognition ratio. However, the more the clusters, the more unnecessary computations. Furthermore, even if the number of clusters is increased, the recognition ratio does not reach a satisfactory level.

The second prior-art apparatus has a problem in discerning a character from another with almost the same shape, such as "0" and "O". Therefore, the recognition ratio does not increase even if the number of clusters is increased.

The problem of the third prior-art apparatus is that it recognizes characters with different shapes as the same character if they have the same pixel succession in the outlines, such as "•" and "|".

The fourth prior-art apparatus takes a lot of time to recognize characters because it links independent characters for every combination unless the width of-the linked ones does not exceeds a predetermined width.

The first prior-art character recognition apparatus may recognize a fragment of a picture or a drawing as a character if the shape of the fragment happens to be the same as that of the character.

A second prior-art character recognition apparatus (Japanese Laid-Open Patent Application No.63-216189) provides a method for discerning a character from another with almost the same shape, such as "0" and "O". It is difficult to recognize such characters just by comparing them with patterns in a dictionary for matching. A recognizing unit recognizes extracted characters. Then, a recognition controlling unit obtains a threshold value for the character height from differences between the uppermost positions and the lowest positions of words. The recognition controlling unit puts a label to every character by comparing the character height with the threshold value to indicate a capitol letter or a small letter. The recognition controlling unit, based on the labels, corrects characters recognized by the recognizing unit. For example, if the recognizing unit recognizes a character as "O", and the recognition controlling unit judges it to be "o", the recognition controlling unit corrects the character from "O" to "o".

However, the second prior-art character recognition apparatus still has a problem in differentiating characters with similar shapes, such as small letter "l" and capitol letter "I" or small letters "w" and "m" because the apparatus compares characters only with the threshold value for the character height. Also, if word shapes bend in text reading by a scanner, the uppermost positions and the lowest positions of the words are not correct, and incorrect labels are generated. As a result, the character recognition accuracy of the apparatus has not reached a satisfactory level.

SUMMARY OF THE INVENTION

It is therefore an object of the present invention to provide a character extraction apparatus for extracting characters correctly even if a text includes "gearing" characters, irregular character widths, "broken" characters, or obscure characters.

It is another object of this invention to provide a dictionary production apparatus for producing a dictionary with appropriate amount of data by which handwritten characters or multi-font characters are recognized with high rate of character recognition, and to provide a character recognition apparatus which uses the dictionary made by the dictionary production apparatus.

It is still another object of this invention to provide a character recognition apparatus with high character recognition accuracy for correctly recognizing characters even if a text includes similar characters.

The above objects are fulfilled by a character extraction apparatus for extracting character data for each character from a text image which is represented by first pixels corresponding to character images and second pixels corresponding to background images, comprising: a character row detecting means for detecting character rows from the text image and obtaining position data of each character row; a pixel array extracting means for extracting arrays of continuous first pixels in an area specified by the character row position data and computing position data of each of the arrays of continuous first pixels; a character array linking means for linking the arrays of continuous first pixels in the area based on the position data of the arrays of continuous first pixels; and a character extracting means for recognizing each set of arrays of continuous first pixels linked by the character array linking means as a character and outputting character data.

The pixel array extracting means of the character extraction apparatus may comprise: a section extracting unit for scanning the area specified by the character row position data in a first scanning direction and judging whether the first pixel continues or not: if continues, extracting each set of the continuous first pixels as a section; if not, extracting each first pixel as a section; and a section linking unit for linking each section of a scanning line extracted by the section extracting unit to another section of a scanning line neighboring in a second scanning direction if these sections are connected to each other, and for extracting these sections as an array of continuous first pixels, the second scanning direction being perpendicular to the first scanning line.

The character extraction apparatus may further comprise: a pixel array deleting unit for deleting certain arrays of continuous first pixels in the area specified by the character row position data if the certain arrays are connected to first pixels of one of scanning lines which are located immediately on and under the area in the second direction.

With such construction, even if a part of a character protrudes over a circumscribed rectangle of another character row due to narrow spaces between character rows, the part of the character is not mistakenly extracted as a character.

The pixel array linking, means of the character extraction apparatus may comprise: a rectangle position extracting unit for extracting position data of each circumscribed rectangle of an array of continuous first pixels extracted by the pixel array extracting means; a rectangle center computing unit for computing center position of the circumscribed rectangles from the position data extracted by the rectangle position extracting unit; a slant computing unit for obtaining a slant value of a line connecting centers of rectangles computed by the rectangle center computing unit; and a first linking unit for judging whether an absolute value of the slant value is not less than a first threshold value and linking a pair of arrays of continuous first pixels of the rectangles if the slant value is not less than the first threshold value.

With such construction, partly-divided characters such as "i" and "j" are correctly extracted.

The pixel array linking means of the character extraction apparatus may further comprise: an inter-pixel distance computing unit for computing distances between first pixels that make up each array of continuous first pixels extracted by the pixel array extracting unit; and a second linking unit for judging whether each of the distances between first pixels is not more than a second threshold value and linking the pair of arrays of continuous first pixels if the distance is not more than the second threshold value.

The pixel array linking means of the character extraction apparatus may further comprise: a first rectangle range extracting unit for extracting coordinate values of both ends in the first scanning direction from position data of each rectangle extracted by the rectangle position extracting unit; and a third linking unit for judging whether a range between the both ends of a rectangle includes both ends of another rectangle in the first scanning direction and, if include, linking the pair of arrays of continuous first pixels of these rectangles, wherein this judgement is performed for each rectangle.

The pixel array linking means of the character extraction apparatus may further comprise: a second rectangle range extracting unit for extracting coordinate values of both ends in the second scanning direction from position data of each rectangle extracted by the rectangle position extracting unit; and a fourth linking unit for linking a pair of arrays of continuous first pixels of rectangles if a range of one of the rectangles includes an end of the other rectangle in the first scanning direction, and a length of the other rectangle in the range is not less than a third threshold value, and a range of a former rectangle includes an end of the other rectangle in the second scanning direction, and a length of the other rectangle in the range is not less than a third threshold value.

The pixel array linking means of the character extraction apparatus may further comprise: an inter-rectangle distance computing unit for computing distances between two rectangles based on the position data extracted by the rectangle position data extracting unit; a rectangle area computing unit for computing area of the two rectangles based on the position data extracted by the rectangle position data extracting unit and computing a ratio of the area of the two rectangles; and a fifth linking unit for linking a pair of arrays of continuous first pixels of the two rectangles if a result value of the inter-rectangle distance computing unit is not more than a fourth threshold value, and the ratio obtained by the rectangle area computing unit is not less than a fifth threshold value.

With such construction, "broken" characters due to obscure text image and the like are correctly extracted.

The above objects are also fulfilled by a character recognition dictionary production apparatus, comprising: an image inputting means for receiving a plurality of source character images for each character code; a feature value extracting unit for extracting a set of feature values from each source character image received by the image inputting means; a clustering means for classifying the sets of feature values received by the image inputting means into clusters for each character code; a classifying dictionary registering means for obtaining a set of average cluster feature values for each cluster from the feature values extracted by the feature value extracting unit, and registering the sets of average cluster feature values as classifying data related to character codes in the classifying dictionary registering means itself; a distance computing means for computing distances between two sets of average cluster feature values registered in the classifying dictionary registering means; and an identifying dictionary registering means for extracting a set of clusters, belonging to different character codes, with the distance in between computed by the distance computing means smaller than a predetermined value, selecting one or more elements with highest identification level from the average cluster feature values for each set of clusters, and registering the elements and related identifiers of the clusters as identifying data in the identifying dictionary registering means itself.

With such construction, even if there are clusters of different character codes which are equal to each other or very near, a high rate of character recognition is attained because clusters are obtained for each character and the identifying dictionary stores feature elements and the identifiers of the clusters used to identify such near clusters.

The clustering means of the character recognition dictionary production apparatus may comprise: a distance computing unit for computing a distance between two sets of feature values for each combination in each character code; a criterion determining unit for determining a cluster size criterion based on a minimum value among maximum values for the distance computed by the distance computing unit; and a linking unit for linking clusters whose sizes are smaller than the cluster size criterion determined by the criterion determining unit.

With such construction, since the clustering means determines a cluster size for an optimum number of clusters and links the clusters based on the cluster size, the number of clusters does not increase excessively.

The identifying dictionary registering means of the character recognition dictionary production apparatus may comprise: a value determining unit for using the cluster size criterion determined by the criterion determining unit as the predetermined value.

With such construction, since the identifying dictionary registering means registers a distance between clusters as a cluster size criterion in the identifying dictionary, similar characters are respectively recognized with high rate of recognition.

The feature value extracting unit of the character recognition dictionary production apparatus may comprise: a circumscribed rectangle obtaining unit for obtaining circumscribed rectangles of the character images; a direction density computing unit for assigning a direction value to each boundary first pixel of a character image based on a direction to an adjacent boundary first pixel, dividing a circumscribed rectangle of the character image into blocks by dividing it into L pieces in row direction and M pieces in column direction, counting a number of first pixels for each direction value for each block, and obtaining an outline direction density of each block by dividing the counted number of first pixels by a total number of pixels in the block for each block; a background density computing unit for obtaining a background value for each pixel by scanning the circumscribed rectangle from a side to an opposite side incrementing "1" for each encounter with a first pixel making up the character image, dividing a circumscribed rectangle of the character image into blocks by dividing it into P pieces in row direction and Q pieces in column direction, counting a number of pixels for each background value for each block, and obtaining a background density of each block by dividing the counted number of pixels by a total number of pixels in the block for each block; and a width-height ratio computing unit for obtaining a width-height ratio of the circumscribed rectangle.

In the character recognition dictionary production apparatus, one piece of the identifying data registered in the identifying dictionary registering means may be the width-height ratio obtained by the width-height ratio computing unit.

With such construction, the width-height ratio is extracted and used in character recognition, still higher rate of character recognition is obtained.

The above objects are also fulfilled by a character recognition apparatus, comprising: an image inputting means for receiving text images; a character row coordinate value detecting means for detecting coordinate values of character rows in a text image received by the image inputting means; a character coordinate value detecting means for detecting coordinate values of character images in the character row images: a feature value extracting means for extracting a set of feature values from each of the character images; a classifying dictionary for prestoring standard characters with their character codes, each of the standard characters having clusters of a certain size, and each of the clusters having sets of average cluster feature values; a classifying means for computing a first distance between the set of feature values extracted by the feature value extracting means and the set of average cluster feature values for each cluster, computing similarities from the computed first distances, and selecting a plurality of clusters with high similarities as candidate clusters; an identifying dictionary for prestoring identifiers of near clusters whose distance is smaller than a certain distance value, and prestoring one or more elements of average cluster feature values which have high identification level, the near clusters being related to the elements; an identifying means for, if a pair of the identifiers stored in the identifying dictionary are included in identifiers of the candidate clusters selected by the classifying means, computing a second distance between the set of feature values extracted by the feature value extracting means and the set of average cluster feature values for each of the near clusters only for the elements, and raising a similarity of a candidate cluster whose second distance is shorter than the other; and an outputting means for outputting character codes of the candidate clusters selected by the classifying means reflecting the similarity raised by the identifying means.

With such construction, a character recognition apparatus has a high rate of character recognition because it uses feature elements which highly identifies the near clusters.

In the character recognition apparatus, the certain cluster size used for the classifying dictionary and the certain distance value used for the identifying dictionary may be both determined based on a minimum value among maximum distance values, each of the maximum distance values being a maximum value of distances between the feature values for each character code.

With such construction, since an optimum number of clusters are registered in the dictionary, the dictionary capacity and the time taken for comparing feature values are decreased.

The character recognition apparatus may further comprise: a rejecting dictionary for prestoring minimum values and maximum values of certain elements in the feature values, the minimum values and the maximum values being related to the identifiers of the clusters; an identification judging means for judging a character identification valid if a cluster selected by the classifying means has a highest similarity exceeding a certain value, and if a range of the minimum values and the maximum values of certain elements stored in the rejecting dictionary includes feature values of the certain elements in the set of feature values extracted by the feature value extracting means; a rejected cluster linking means for linking continuous rejected clusters, the rejected clusters being candidate clusters judged invalid by the identification judging means; a number-of-characters assuming means for obtaining a number of characters which is supposed to be included in a range of one of an invalid candidate cluster which does not have any neighboring invalid clusters and a set of linked rejected clusters, the range being specified by coordinate values; a linked-characters dividing means for dividing the range by the number of characters obtained by the number-of-characters assuming means and obtaining coordinate values of new character images; a second feature value extracting means for extracting a set of feature values from each of the new character images; a second classifying means for computing distances between the sets of feature values extracted by the second feature value extracting means and the sets of average cluster feature values, computing similarities from the computed distances, and selecting a plurality of clusters with high similarities as candidate clusters; a second identifying means for, if a pair of the identifiers stored in the identifying dictionary are included in identifiers of the candidate clusters selected by the second classifying means, computing the second distance between the set of feature values extracted by the second feature value extracting means and the sets of average cluster feature values of the near clusters only by the element, and raising a similarity of a candidate cluster whose second distance is shorter than the other; a second identification judging means for judging a character identification valid if a cluster selected by the second classifying means has a highest similarity exceeding a certain value, and if a range of the minimum values and the maximum values of certain elements stored in the rejecting dictionary includes feature values of the certain elements in the set of feature values extracted by the second feature value extracting means; an identification selecting means for rejecting a candidate cluster selected by the classifying means reflecting the similarity raised by the identifying means, and selecting the character identification judged valid by the second identification judging means; and an identified character outputting means for outputting character codes of candidate clusters reflecting the character identification selected by the identification selecting means.

With such construction, when an input character image is not detected in any range of prestored feature values or the character image has a similarity below a certain level, the character recognition process is performed again by cancelling the first recognition result, providing still higher rate of character recognition.

The rejected cluster linking means of the character recognition apparatus may comprise: a parenthesis linking unit for linking continuous parentheses, the parentheses being candidate clusters with highest similarities after the identifying means has processed; and a rejected cluster and parenthesis linking unit for linking a continuous set of rejected clusters judged invalid by the identification judging means and parentheses being candidate clusters with highest similarities.

With such construction, obscure characters or incorrectly identified characters are linked to be recognized again, providing still higher rate of character recognition.

The feature value extracting unit of the character recognition apparatus may comprise: a circumscribed rectangle obtaining unit for obtaining circumscribed rectangles of the character images; a direction density computing unit for assigning a direction value to each boundary first pixel of a character image based on a direction to an adjacent boundary first pixel, dividing a circumscribed rectangle of the character image into blocks by dividing it into L pieces in row direction and M pieces in column direction, counting a number of first pixels for each direction value for each block, and obtaining an outline direction density of each block by dividing the counted number of first pixels by a total number of pixels in the block for each block; a background density computing unit for obtaining a background value for each pixel by scanning the circumscribed rectangle from a side to an opposite side incrementing "1" for each encounter with a first pixel making up the character image, dividing a circumscribed rectangle of the character image into blocks by dividing it into P pieces in row direction and Q pieces in column direction, counting a number of pixels for each background value for each block, and obtaining a background density of each block by dividing the counted number of pixels by a total number of pixels in the block for each block; and a width-height ratio computing unit for obtaining a width-height ratio of the circumscribed rectangle.

With such construction, the width-height ratio of the circumscribed rectangle of character image is used in character recognition, still higher rate of character recognition is obtained.

The character recognition apparatus may further comprise: a ratio computing means for computing a ratio of character codes of predetermined specific symbols for a character row based on one of the character identification judged by the identification judging means and the character identification selected by the identification selecting means; and a character row judging means for judging a character row invalid if the ratio of the character row computed by the ratio computing means exceeds a certain ratio value, and sending the judgement to the outputting means.

With such construction, when a character row includes predetermined specific symbols over a certain ratio, the character recognition process is performed again by cancelling the first recognition result, preventing the apparatus from outputting incorrectly recognized characters.

The above objects are also fulfilled by a character recognition apparatus, comprising: a character image extracting means for extracting character images from a text image; a candidate character selecting means for comparing the character images with standard characters for selecting a plurality of candidate characters with higher matching levels, and assigning first evaluation values to the candidate characters according to the matching levels; a character rectangle data dictionary for prestoring shape data of circumscribed rectangles of the standard characters; a character rectangle extracting means for extracting position data of the circumscribed rectangles of the character images extracted by the character image extracting means; a character rectangle shape data extracting means for extracting normalized shape data from the position data of the circumscribed rectangles of the character images extracted by the character rectangle extracting means; a character rectangle evaluating means for obtaining a second evaluation value for each candidate character by a certain computation using the normalized shape data extracted by the character rectangle shape data extracting means and the shape data stored in the character rectangle data dictionary; and a character determining means for determining a character among the plurality of candidate characters selected by the candidate character selecting means based on the first evaluation values and the second evaluation values.

The character rectangle data dictionary of the character recognition apparatus may comprise.: a character rectangle position data registering unit for prestoring data of uppermost positions and lowest positions of the circumscribed rectangles of the standard characters; and a character rectangle size data registering unit for prestoring data of heights and widths of the circumscribed rectangles of the standard characters.

In the character recognition apparatus, the shape data stored in the character rectangle data dictionary may include a standard uppermost position which is a maximum height of circumscribed rectangles of capitol letters, and includes a base line position which is an average value of lowest positions of continuously printed capitol letters.

With such construction, since the character recognition apparatus identifies characters by using the shape evaluation values as well as the evaluation values by the identifying means, the apparatus has still higher rate of character recognition for a text including similar characters.

The character rectangle shape data extracting means of the character recognition apparatus may comprise: a part extracting unit for computing a distance between two neighboring circumscribed rectangles of the character images for each combination in a character row based on the position data, and dividing the character row into parts based on the computed distances, each of the parts having character images with the distance less than a threshold value, and the position data consisting of coordinate values of upper-left positions and lower-right positions of the circumscribed rectangles of the character images; a part rectangle shape data extracting unit for extracting uppermost positions and lowest positions of the circumscribed rectangles of the parts extracted by the part extracting unit based on the position data extracted by the character rectangle extracting means; a relative position data computing unit for obtaining a relative uppermost position and a relative lowest position of each circumscribed rectangle of character image in each part by setting a lowest position of a circumscribed rectangle of the part as a basic value, and computing a height and a width of each of the circumscribed rectangles of the character images from the position data; a character classifying unit for extracting a maximum value of the relative uppermost positions obtained by the relative position data computing unit, classifying character images whose relative lowest positions are less than a certain ratio of the maximum value into lower extension characters, and classifying other character images into upper characters; a part base line position extracting unit for obtaining a part base line position of the circumscribed rectangle of the part which is an average value of the relative lowest positions of the circumscribed rectangles of the upper characters in the part; a standard character position computing unit for computing a standard character uppermost position and a character base line position for each circumscribed rectangle of character image from the relative uppermost position and the relative lowest position by setting the part base line position as a basic value; and a character rectangle normalizing unit for obtaining normalized shape data which includes the standard character uppermost position, the character base line position and the height and the width of the circumscribed rectangle of the character image computed by setting the maximum value of the heights of the upper characters as a basic value.

The character rectangle shape data extracting means of the character recognition apparatus may further comprise: a classification correcting unit for classifying all the character images in a part into upper characters when the character images are classified into lower extension characters.

The character rectangle evaluating means of the character recognition apparatus may comprise: a second evaluation value computing unit for obtaining the second evaluation value for each candidate character which is a sum of absolute values of differences between elements of the normalized shape data and corresponding elements of shape data of a candidate character; and wherein the character determining means comprises: a total evaluation value computing unit for summing up the first evaluation values and the second evaluation values and obtaining a total evaluation value for each candidate character, the first evaluation values decreasing as the matching level of the candidate characters rises; and a determining unit for determining a candidate character which has a minimum total evaluation value.

The character rectangle evaluating means of the character recognition apparatus may comprise: a character similarity information storage unit for storing information telling whether each of the standard characters has similar characters; a first judging unit for judging whether each of the plurality of candidate characters selected by the candidate character selecting means has similar characters by referring to the character similarity information storage unit; a second evaluation value assigning unit for prohibiting the second evaluation value computing unit from obtaining the second evaluation value and assigning certain second evaluation values to all the candidate characters if the first judging unit judges that any of the candidate characters does not have any similar characters.

With such construction, since the character images are classified into lower extension characters and upper characters, then standard lowest positions and standard values are obtained to normalize the data of the circumscribed rectangles of character images, the apparatus has still higher rate of character recognition for a text including similar characters.

In the character recognition apparatus, the threshold value used in the part extracting unit may be a half of a maximum value of heights of the circumscribed rectangles of the character images.

With such construction, since the shape evaluation values are not obtained when it is judged that any of the candidate characters does not have any similar characters, the processing speed increases without decreasing the accuracy of character recognition for a text including similar characters.

In the character recognition apparatus, the certain ratio used by the character classifying unit may be 20%.

In the character recognition apparatus, the second evaluation value assigned by the second evaluation value assigning unit may be "0".

With such construction, since the shape evaluation values are not obtained when it is judged that a candidate character with highest matching level does not have any similar characters, the processing speed increases without decreasing the accuracy of character recognition for a text including similar characters.

The character rectangle shape data extracting means of the character recognition apparatus may comprise: a part extracting unit for computing a distance between two neighboring circumscribed rectangles of the character images for each combination in a character row based on the position data, and dividing the character row into parts based on the computed distances, each of the parts having character images with the distance less than a threshold value, and the position data including coordinate values of upper-left positions and lower-right positions of the circumscribed rectangles of the character images; a part rectangle shape data extracting unit for extracting uppermost positions and lowest positions of the circumscribed rectangles of the parts extracted by the part extracting unit based on the position data extracted by the character rectangle extracting means; a relative position data computing unit for obtaining a relative uppermost position and a relative lowest position of each circumscribed rectangle of character image in each part by setting a lowest position of a circumscribed rectangle of the part as a basic value, and by computing a height and a width of each of the circumscribed rectangles of the character images from the position data; a character classifying unit for extracting a maximum value of the relative uppermost positions obtained by the relative position data computing unit for each part, classifying character images whose relative lowest positions are less than a certain ratio of the maximum value into lower extension characters, and classifying other character images into upper characters; a first lowest position correcting unit for judging whether a difference between a relative lowest position of a circumscribed rectangle of a first character image in the part and an initial value is less than a certain value: if less, extracting the relative lowest position as a corrected lowest position of the circumscribed rectangle of the first character image; and if not less, extracting the initial value as the same, wherein the initial value is a relative lowest position of the circumscribed rectangle of the first upper character; a second lowest position correcting unit for judging whether a difference between the corrected lowest position of the circumscribed rectangle of the first character image and a relative lowest position of a circumscribed rectangle of a next character image in the part is less than the certain value: if less, extracting the relative lowest position as a corrected lowest position of the circumscribed rectangle of the next character image; and if not less, extracting the corrected lowest position of the circumscribed rectangle of the first character image as the same, wherein this judgement is performed for pairs of neighboring rectangles in order until a circumscribed rectangle of a last character image in the part is corrected; a standard character position computing unit for computing a standard character uppermost position and a character base line position for each circumscribed rectangle of character image from the relative uppermost position and the relative lowest position by setting the corrected lowest position of the circumscribed rectangle of each character image as a basic value; and a character rectangle normalizing unit for obtaining normalized shape data which includes the standard character uppermost position, the character base line position and the height and the width of the circumscribed rectangle of the character image computed by setting the maximum value of the heights of the upper characters as a basic value.

With such construction, even if a text image is input aslant, the data of the circumscribed rectangles of character images is obtained accurately because the lowest position of each rectangle is corrected, providing still higher rate of character recognition.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 10A, 10B, and 10C are flowcharts showing the operation of the array extracting unit in First Embodiment.

FIG. 22 shows data stored in a feature database in Second Embodiment.

FIG. 23 shows data stored in the feature database in Second Embodiment.

FIG. 24 shows data stored in the feature database in Second Embodiment.

FIG. 25 shows data stored in the feature database in Second Embodiment.

FIG. 26 explains the data stored in the feature database in Second Embodiment.

FIG. 28 shows the construction of data items stored in a classifying dictionary in Second Embodiment.

FIG. 29 shows a data item stored in the classifying dictionary in Second Embodiment.

FIG. 30 shows a data item stored in the classifying dictionary in Second Embodiment.

FIG. 31 shows a data item stored in the classifying dictionary in Second Embodiment.

FIG. 32 shows a data item stored in the classifying dictionary in Second Embodiment.

FIG. 33 shows a data item stored in the classifying dictionary in Second Embodiment.

FIG. 34 shows a data item stored in-the classifying dictionary in Second Embodiment.

FIG. 36 shows a data item stored in-the identifying dictionary in Second Embodiment.

FIG. 37 shows a data item stored in the identifying dictionary in Second Embodiment.

FIG. 42 shows a classification result in Third Embodiment.

FIG. 43 shows a identification result in Third Embodiment.

FIG. 49 shows character shape data stored in character shape dictionary in Fourth Embodiment.

FIG. 51 shows character shape data extracted by the relative position data extracting unit and character classifying unit in Fourth Embodiment.

FIG. 52 shows normalized character shape data extracted by a character shape data computing unit in Fourth Embodiment.

FIG. 54 shows stored in a character similarity information storage unit.

FIG. 58 shows normalized character shape data extracted by the character shape extracting unit in Fifth Embodiment.

DESCRIPTION OF THE PREFERRED EMBODIMENT

<First Embodiment>

Figure 1:
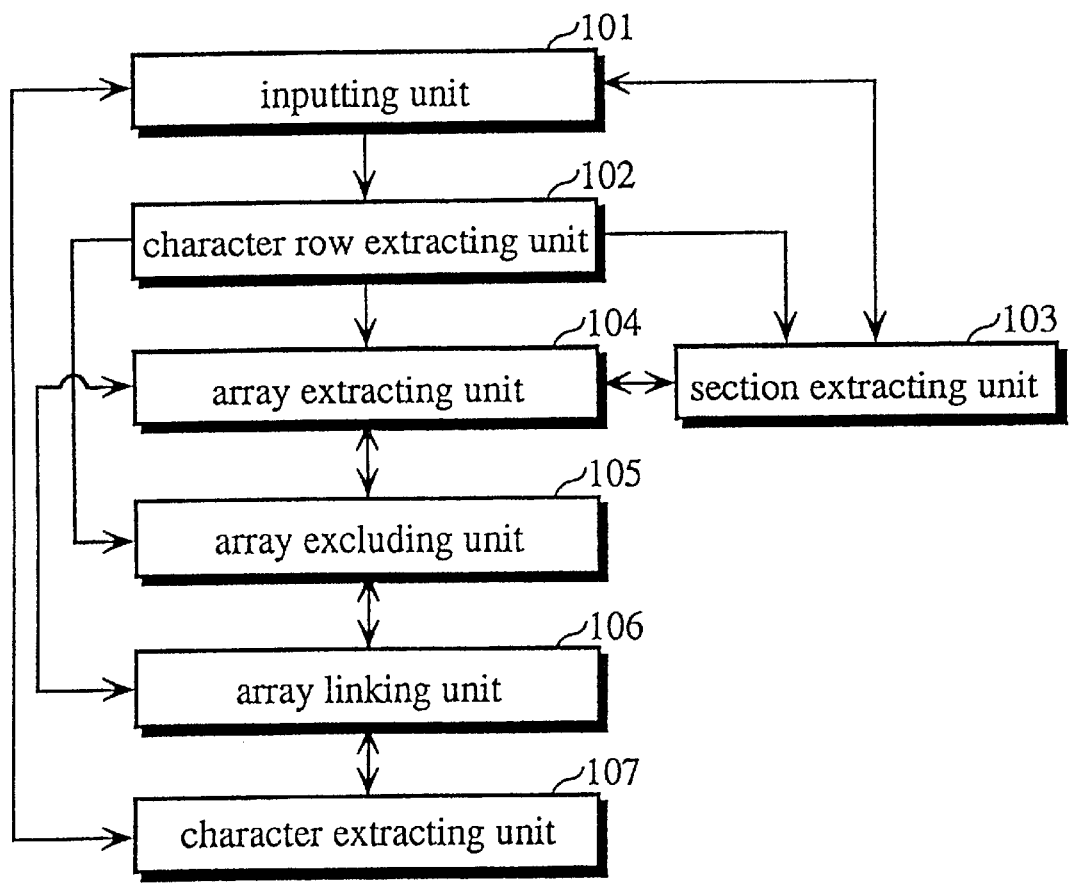
FIG. 1 is a block diagram showing a construction of First Embodiment of the present invention, namely a character extraction apparatus.

FIG. 1 shows a construction of First Embodiment of the present invention, namely a character extraction apparatus. The character extraction apparatus comprises inputting unit 101 for generating image of input texts which include characters, character row extracting unit 102 for extracting position data of character rows from the image, section extracting unit 103 for outputting start and end positions of sections of connected black pixels for each scanning line, array extracting unit 104 for extracting arrays of black pixels from character row areas which are longer by a pixel at each end in the direction perpendicular to the character row direction than areas specified by position data of character rows, array excluding unit 105 for excluding arrays of black pixels from character recognition if they overstep the areas specified by character row extracting unit 102, array linking unit 106 for linking sets of arrays, among the arrays extracted by array extracting unit 104 and not excluded by array excluding unit 105, if the sets meet a predetermined condition, and character extracting unit 107 for extracting data on the linked arrays by regarding each combination as a character.

Inputting unit 101 comprises a scanner, reads texts provided by an operator, performs light/electricity conversion, generates text images consisting of pixels (black pixels and white pixels) represented by binary notation, and sends the text images to character row extracting unit 102 and section extracting unit 103.

Figure 2:
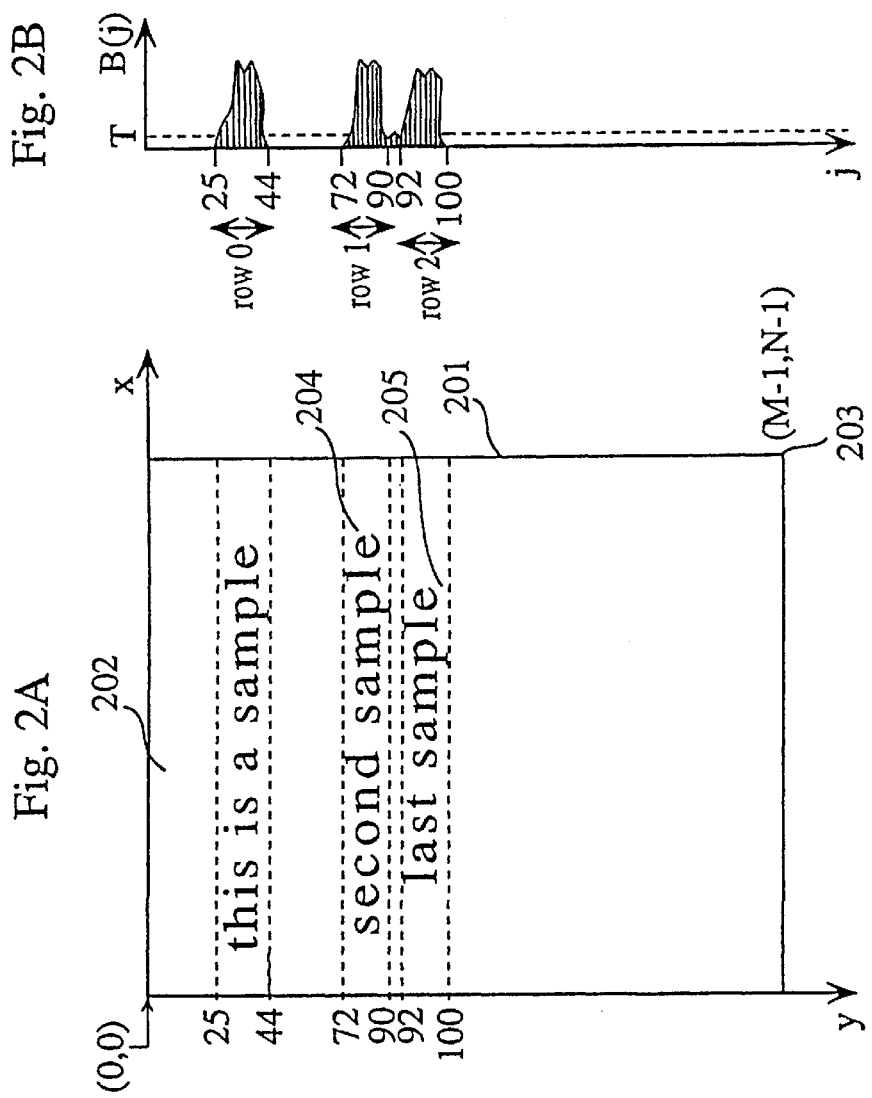
FIG. 2A is a piece of a text image used in First Embodiment.
FIG. 2B is a histogram showing the number of black pixels in each scanning line in FIG. 2A.
FIG. 2C shows position data of character rows extracted from the histogram of FIG. 2B.

Character row extracting unit 102, on receiving text image 202 of text 201 as shown in FIG. 2A, reads the horizontal length, M, and the vertical length, N, of text 201. It is defined, as shown in the figure, that M−1 and N−1 of (M−1, N−1) are coordinate values at point 203 when-the upper-left corner of text 201 is regarded as origin (0,0), the upper side of the text as x-coordinate, and the left side as y-coordinate. The unit used for the coordinate values is a size of a pixel sent from inputting unit 101.

Then, character row extracting unit 102 scans the text image in reading order ranging from x=0 to x=M−1 in the direction of x-coordinate and from y=0 to y=N−1 in the direction of y-coordinate, and counts the number of black pixels per scanning line. Note that a black pixel is defined as a pixel having a value corresponding to a character image part. Then, a histogram as shown in FIG. 2B is obtained, where the horizontal line indicates the number of black pixels, B(j), the vertical line the serial number of scanning line j.

Then, character row extracting unit 102 extracts areas, each denoted by S(k) to E(k), of continuous scanning lines which have positive values for B(j). For example, values for j in area S(0) to E(0) are 25 to 44, and values for j in area S(1) to E(1) 72 to 110. Then, to detect overlapping portions between character row area, character row extracting unit 102 extracts areas of scanning lines, PS(m) to PE(m), each of which has a B(j) value lower than a predetermined threshold value, T. For example, area S(1) to E(1) in FIG. 2B has area PS(m) to PE(m) with j values 90 to 92. A pair of character row areas having an overlapping portion in between is divided into two character row area, each including the overlapping portion. For example, the area having the second character row "second sample" (204) and the third character row "last sample" (205) in text image 202 in FIG. 2A is divided into two areas, Sl(n) to El(n) and Sl(n+1) to El(n+1) where Sl(n) is S(l), El(n+1) is E(l), El(n) is PE(m), and Sl(n+1) is PS(m).

Character row extracting unit 102 sends position data for each character row as shown in FIG. 2C and text length M in x-coordinate direction to section extracting unit 103, array extracting unit 104, and array excluding unit 105. The position data includes serial character row number 206, start position sy 207, and end position ey 208. 207 and 208 respectively indicates the start and end positions of black pixels in a character row in the direction of y-coordinate. At the same time, sy and ey represent serial pixel numbers in y-coordinate direction. Therefore, y-coordinate values for the upper side and lower side of a circumscribed rectangle of a character row in FIG. 2A are respectively sy and ey.

Figure 3:
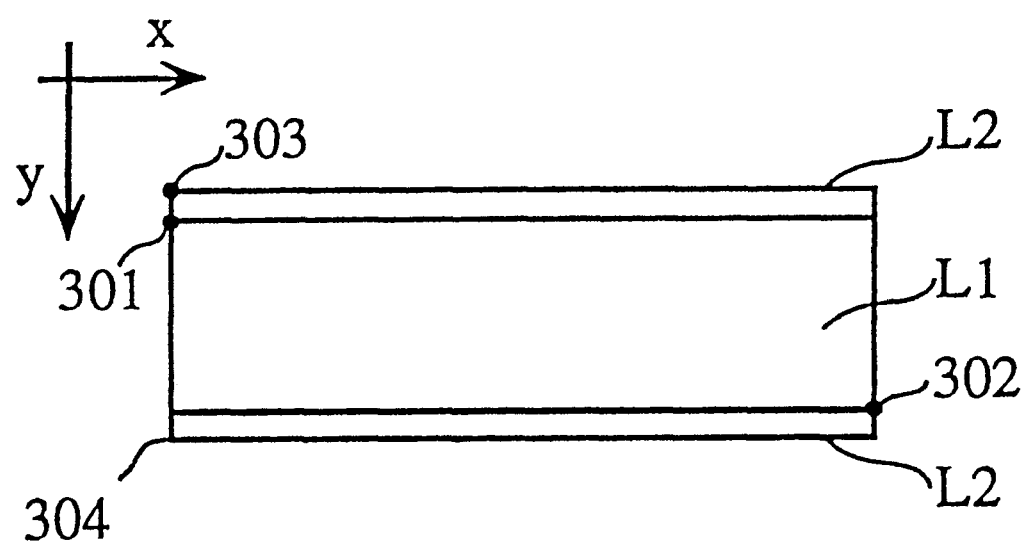
FIG. 3 shows a scanning area for black pixels by a section extracting unit in First Embodiment.

Section extracting unit 103, on receiving position data of character rows from character row extracting unit 102, extends each character row area by a pixel both upward and downward in y-coordinate direction, as shown in FIG. 3, where L1 denotes an original character row area, and L2 an added portion. For example, when area L1 of FIG. 3 corresponds to character row "0" in FIG. 2C, upper-left corner point 301 is (0,25) and lower-right corner point 302 (M, 44) for L1. As for L2, upper-left corner point. 303 is (0,24), and lower-left corner point 304 (0,45). Section extracting unit 103, then, scans the extended areas in x-coordinate direction for black pixels as incrementing value j by 1, and extracts sections of continuous black pixels in x-coordinate direction.

Figures 4A, 4B:
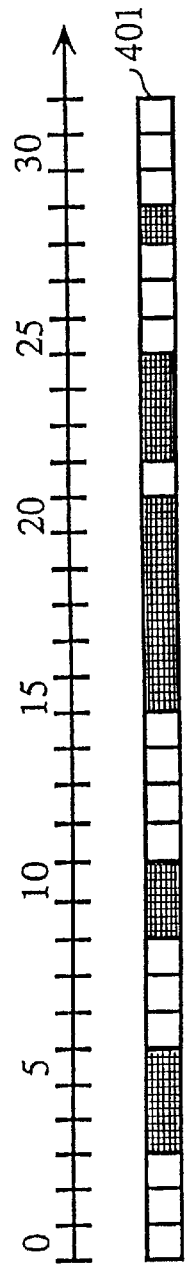
FIG. 4A shows a scanning line in First Embodiment.
FIG. 4B shows data extracted by the section extracting unit from the scanning line in FIG. 4A in First Embodiment.

FIG. 4A shows scanning line 401. Section extracting unit 103 judges whether each pixel at positions from 0 to M on the scanning line is a black pixel. FIG. 4B shows section data of scanning line 401. Section extracting unit 103 puts serial section number 402 to each detected section of continuous black pixels, and stores in itself the number with the section's start position 403 and end position 404. Section extracting unit 103 also stores in itself section data on each scanning line which includes serial section number 402, number of sections 405, and serial scanning line number each time it has scanned a scanning line. The section may have only one black pixel as shown in section number 4 in FIG. 4B. Section extracting unit 103 activates array extracting unit 104 after having judged all the pixels in character rows.

Array extracting unit 104, activated by section extracting unit 103, on receiving position data of character rows from character row extracting unit 102, extracts arrays of black pixels in a character row area consisting of areas L1 and L2 as shown in FIG. 3 by linking the sections in y-coordinate direction. In detail, array extracting unit 104 reads serial section number 402, start position 403, and end position 404 for each scanning line in order of the serial scanning line number stored in section extracting unit 103. Then, array extracting unit 104 compares a range of a section of a scanning line with a corresponding range of the preceding scanning line (with a serial number decreased by 1), and regards these sections as parts of a same array if the sections have a common range or ranges differing from each other by 1. Array extracting unit 104 activates array excluding unit 105 after array extracting unit 104 extracts arrays from all the character rows.

Figures 5A, 5B:
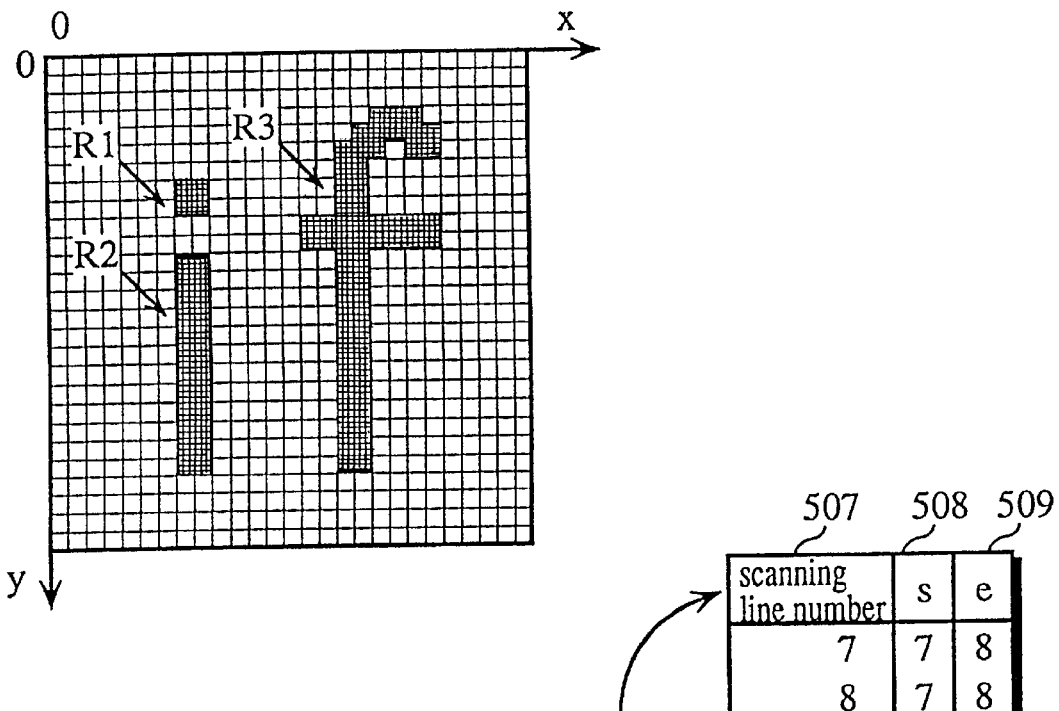
FIG. 5A shows a piece of a text image used in First Embodiment.
FIG. 5B shows data extracted by the section extracting unit from the image in FIG. 5A in First Embodiment.

For example, arrays in the image of FIG. 5A are R1, R2, and R3. Data of each array comprises, as shown in FIG. 5B, array number 501, pixel numbers Sx 502 and Sy 503 respectively of x-coordinate and y-coordinate at upper-left corner point of the circumscribed rectangle of the array, pixel numbers Ex 504 and Ey 505 at lower-right corner point of the same, black pixel area 506, and a line number not shown in the figure. Black pixel area 506 includes scanning line number y507, pixel number s508 at the start of the section in the direction of x-coordinate, pixel number e509 at the end of the section in the direction of x-coordinate.

Array excluding unit 105, on being activated by array extracting unit 104, reads the total number of arrays stored in array extracting unit 104. Array excluding unit 105 checks the arrays one by one in serial number order to see if there are any arrays having any sections at the extended area (L2). If there are, array excluding unit 105 stores in itself the arrays as invalid arrays. After completing the checking, array excluding unit 105 activates array linking unit 106.

In detail, array excluding unit 105 reads values Sy 503 and Ey 505 of each array, and compares the values with sy 209 and ey 210 of a corresponding character row. If Sy<sy or Ey<ey, array excluding unit 105 regards the array as invalid and stores it in itself.

Figure 6A:
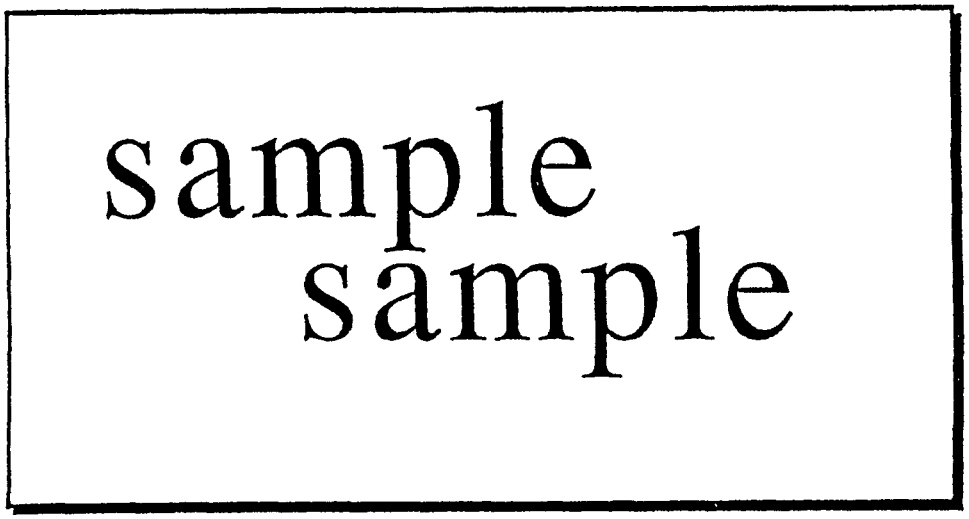
FIG. 6A shows a piece of text image used in First Embodiment.
Figure 6B:
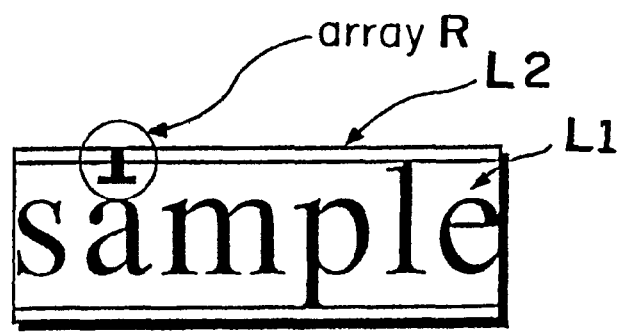
FIG. 6B shows an array excluded by an array excluding unit.

See FIG. 6A and FIG. 6B. As shown in FIG. 6B, area L1 of the second character row, "sample", of the image shown in FIG. 6A includes array R. Array R is a lower part of character "p" of the first character row, "sample", of the same image. In this case, array R is regarded as invalid.

Array linking unit 106 prestores the following rules:
(1) An absolute value for slant of a line connecting each center of two arrays is 2 or higher.
(2) Two arrays (black pixels) have a local distance in between that is equal to or less than the length of a pixel.
(3) Two circumscribed rectangles of arrays have a relation of inclusion in the direction of x-coordinate.
(4) When two circumscribed rectangles of arrays overlap, the x-direction overlap is one half of the side length of a shorter one or more, and the y-direction overlap is one half of the side length of a shorter one or more.
(5) A distance between two circumscribed rectangles of arrays is equal to or less than the length of two pixels, and the ratio of areas of the rectangles is 5 or more.

Array linking unit 106, on being activated by array excluding unit 105, reads array data stored in array extracting unit 104 except array data of the invalid arrays. Array linking unit 106 judges in units of two arrays in order of the serial number whether each pair meets any of the above conditions; if it meets any of the conditions, links the two arrays into an array. Array linking unit 106 stores in itself the new array. Array linking unit 106 has five linking units respectively corresponding to rules (1) to (5).

The above description is now described with formulae, where R(i) and R(j) respectively represent arrays, and pixel number Sx, Sy, Ex, and Ey with (i) or (j) respectively corresponds to R(i) or R(j).

The first linking unit, corresponding to rule (1), obtains centers (xi,yi) and (xj,yj) of rectangles r(i) and r(j) of arrays R(i) and R(j) by Formula (1).

Formula (1):

$$x = \frac{Ex - Sx}{2}$$

$$y = \frac{Ey - Sy}{2}$$

The first linking unit, then, obtains slant K1 of a line connecting two obtained centers by Formula (2).

Formula (2):

$$K1 = \frac{yi - yj}{xi - xj}$$

The first linking unit judges whether the obtained value, K1, is not less than a threshold value, "2": if not, stores a new array R(i) which is a combination of arrays R(i) and R(j), and the R(j) is regarded as invalid; and if less than the value, stores arrays R(i) and R(j) stored in array extracting unit 104 as they are, and activates the second linking unit.

The second linking unit, corresponding to rule (2), checks to see if two arrays, R(i) and R(j), have common x-coordinate-direction scanning lines. If they have, as shown in FIG. 7B, value K2 is obtained by substituting pixel numbers of the extracted scanning lines for s(i), e(i), s(j), and e(j) in Formula (3).

Formula (3):

$$K2 = |s(i) - (e(j)+1)| \text{ or}$$

$$K2=|s(j)-(e(i)+1)|$$

The second linking unit also checks to see if these arrays have common y-coordinate-direction scanning lines for a range from e(i) to s(j). If they have, value K2 is obtained by substituting the scanning line numbers for all the combinations for y(i) and y(j) in Formula (4), and the minimum value of the values for K2 is obtained.

Formula (4):

$$K2=|y(i)-y(j)|$$

The second linking unit judges whether value K2 obtained by Formula (3) or (4) is not more than a threshold value, "1": if not, stores a new array R(i) which is a combination of arrays R(i) and R(j), and the R(j) is regarded as invalid; and if more than the value, stores arrays R(i) and R(j) stored in array extracting unit 104 as they are, and activates the third linking unit.

In FIG. 7B, since the distance at point B between arrays R(i) and R(j) is equal to the length of a pixel, arrays R(i) and R(j) are linked together and regarded as R(i).

Figure 7A:
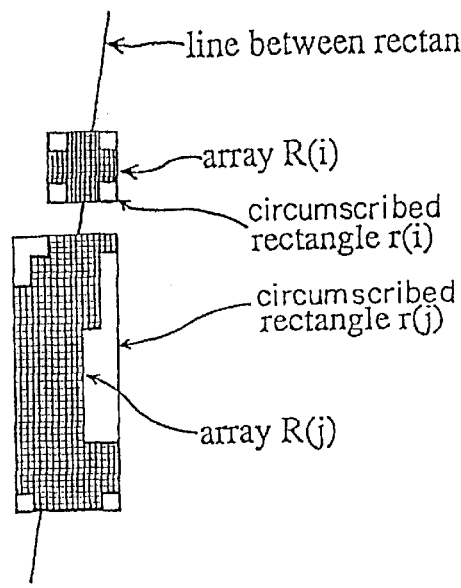
FIG. 7A shows arrays linked by the array linking unit in First Embodiment.
Figure 7D:
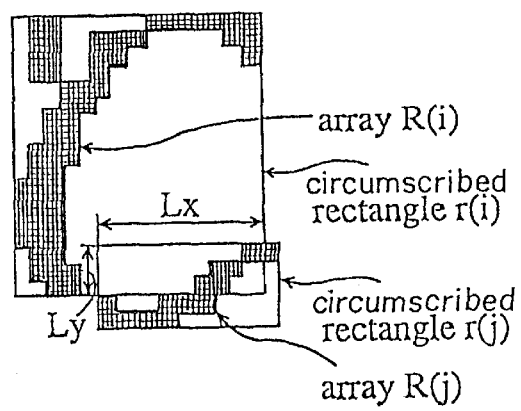
FIG. 7D shows arrays linked by the array linking unit in First Embodiment.
Figure 7B:
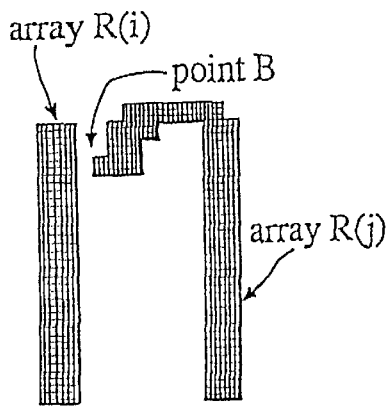
FIG. 7B shows arrays linked by the array linking unit in First Embodiment.
Figure 7E:
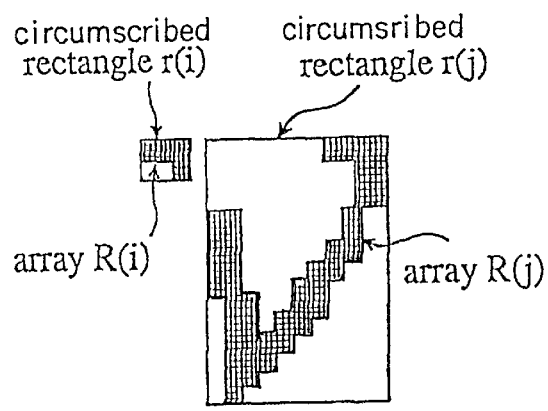
FIG. 7E shows arrays linked by the array linking unit in First Embodiment.
Figure 7C:
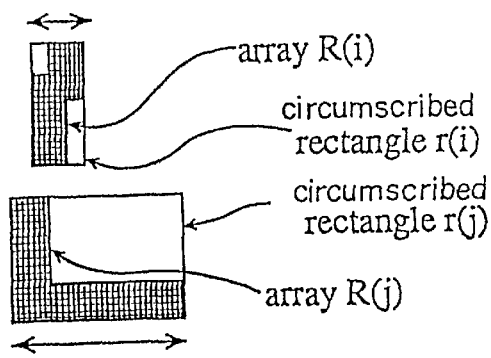
FIG. 7C shows arrays linked by the array linking unit in First Embodiment.

The third linking unit, corresponding to rule (3) judges whether circimscribed-rectangles r(i) and r(j) of arrays R(i) and R(j), as shown in FIG. 7C, have a relation of inclusion in x-coordinate direction by judging whether either of conditions of Formulae (5) and (6) is satisfied.

Formula (5):

$$Sx(i) \leq Sx(j) \text{ and } Ex(j) \leq Ex(i)$$

Formula (6):

$$Sx(j) \leq Sx(i) \text{ and } Ex(i) \leq Ex(j)$$

If either of the above conditions is satisfied, the third linking unit stores a new array R(i) which is linked arrays R(i) and R(j); and if neither of the conditions is satisfied, stores arrays R(i) and R(j) stored in array extracting unit 104 as they are, and activates the fourth linking unit.

The fourth linking unit, corresponding to rule (4), obtains lengths Lx and Ly, which represent the size of an overlapping area of rectangle r(i) of array R(i) and rectangle r(j) of array R(j) by Formulae (7) and (8).

Formula (7):

$$Lx=Ex(i)+1-Sx(j) \text{ or}$$

$$Lx=Ex(j)+1-Sx(i)$$

Formula (8):

$$Ly=Ey(i)+1-Sy(j) \text{ or}$$

$$Ly=Ey(j)+1-Sy(i)$$

For the rectangles in FIG. 7D, the first formulae of Formula (7) and Formula (8) are used.

Also, the fourth linking unit obtains the x-direction lengths, LX(i) and LX(j), of circumscribed rectangles r(i) and r(j) by Formula (9), and the shorter one of these lengths is denoted by LXS.

Formula (9):

$$LX(i)=Ex(i)+1-Sx(i)$$

$$LX(j)=Ex(j)+1-Sx(j)$$

If LX(i)−LX(j)≧0, then LXS=LX(j).
If LX(i)−LX(j)≧0, then LXS=LX(i).

The fourth linking unit obtains a ratio of Lx to LXS, and judges whether the value is greater than threshold value "½" by Formula (10).

Formula (10):

$$\frac{Lx}{LXS} \geq \frac{1}{2}$$

Also, the fourth linking unit obtains the y-direction lengths, LY(i) and LY(j), of circumscribed rectangles r(i) and r(j) by Formula (11), and the shorter one of these lengths is denoted by LYS.

Formula (11):

$$LY(i)=Ey(i)+1-Sy(i)$$

$$LY(j)=Ey(j)+1-Sy(j)$$

If LY(i)−LY(j)≧0, then LYS=LY(j).
If LY(i)−LY(j)<0, then LYS=LY(i).

The fourth linking unit obtains a ratio of Ly to LYS, and judges whether the value is greater than threshold value "½" by Formula (12).

Formula (12):

$$\frac{Ly}{LYS} \geq \frac{1}{2}$$

The fourth linking unit judges whether both conditions of Formulae (10) and (12) are satisfied: if satisfied, stores a new array R(i) which is linked arrays R(i) and R(j); and if either of the conditions is not satisfied, stores arrays R(i) and R(j) stored in array extracting unit 104 as they are, and activates the fifth linking unit.

The fifth linking unit, corresponding to rule (5), obtains distance D between rectangles r(i) and r(j) of arrays R(i) and R(j) by Formulae (13) and (14).

Formula (13):

$$D=Sx(i)-(Ex(j)+1) \text{ or}$$

$$D=Sx(j)-(Ex(i)+1)$$

Formula (14):

$$D=Sy(i)-(Ey(j)+1) \text{ or}$$

$$D=Sy(j)-(Ey(i)+1)$$

In FIG. 7 E, value D is obtained by the second formula of Formula (13).

Also, the fifth linking unit obtains areas S(i) and S(j) of circumscribed rectangles r(i) and r(j) by Formula (15).

Formula (15):

$$S(i)=(Ex(i)+1-(Sx(i)\ (Ey(i)+1-Sy(i)))$$

$$S(j)=(Ex(j)+1-(Sx(j)\ (Ey(j)+1-Sy(j)))$$

Then, ratio Rs of area S(i) to area S(j) is obtained by formula:

$$Rs=S(i)/S(j).$$

The fifth linking unit stores a new array R(i) which is linked arrays R(i) and R(j) if D is not more than threshold value "2" and Rs is not less than threshold value "5" or not more than ⅕; and stores arrays R(i) and R(j) stored in array extracting unit 104 as they are if D is more than threshold value "2" or Rs is more than ⅕ and less than threshold value Character extracting unit 107, on being activated by array linking unit 106, outputs the text image sent from inputting unit 101 and data of array R, namely data of a character, stored in array linking unit 106.

Now, the operation of the present apparatus of First Embodiment is described with reference to figures.

FIG. 8A to FIG. 8D are flowcharts of character row extracting unit 102.

When an operator lays a text on the apparatus, inputting unit 101 is activated. Inputting unit 101 sends the text image to character row extracting unit 102.

Character row extracting unit 102 reads the horizontal length, M, and the vertical length, N, of the text (S802), then sets both counter i and counter j to zero (S804), and also sets parameter B(j), which denotes the number of black-pixels in a scanning line in the direction of x-coordinate, to zero (S806).Character row extracting unit 102 judges whether pixel (i,j) is a black pixel, namely "1" (S808): if it is, adds "1" to parameter B(j) (S810); and if it is not, adds "1" to counter i (S812).Character row extracting unit 102 judges whether the value of counter i is equal to M (S814): if it is not, returns to S808; and if it is, stores the value of parameter B(j) (S815), and adds "1" to counter j. Character row extracting unit 102 judges whether the value of counter j is equal to N (S818): if it is not, returns to S806; and if it is, sets counter k, counter j, and a flag to zero (S820).

Then, character row extracting unit 102 reads the stored value of parameter B(j) and judges whether the value is positive (S822). If it is, character row extracting unit 102 judges whether the flag value is "0" (S824): if it is, substitutes the value of counter j for parameter S(k), stores parameter S(k), sets the flag to "1" (S826), and returns to S832; and if it is not, adds "1" to counter j (S832).

If the value is not positive at S822, character row extracting unit 102 judges whether the flag value is "0" (S828): if it is, moves to S832; and if it is not, substitutes the value of counter j minus "1" for parameter E(k), stores parameter E(k), sets the flag to "0" (S830), adds "1" to counter k (S830), and moves to S832. Then, character row extracting unit 102 judges whether the value of counter j is equal to N (S834): if it is not, returns to S822; and if it is, sets counter 1 to "0" (S836).

Character row extracting unit 102 sets counter m to zero, reads parameter S(k) stored at S826, substitutes parameter S(l) for counter j, and sets the flag to zero (S838). Then, character row extracting unit 102 reads parameter B(j) stored at S815, and judges whether parameter B(j) is less than threshold value T (S840). If the value is less than T, character row extracting unit 102 judges whether the flag is "0" (S842): if it is, substitutes the value of counter j for parameter PS(m) and stores parameter PS(m), sets the flag to "1" (S844), and moves to S850; and if it is not, adds "1" to counter j (S850). If the value is T or more at S840, character row extracting unit 102 judges whether the flag is "0" (S846); if it is, moves to S850; and if it is not, substitutes the value of counter j minus "1" for parameter PE(m), stores parameter PE(m), sets the flag to "0", adds "1" to counter m (S848), and moves to S850.

Character row extracting unit 102 judges whether the value of counter j is not more than parameter E(l) (S852): if it is not, moves to S840; and if it is, divides a section from S(l) to E(l) by executing S860 to S870 (S854).

Then, character row extracting unit 102 adds "1" to counter 1 (S856), judges whether the value of counter 1 is equal to that of counter k (S858): if it is, ends the process; and if it is not, returns to S838.

Figure 8A:
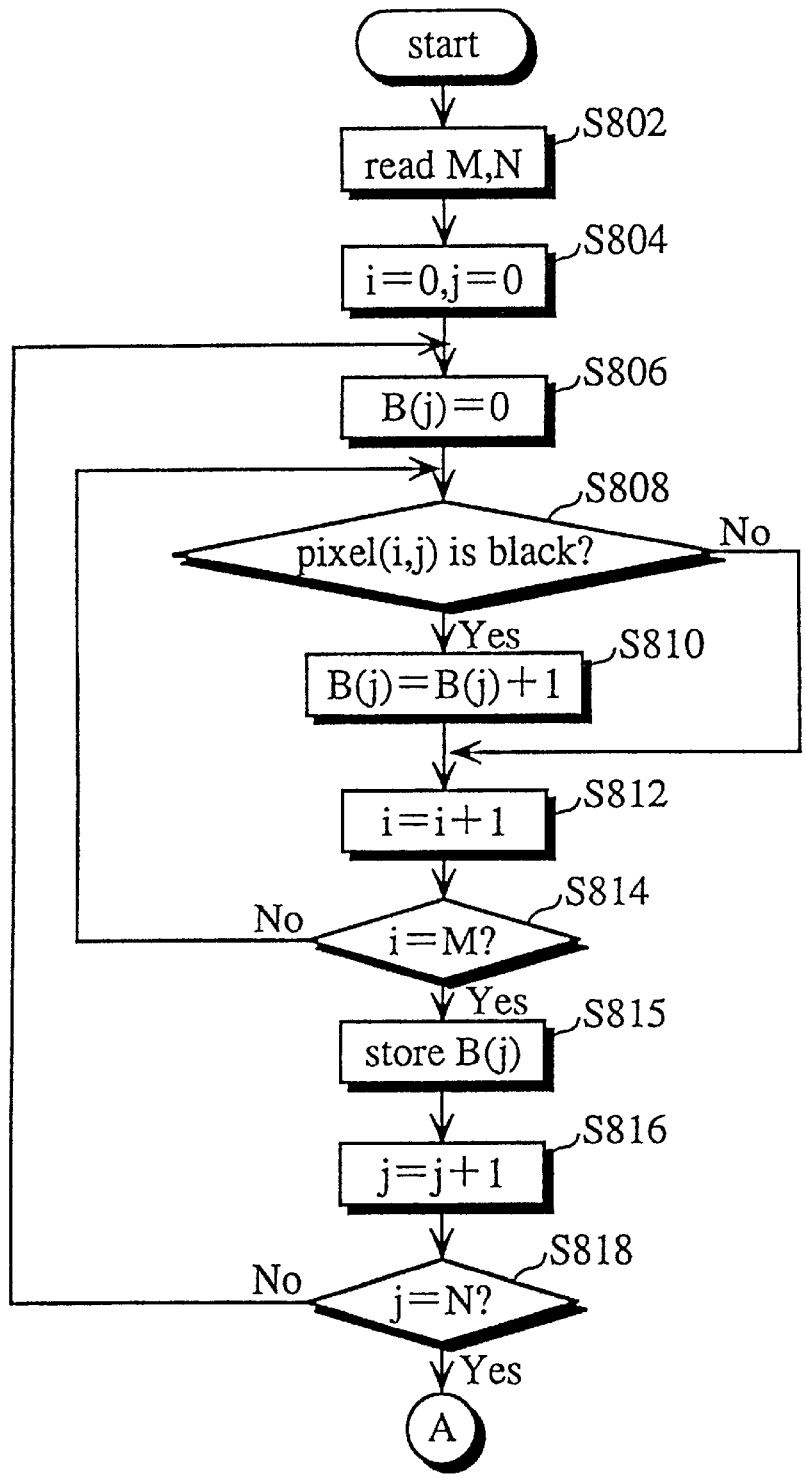
FIGS. 8A, 8B, 8C, and 8D are flowcharts showing the operation of a character row extracting unit in First Embodiment.
Figure 8B:
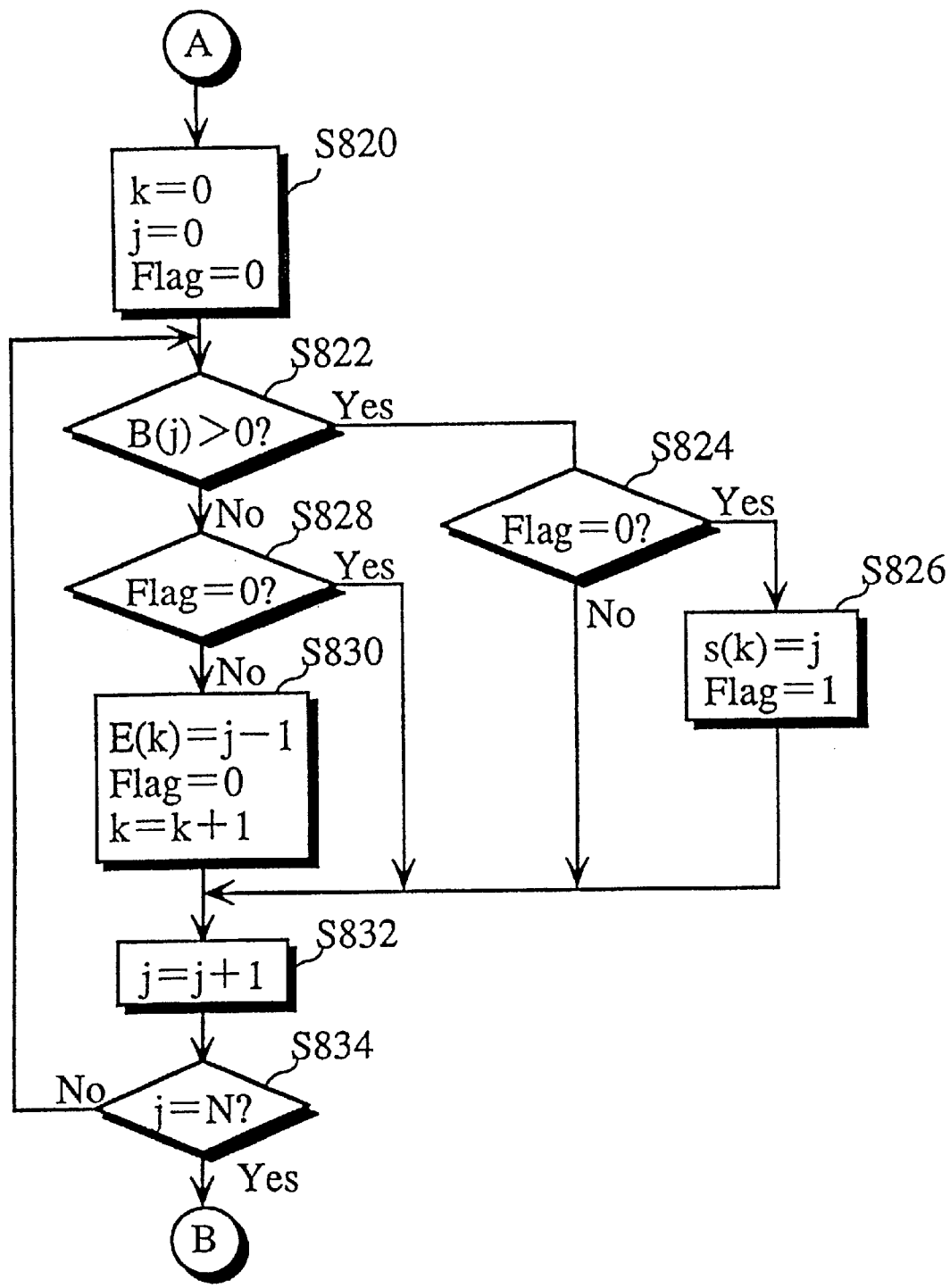
Figure 8C:
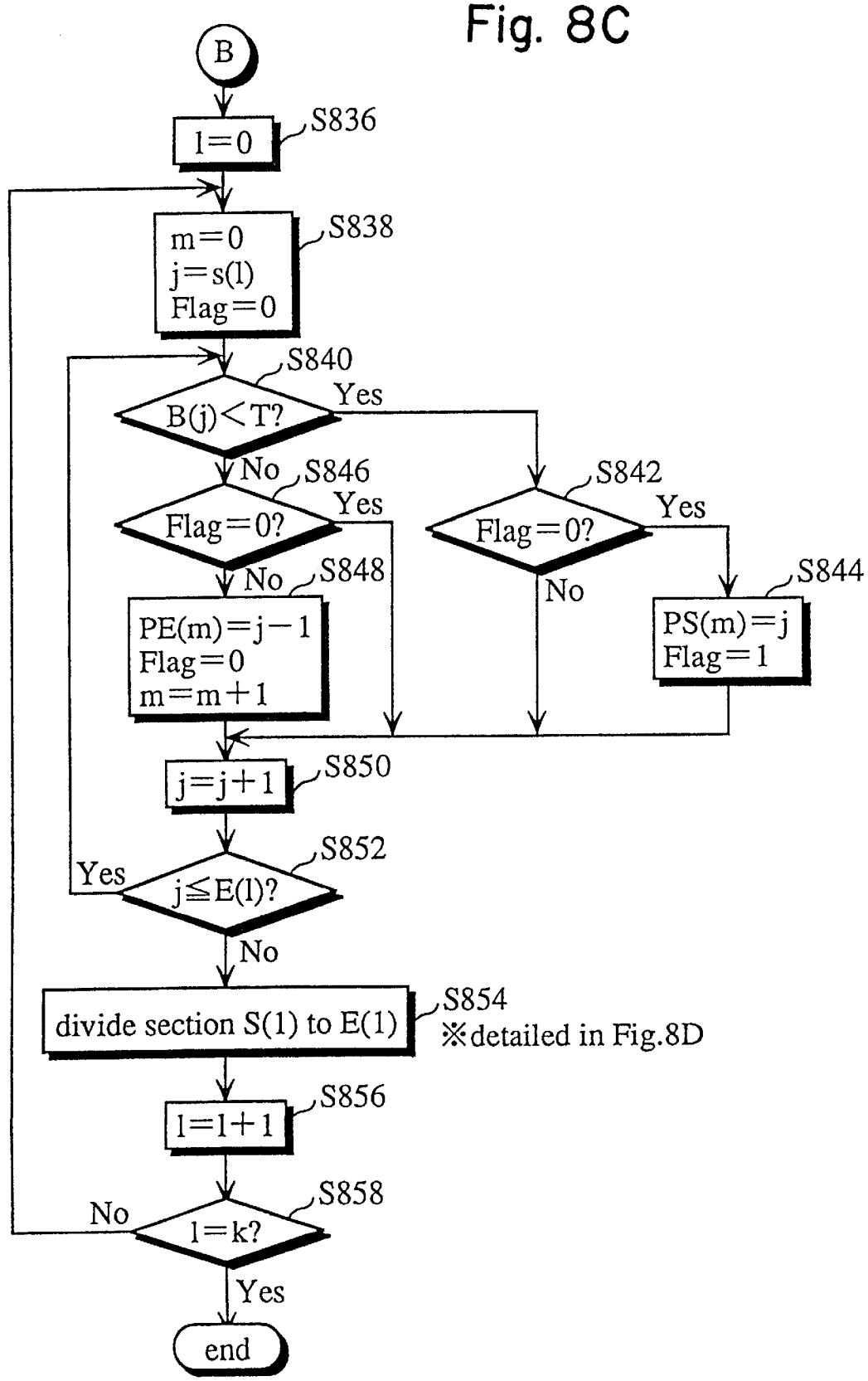
Figure 8D:
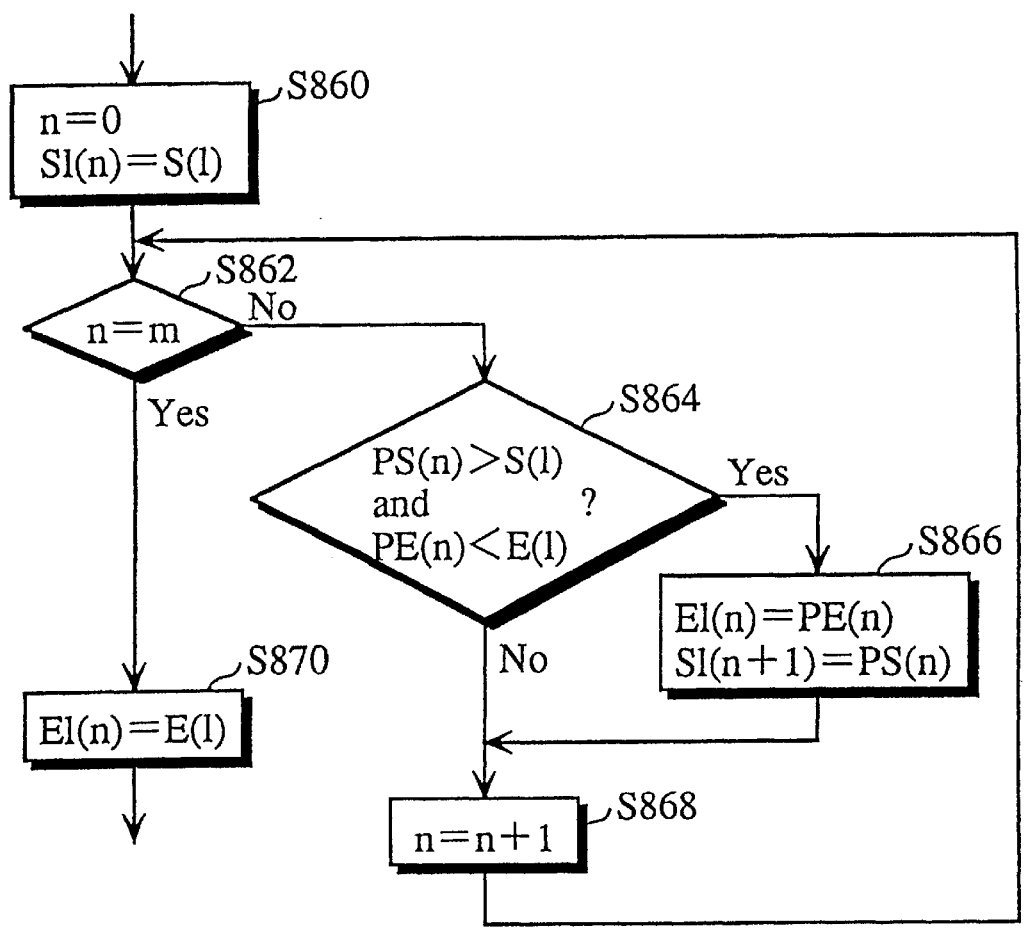

Here, the detailed step S854 is described with reference to FIG. 8D. Character row extracting unit 102 sets counter n to zero, reads parameter S(k) stored at S826, substitutes parameter S(l) for parameter Sl(n), and stores parameter Sl(n) (S860). Character row extracting unit 102 judges whether the value of counter n is equal to that of counter m (S862). If it is not equal to the value, character row extracting unit 102 reads parameters PS(m) and PE(m), judges whether parameter PS(n) is more than parameter S(l) and parameter PE(n) is less than parameter E(l) (S864): if this condition is satisfied, substitutes parameter PE(n) for parameter El(n), stores parameter El(n), substitutes parameter PS(n) for parameter Sl(n+1), stores parameter Sl(n+1) (S866), and moves to S868; and if the condition is not satisfied, adds "1" to counter n (S868), and returns to S862. If the value of counter n is equal to that of counter m at S862, character row extracting unit 102 substitutes parameter E(l) for parameter El(n) and stores parameter El(n) (S870).

Now, the operation of section extracting unit 103 is explained focusing on how it processes a scanning line.

Figure 9:
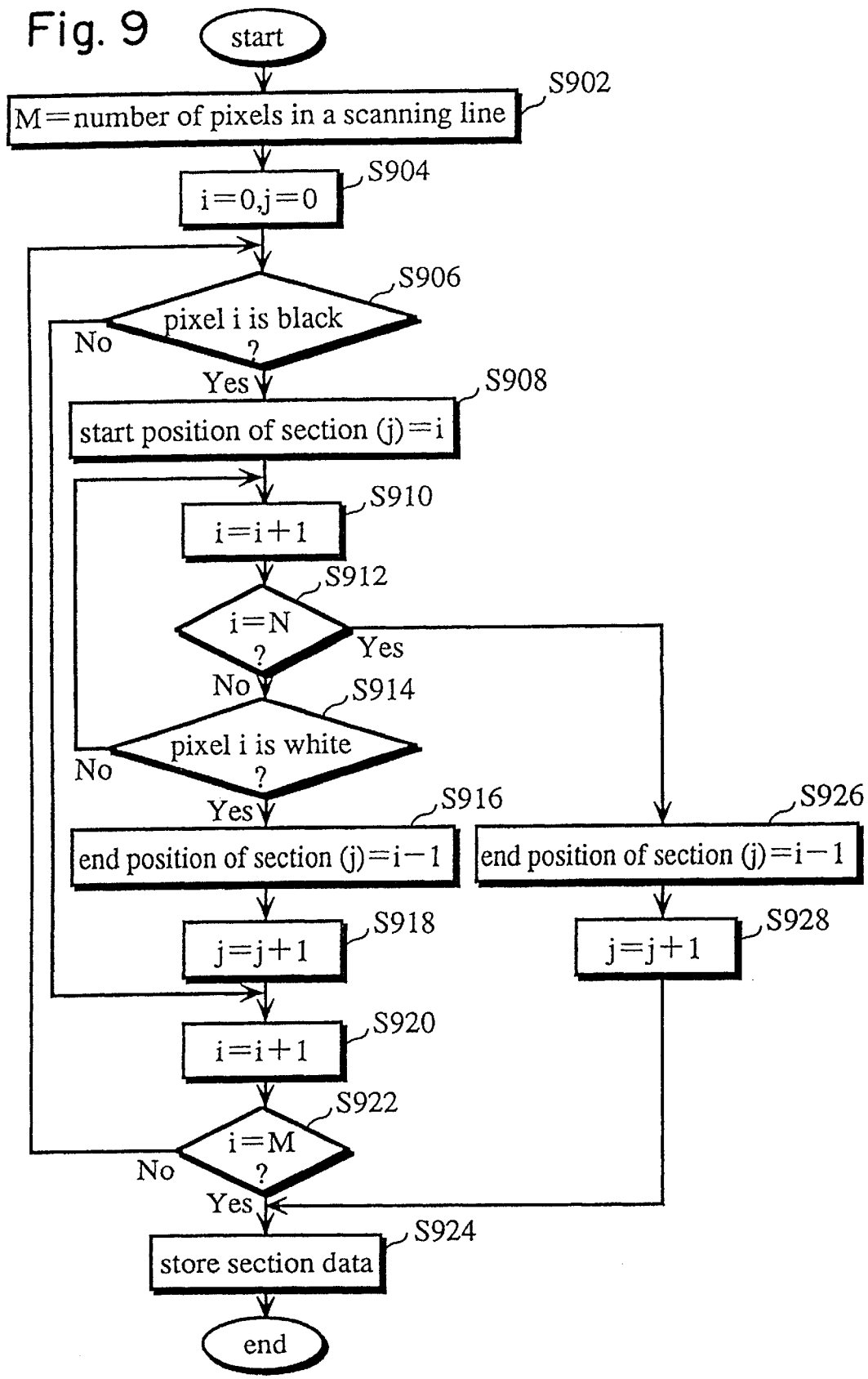
FIG. 9 is a flowchart showing the operation of the section extracting unit in First Embodiment.

FIG. 9 is a flowchart describing the process of section extracting unit 103.

Section extracting unit 103 stores M, the horizontal length of the text sent from character row extracting unit 102, as the number of pixels in a scanning line (S902), sets counter i, which is a serial pixel number, and counter j, which is a serial section number, to zero (S904).

On receiving start position sy and end position ey of y-coordinate direction of a character row from character row extracting unit 102, section extracting unit 103 receives a piece of the text image ranging from sy to ey and another piece ranging from sy−1 to ey+1 from inputting unit 101. Both pieces consist of y-coordinate direction scanning lines.

Section extracting unit 103 judges whether pixel i is a black pixel (S906): if it is, stores section number j and start position i (S908); and if it is not, moves to S920. Section extracting unit 103, then, adds "1" to counter i (S910), and judges whether the value of counter i is equal to M (S912). If not, the unit judges whether pixel i is a white pixel (S914): if not, returns to S910; and if it is, stores section number j and end position i−1 (S916). Then, section extracting unit 103 adds "1" to counter j (S918), adds "1" to counter i (S920), and judges whether the value of counter i is equal to M (S922): if not, returns to S906; and if it is, stores scanning line number, section number, start and end positions of the section, the number of sections (j), as section data (S924).

If the value of counter i is equal to M at S912, section extracting unit 103 stores section number j and end position i−1 (S926), adds "1" to counter j (S928), and moves to S924.

Note that the reason why "1" is added to counter j at S918 and S928 is that counter j indicates section number and the value plus "1" indicates the number of sections.

Sections of black pixels in a scanning line are obtained through the above process, and the process is repeated for all the character rows in the text.

Figure 10B:
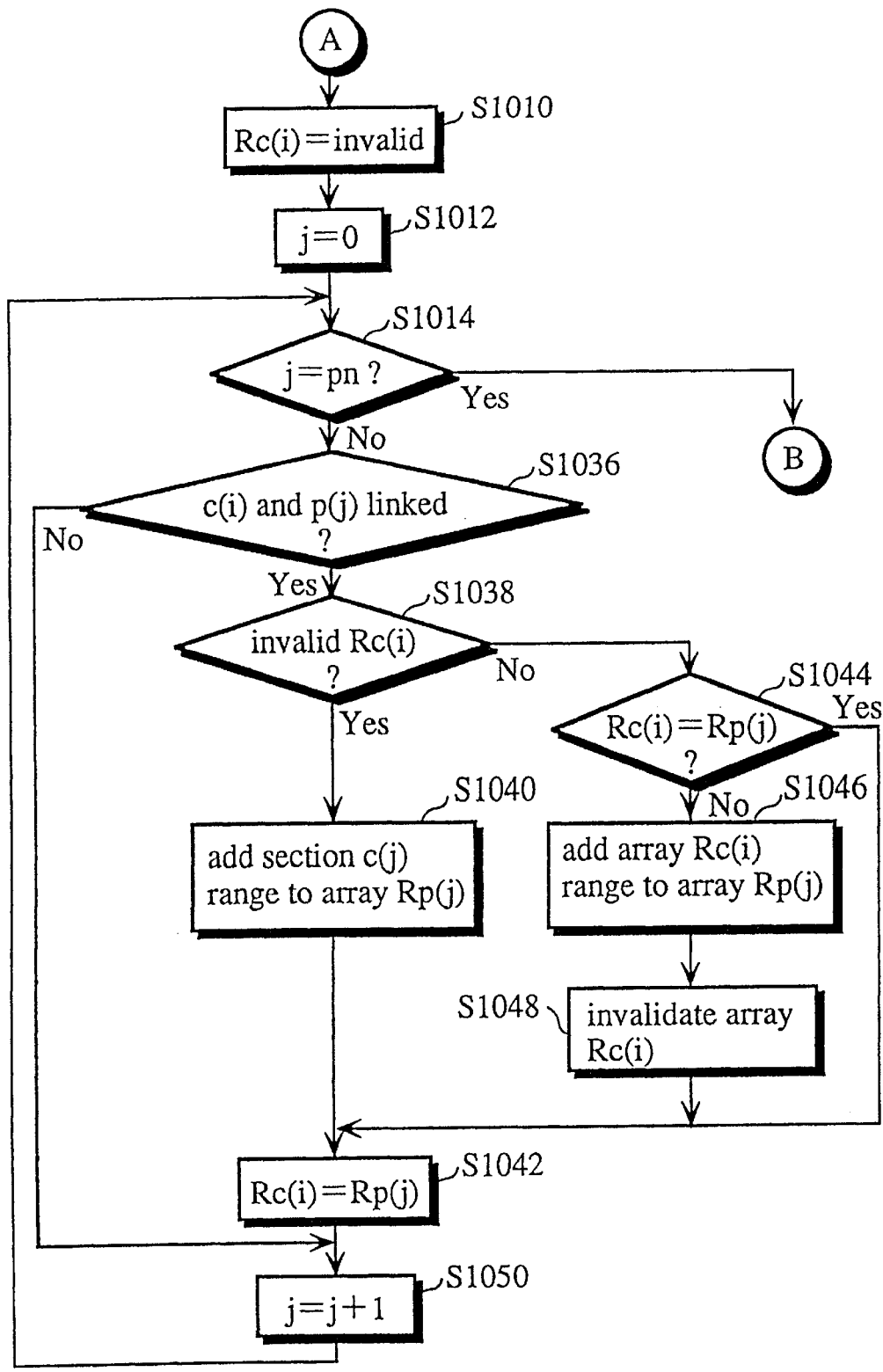
Figure 10C:
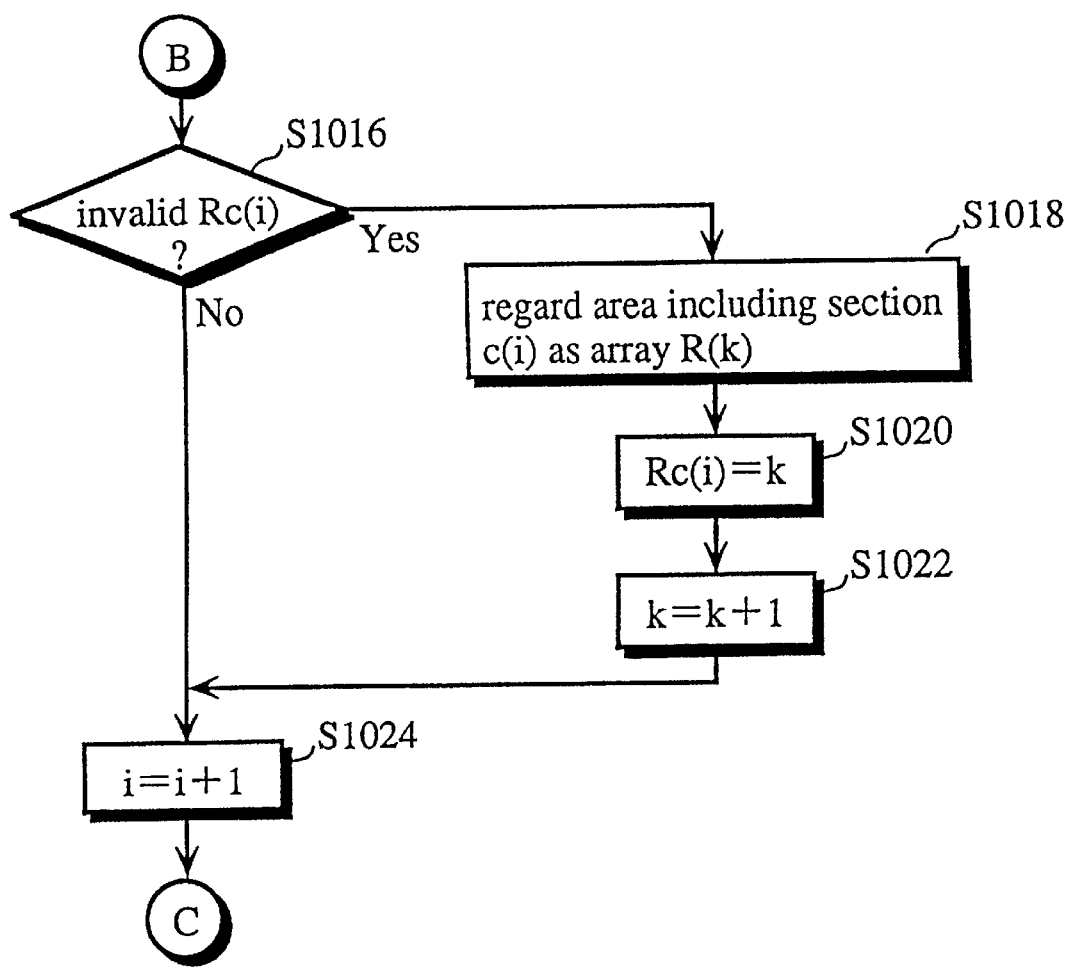

Now, the operation of array extracting unit 104 is described with reference to flowcharts of FIG. 10A, FIG. 10B, and FIG. 10C. The description deals with the process for one character row, and the process is repeated as many as the number of character rows in the text.

The signs used in the flowcharts denote as follows. "cn" denotes the total number of sections in a scanning line, and "pn" the total number of sections in the preceding scanning line (with value y smaller than that of the present scanning line by one). A range of a section in the target scanning line is represented by p(0) to p(pn−1), and a range of a section in the preceding scanning line c(0) to c(cn−1). Rp(i) denotes an array which includes section p(i); and Rc(i) an array which includes section c(i).

The signs used for specifying array R denote as follows. Sx and Sy respectively denote pixel numbers in the directions of x-coordinate and y-coordinate at the upper-left corner of the circumscribed rectangle of the array. Ex and Ey respectively denote pixel numbers in the directions of x-coordinate and y-coordinate at the lower-right corner of the circumscribed rectangle of the array. s and e respectively denote the start and end positions of black pixels in each scanning line. Note that when array data is updated, values of Sx, Sy, Ex, Ey, s, and y are also updated.

Array extracting unit 104, on being activated by section extracting unit 103, reads start scanning line number sy and end scanning line number ey which indicate the range of a character row specified by the character row number. sy and ey are stored in character row extracting unit 102. Then, array extracting unit 104 sets variable y to sy−1, sets counter k which is an array number to zero, and variable pn which is a total number of sections to zero (S1002). Array extracting unit 104, then, reads section data of scanning line number y which is stored in section extracting unit 103. Array extracting unit 104 extracts section data of scanning line y, substitutes the number of sections for variable cn, stores the start and end pixel numbers of a section specified by section numbers c(0) to c(cn−1) (S1004). Array extracting unit 104 sets counter i which is a section number to zero (S1006), and judges whether the value of counter i is equal to variable cn (S1008): if it is not, sets number Rc(i) of array R to "−1" indicating invalidness (S1010), sets counter j to zero (S1012), and judges whether the value of counter j is equal to pn (S1014). If equal, array extracting unit 104 judges whether the value of Rc(i) is "−1" (S1016): if it is, regards an area including a section of section number c(i) as array R(k) (S1018), stores data of the array, sets array number Rc(i) of array R(k) to the value of counter k (S1020), adds "1" to counter k (S1022), adds "1" to counter i (S1024), and returns to S1008; and if it is not at S1016, moves to S1024.

If the value of counter i is equal to variable cn at S1008, array extracting unit 104 substitutes variable cn for variable pn to increment the scanning line number of the target scanning line by "1" (S1026), updates section data from p(0) to p(cn−1) to c(0) to c(cn−1) (S1028), updates data of array from variable Rp(0) to Rp(cn−1) to variable Rc(0) to Rc(cn−1) (S1030), and adds "1" to variable y (S1032).

Array extracting unit 104 judges whether the value of variable y is equal to ey+2 (S1034): if it is not, returns to S1004; and if it is, ends processing a character row.

If the value of counter j is not equal to pn at S1014, array extracting unit 104 judges whether section c(i) connects to section p(j). More specifically, array extracting unit 104 compares section c(i) with section p(j) on their ranges specified by the start and end pixel numbers, and judges that section c(i) connects to section p(j) if their ranges share same values or if they differ from each other by 1 (S1036).

When it is judged that section c(i) connects to section p(j), array extracting unit 104 judges whether number Rc(i) of array R is "−1" (S1038): if it is, adds the range of section c(j) to array Rp(j), updates the data of array Rp(j) and stores the data as done in S1018 (S1040), and sets array Rc(j) to the value of array Rp(j) (S1042).

If it is judged that value for array Rc(i) is not "−1" at S1038, array extracting unit 104 judges whether array Rc(i) is equal to array Rp(i) (S1044): if equal, moves to S1042; and if not, adds the range of array Rc(i) to array Rp(j), updates the data of array Rp(j) and stores the data (S1046), invalidates array Rc(i) by setting it to "−1" (S1048), and moves to S1042. Then, array extracting unit adds 1 to counter j (S1050), and returns to S1014.

When it is judged that section c(i) does not connect to section p(j), array extracting unit 104 moves to S1050.

Array extracting unit 104 activates array excluding unit 105 after completing the above process for all the character rows in the text image.

Figure 11:
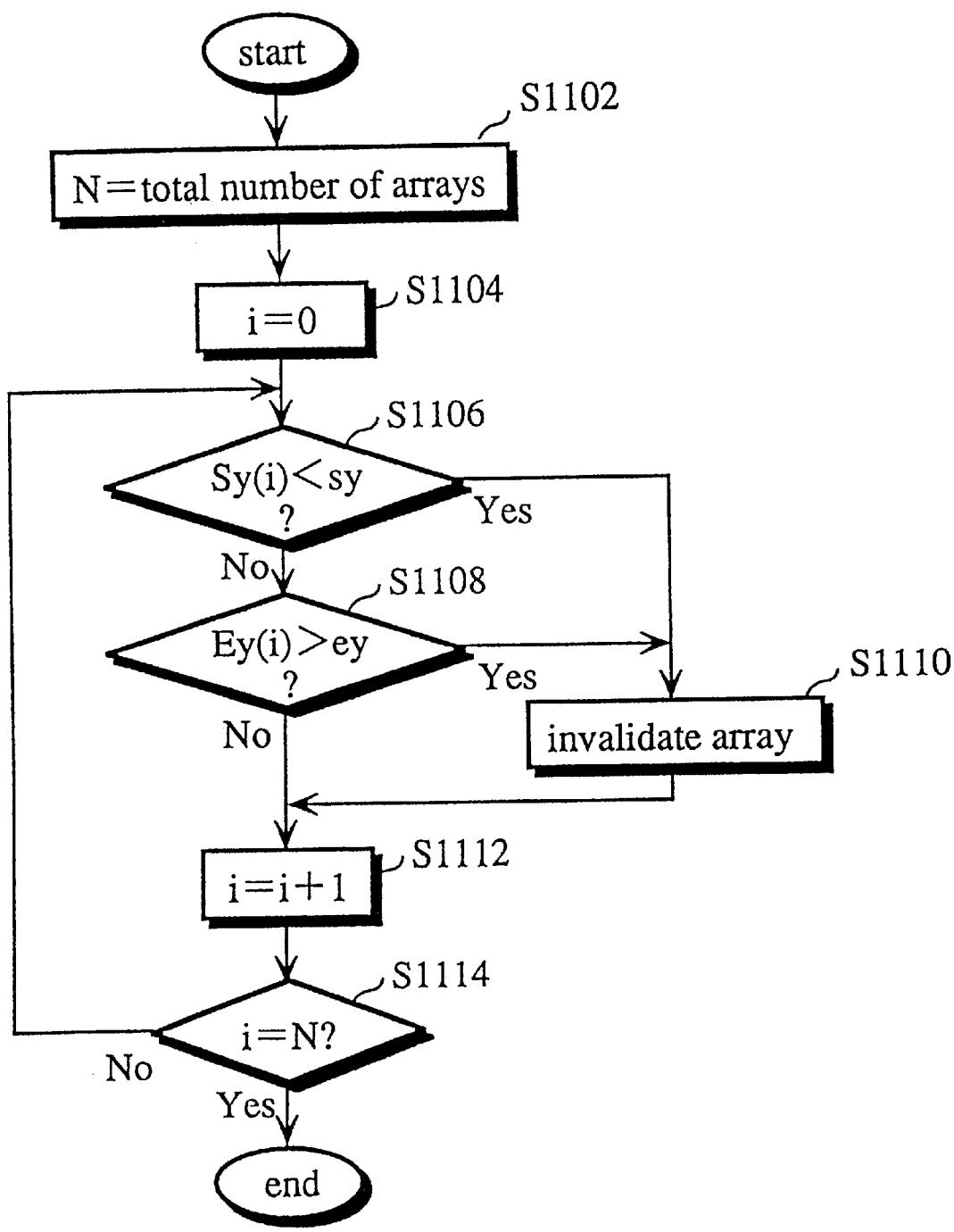
FIG. 11 is a flowchart showing the operation of an array excluding unit in First Embodiment.

Now, the operation of array excluding unit 105 is explained with reference to FIG. 11. The flowchart of FIG. 11 deals with the process for one character row, and the process is repeated as many as the number of character rows in the text.

Array excluding unit 105, on being activated by array extracting unit 104, reads an array number Rc(i) from array extracting unit 104, sets variable N to the read value as a total number of arrays (S1102), and sets counter i to zero (S1104).

Then, array excluding unit 105 reads pixel number Sy(i) of array R(i), which is selected according to array number Rc(i) in order from 0 to greater, from array extracting unit 104, and judges whether the read pixel number is smaller than start position sy of a character row sent from character row extracting unit 102 (S1106): if smaller, invalidates array R(i), stores the invalidated array R(i) (S1110), and moves to S1112; and if not, reads pixel number Ey(i), and judges whether Ey(i) is greater than end position ey of a character row sent from character row extracting unit 102 (S1108). If greater, array excluding unit 105 moves to S1110; and if not, adds 1 to counter i (S1112), then, judges whether counter i is equal to N (S1114). If equal, array excluding unit 105 ends the process; and if not, returns to S1106.

Array excluding unit 105 activates array linking unit 106 after repeating the above processes for all the character rows in the text image.

Array linking unit 106, on being activated by array excluding unit 105, subtracts the value of array R(i) of a character row from value N of the same character row set by array excluding unit 105, sets variable N to the remainder, and set counter i to zero (S1202). Then, array linking unit 106 judges whether array excluding unit 105 has judged array R(i) to be invalid (S1204): if not, sets counter j to "i+1" (S1206); and if judged, moves to S1218.

Then, array linking unit 106 judges whether array R(j) is valid (S1208): if valid, moves to S1210; and if not, adds 1 to counter j (S1214). Then, at S1210, array linking unit 106 judges whether to link array R(i) to array R(j): if should link, links array R(i) to array R(j) and regards it as array R(i), and invalidates array R(j). Array linking unit 106 stores the array R(i) (S1212), and moves to S1214.

Array linking unit 106 judges whether counter j is equal to N (S1216): if not, returns to S1208; and if equal, adds 1 to counter i (S1218), and judges whether counter i is equal to variable N−1 (S1220). If not, array linking unit 106 returns to S1204; and if equal, ends the process.

Figure 12A:
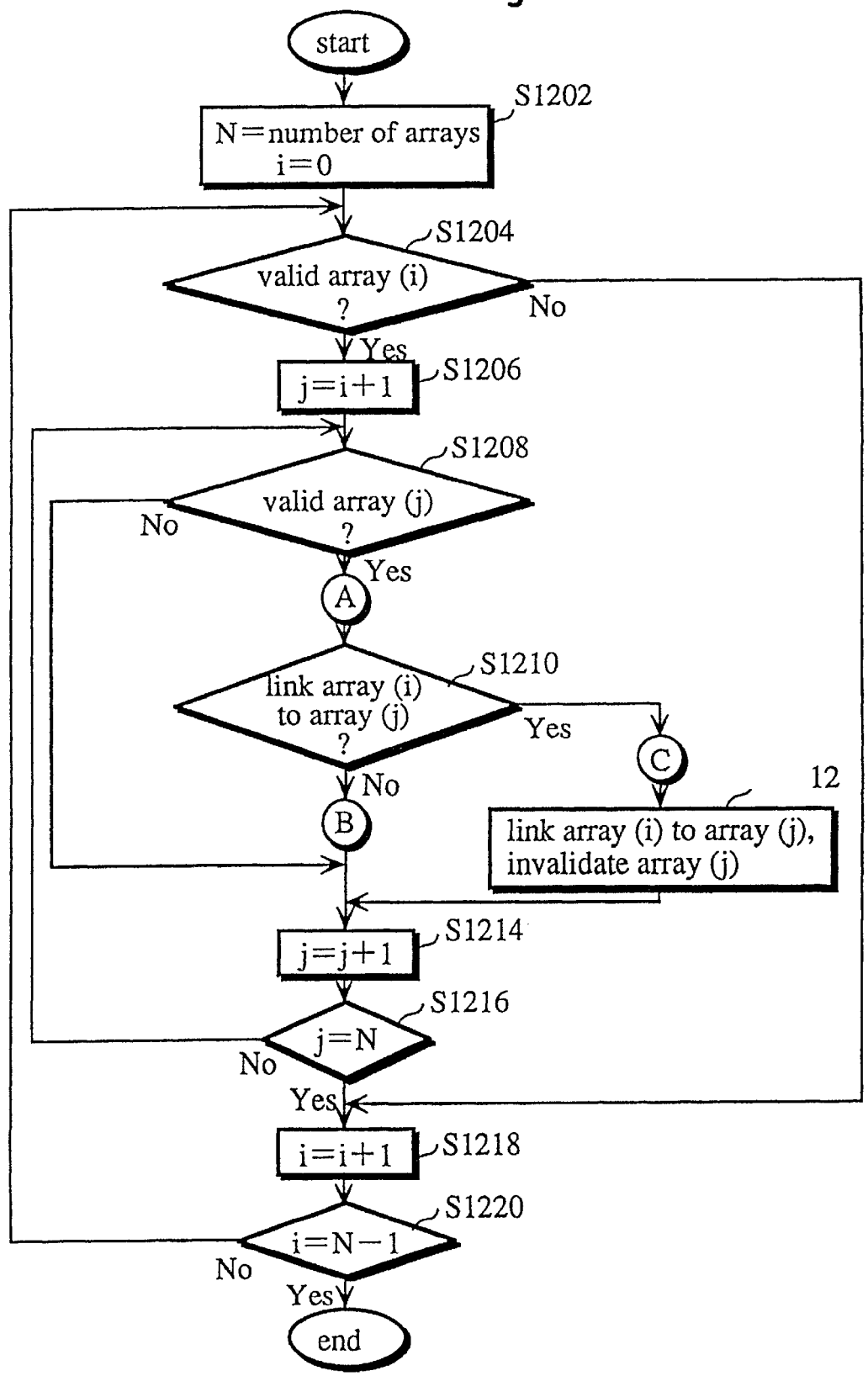
FIGS. 12A and 12B are flowcharts showing the operation of the array linking unit in First Embodiment.
Figure 12B:
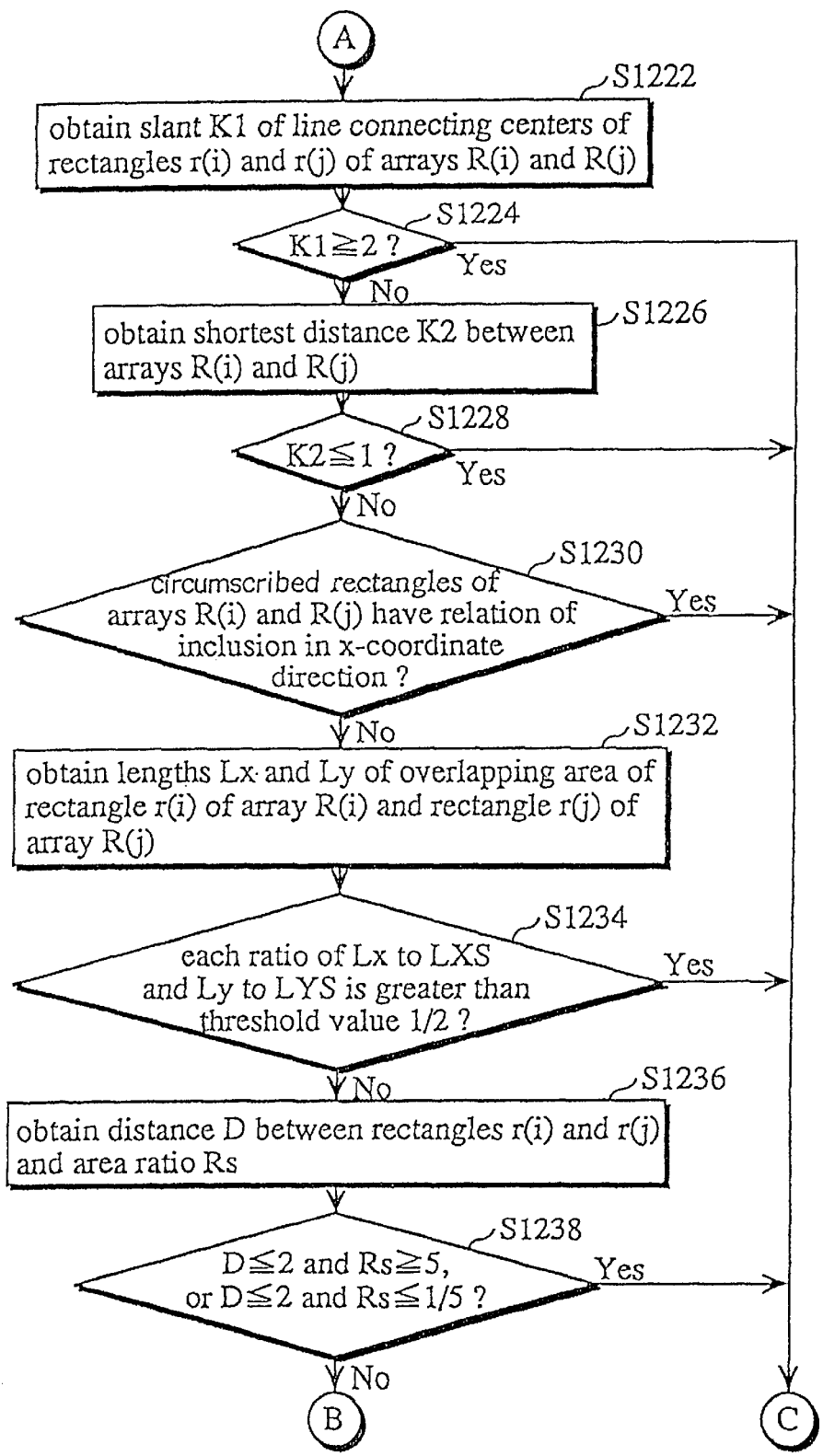

Now, S1210 is explained in detail with reference to FIG. 12B.

The first linking unit obtains slant K1 of a line connecting centers of rectangles r(i) and r(j) of arrays R(i) and R(j) (S1222), and judges whether K1≧2 (S1224): if K1≧2, moves to S1212; and if K1<2, activates the second linking unit.

The second linking unit obtains the shortest distance, (K2, between arrays R(i) and R(j) (S1226), judges whether K2≦1 (S1228): if K2≦1, moves to S1212; and if K2>1, activates the third linking unit.

The third linking unit judges whether circumscribed rectangles of arrays R(i) and R(j) have a relation of inclusion in x-coordinate direction (S1230): if they have, moves to S1212; and if not, activates the fourth linking unit.

The fourth linking unit obtains lengths Lx and Ly of an overlapping area of rectangle r(i) of array R(i) and rectangle r(j) of array R(j) (S1232), then, judges whether each ratio of Lx to LXS and Ly to LYS is greater than a threshold value, ½, where LXS and LYS are shorter lengths of rectangles r(i) and r(j) (S1234): if both are greater than ½, moves to S1212; and if otherwise, activates the fifth linking unit.

The fifth linking unit obtains the shortest distance between rectangles r(i) and r(j), also obtains area ratio Rs (S1236), and judges whether D≦2 and Rs≧5, or D≦2 and Rs≦⅕ (S1238): if D≦2 and Rs≧5, or if D≦2 and Rs≦⅕, moves to S1212; and otherwise, moves to S1214.

<Second Embodiment>

Figure 13:
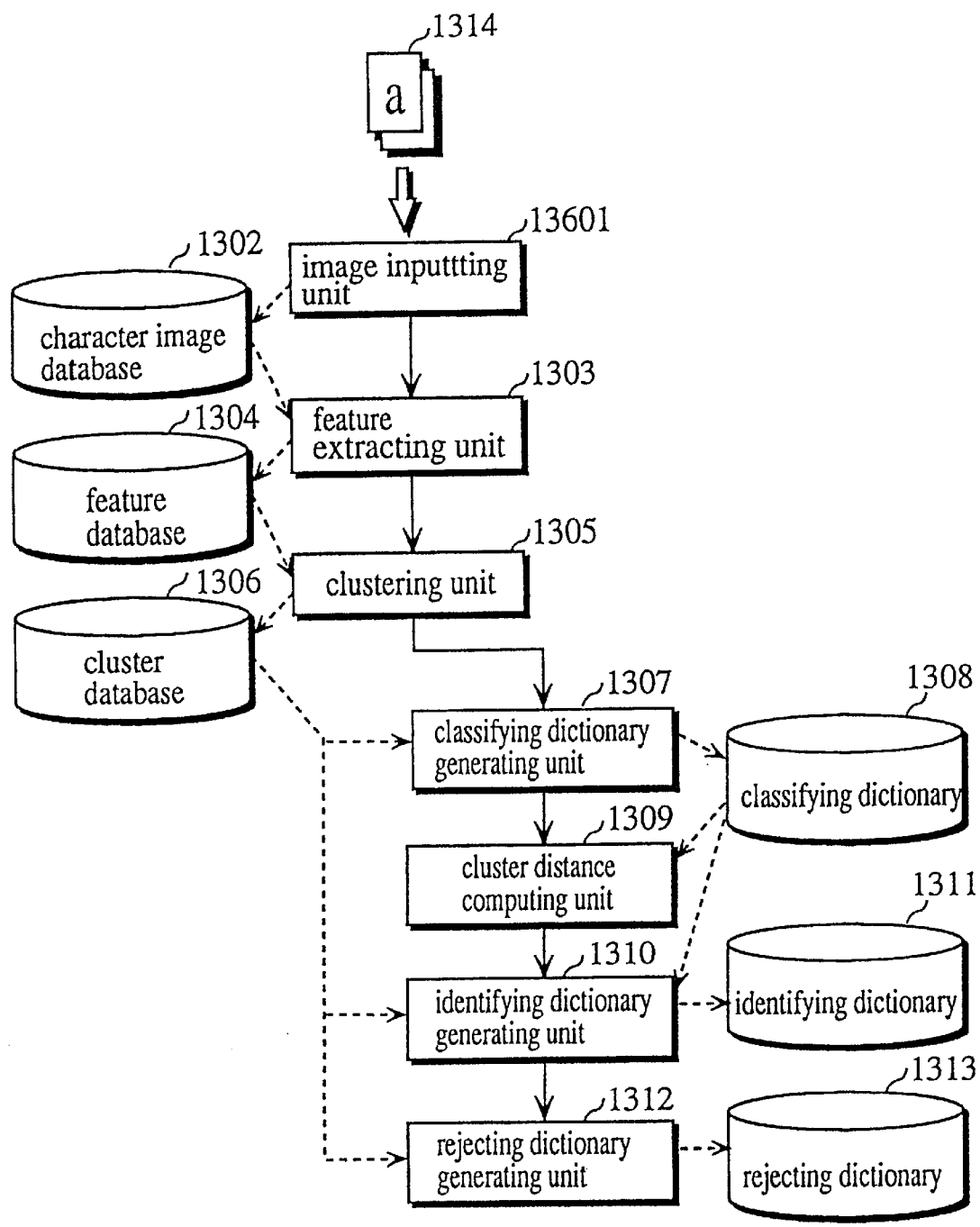
FIG. 13 is a block diagram showing a construction of Second Embodiment of the present invention, namely an apparatus for generating a character recognition dictionary.

FIG. 13 is a block diagram showing a construction of Second Embodiment of the present invention, namely a dictionary production apparatus.

The apparatus comprises image inputting unit 1301, character image database 1302, feature extracting unit 1303, feature database 1304, clustering unit 1305, cluster database 1306, classifying dictionary generating unit 1307, classifying dictionary 1308, cluster distance computing unit 1309, identifying dictionary generating unit 1310, identifying dictionary 1311, rejecting dictionary generating unit 1312, and rejecting dictionary 1313.

Image inputting unit 1301 comprises an optical image reader, a keyboard, etc. Image inputting unit 1301, on receiving a character code of character image 1314 from an operator, reads character image 1314, converts the character image into binary notation, and stores a set of the binary character image and a related character code in character image database 1302. Then, after converting all the character images into binary notation, image inputting unit 1301 activates feature extracting unit 1303. Note that the character images (1314) are various presentations for each character, that is, printed characters with various fonts, hand-written characters by various persons, and hand-written characters written twice or more by a same person.

Figure 14:
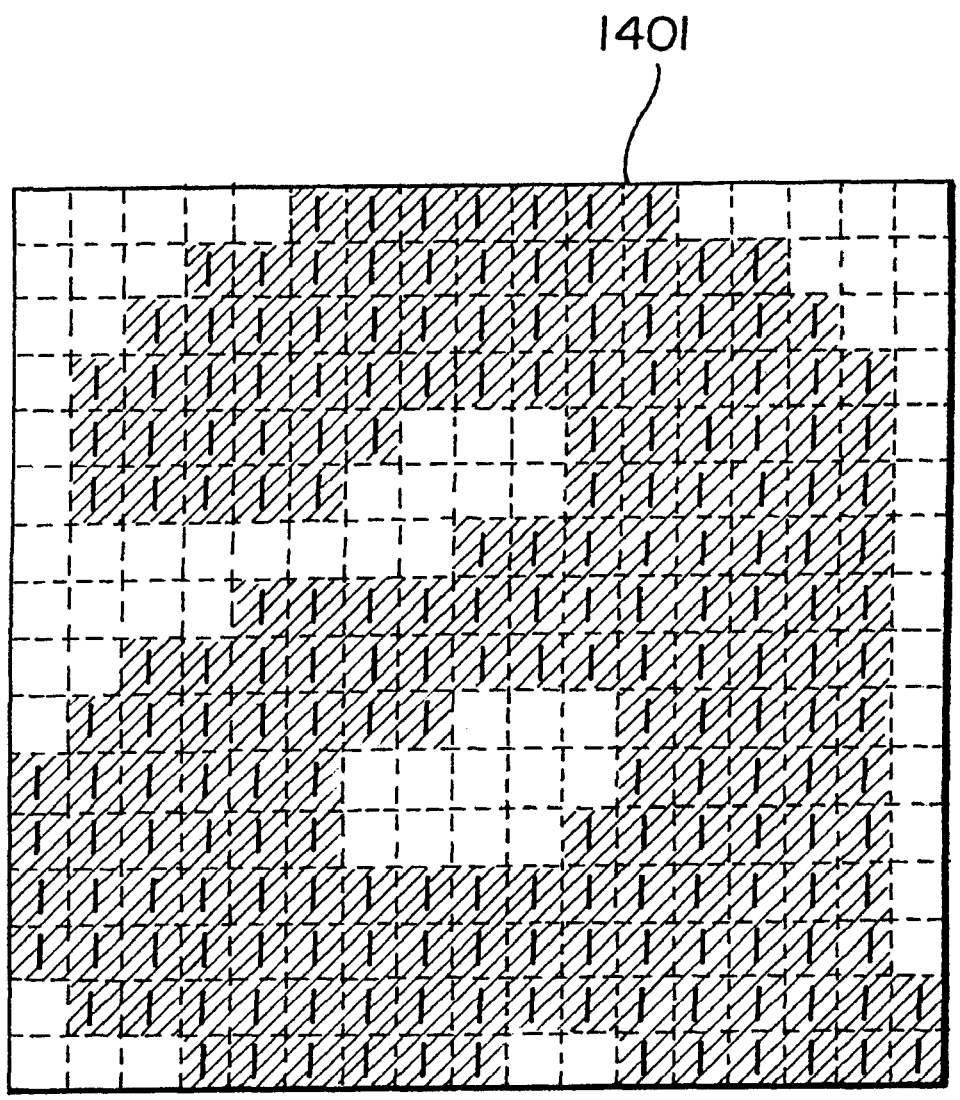
FIG. 14 shows a piece of binary image stored in a character image database in Second Embodiment.

Character image database 1302, comprising magnetic disks, stores a great many sets of a binary character image such as 1401 in FIG. 14 and a related character code. Note that "1"s in FIG. 14 indicate black pixels and "0"s white pixels (not shown).

Feature extracting unit 1303, on being activated by image inputting unit 1301, reads binary character images one by one from character image database 1302, extracts feature values from each binary character image. Arrays of feature values is called character recognition features, and feature extracting unit 1303 stores sets of character recognition features and related character codes in feature database 1304.

Figure 15:
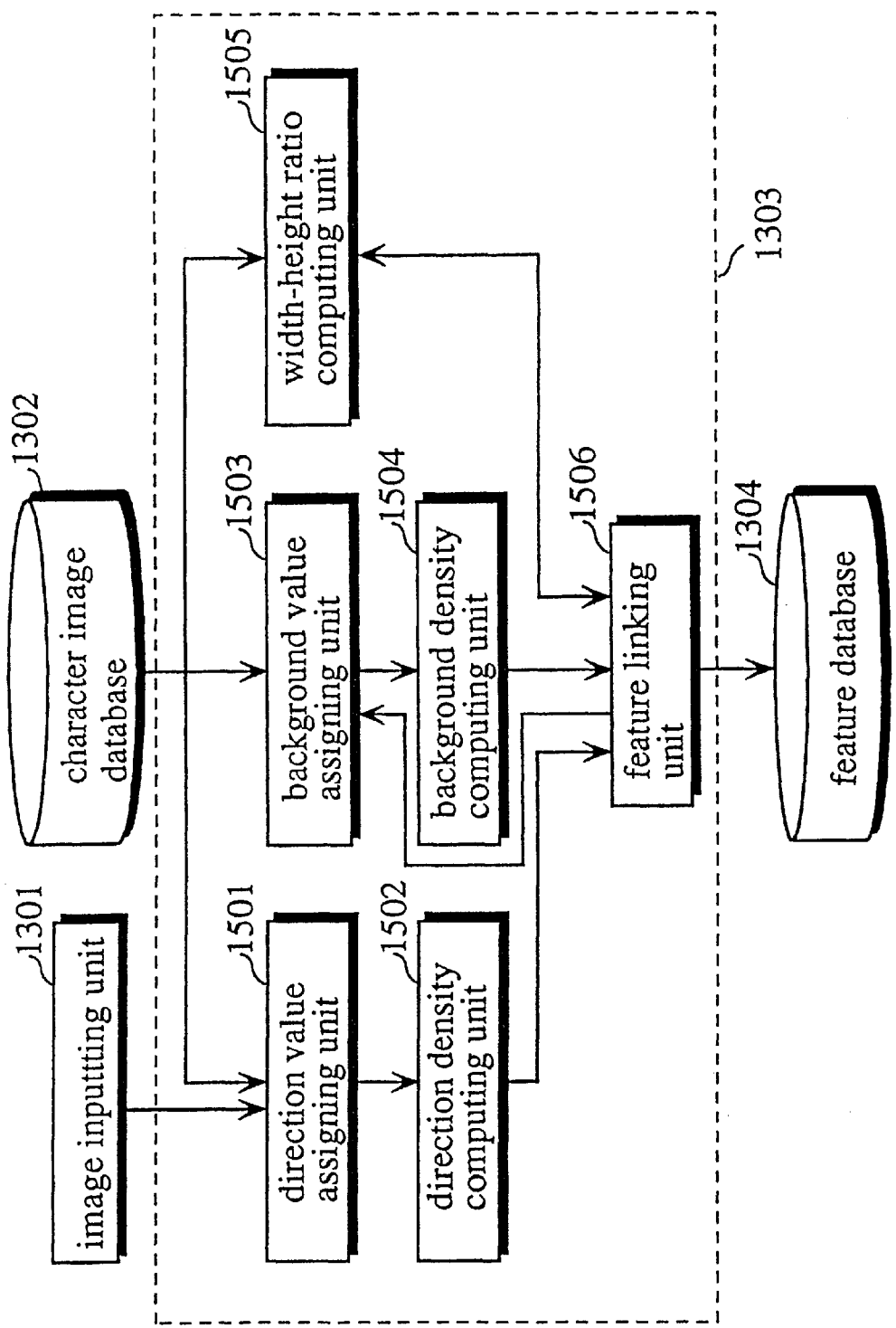
FIG. 15 is a block diagram showing a feature extracting unit in Second Embodiment in detail.

Feature extracting unit 1303, as shown in FIG. 15, comprises direction value assigning unit 1501, direction density computing unit 1502, background value assigning unit 1503, background density computing unit 1504, width-height ratio computing unit 1505, and feature linking unit 1506.

Figure 16:
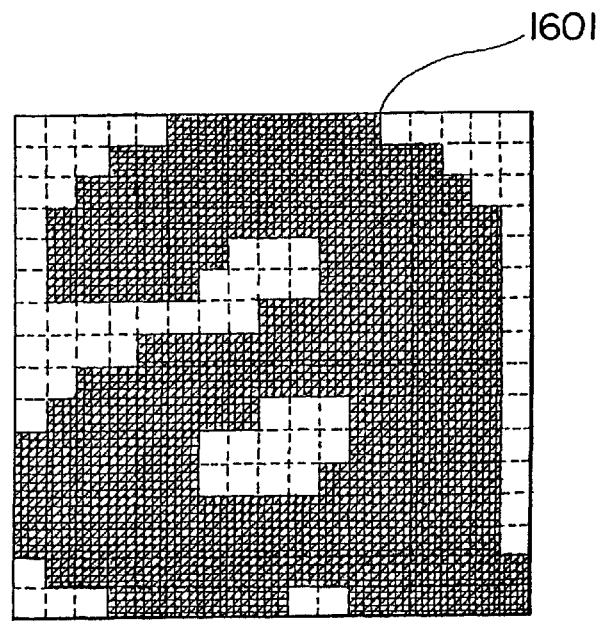
FIG. 16 shows a piece of binary image used for explaining the feature extracting unit in Second Embodiment.
Figure 17:
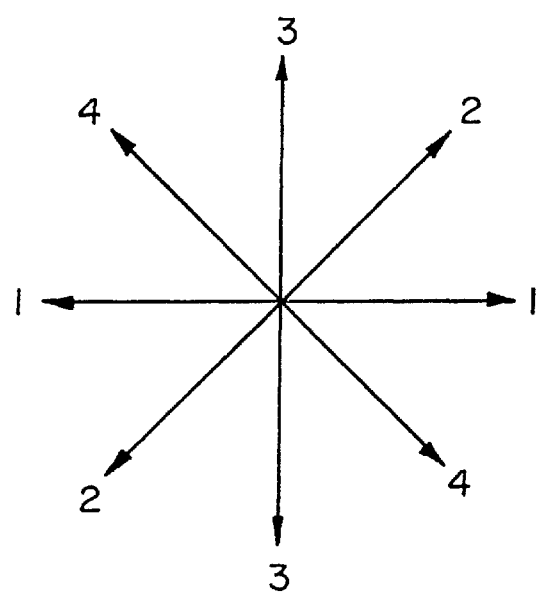
FIG. 17 is a figure used for explaining direction values used by the feature extracting unit in Second Embodiment.
Figure 18:
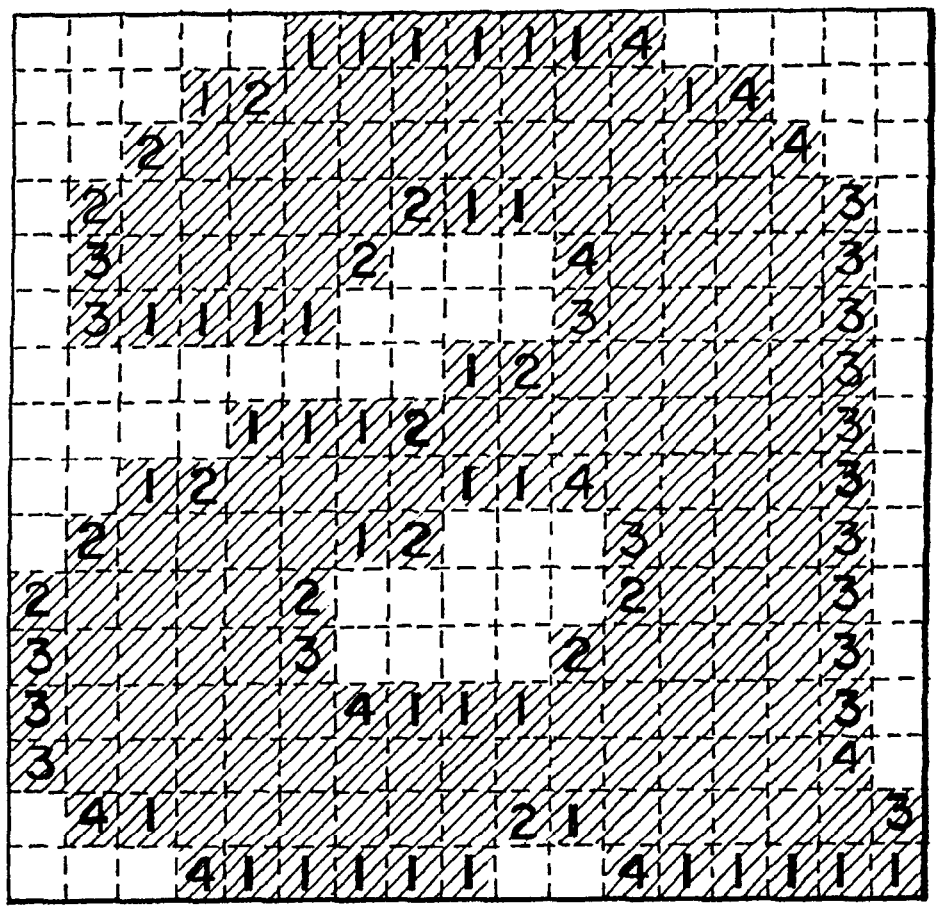
FIG. 18 shows direction values determined by direction value assigning unit of the feature extracting unit in Second Embodiment.

Direction value assigning unit 1501, on being activated by image inputting unit 1301, reads character image 1601, as shown in FIG. 16, from character image database 1302, and assigns direction values (1≦d≦4), which are defined as in FIG. 17 according to directions from a boundary pixel to an adjacent boundary pixel, to each boundary pixel as shown in FIG. 18. After assigning direction values of a character image 1601, direction value assigning unit 1501 sends the assigned direction values to direction density computing unit 1502.

Figures 19, 20:
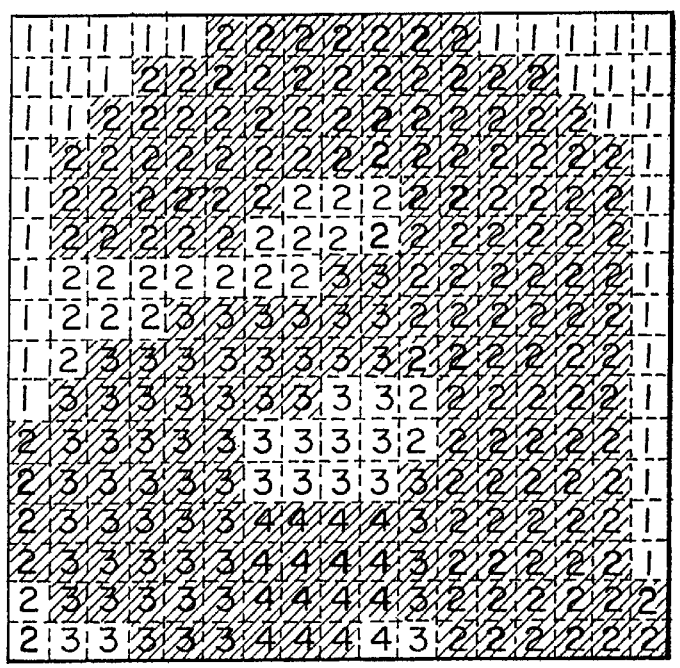
FIG. 19 shows areas divided by the feature extracting unit in Second Embodiment.
FIG. 20 shows background values determined by a background value assigning unit of the feature extracting unit in Second Embodiment.

Density computing unit 1502, on receiving the direction values from direction value assigning unit 1501, counts the number of pixels for each direction value in small rectangles. The small rectangles, (1,1), (1,2), ..., (L,M), are obtained by horizontally dividing a circumscribed rectangle of a character image into L pieces, and by vertically dividing into M pieces as shown in FIG. 19 (the rectangle of FIG. 19 is divided into four pieces both horizontally and vertically). Density computing unit 1502, then, divide the counted value, namely the number of outline pixels, by the total number of pixels of the small rectangle (equal to the area value), Stm, to obtain an outline direction density. Density computing unit 1502 sends the obtained outline direction density to feature linking unit 1506 after multiplying the value by α (e.g. 256) to make it an integer. As a result, when the number of pixels for direction d in small rectangle (l,m) is denoted as N(l,m,d), the outline direction density Fd(l,m, d) of the small rectangle is $$Fd(l,m,d) = \alpha * N(l,m,d)/Stm,$$

where 1≦d≦4, 1≦l≦L, 1≦m≦M.

Note that value d may be defined as 1≦d≦8 for 8 directions or 1≦d≦16 for 16 directions. Also, a circumscribed rectangle of a character image need not be divided equally.

As other methods for dividing the rectangle, a division into small rectangles having equal number of black pixels (with data value "1") or a division into small rectangles having equal moment of black pixels is available. For example, small rectangles (4,1), (4,2), (4,3), and (4,4) of Second Embodiment are longer in x-coordinate direction than others. Note that if the number of directions or values L and M change, the obtained outline direction densities will change.

Also note that all of the obtained outline direction densities need not be used. Therefore, the outline direction density may be obtained for a part of the small rectangles.

Background value assigning unit 1503, on being activated by feature linking unit 1506, reads character image 1601 from character image database 1302, assigns a background value to each pixel by scanning a circumscribed rectangle of a character image starting from "1" for a white pixel and "2" for a black pixel and incrementing the value for each encounter with a black pixel. FIG. 20 shows the background values assigned to the pixels by scanning the rectangle downward. The background values are obtained also by scanning from right side to left side, left side to right side, and lower side to upper side. Then, the obtained background values are sent to background density computing unit 1504.

Background density computing unit 1504, on receiving background values from background value assigning unit 1503, counts the number of pixels for each direction value and for each background value in small rectangles. The small rectangles, (1,1), (1,2), ..., (P,Q), are obtained by horizontally dividing a circumscribed rectangle of a character image into P pieces, and by vertically dividing into Q pieces as shown in FIG. 19 (the rectangle of FIG. 19 is divided into four pieces both horizontally and vertically). Background density computing unit 1504, then, divides the counted number of pixels by the total number of pixels (equal to the area value) in the small rectangle, Spq, to obtain a background density. Background density computing unit 1504 sends the obtained background density to feature linking unit 1506 after multiplying the value by β(e.g. 256) to make it an integer. As a result, when the number of pixels for direction r and for background value b in small rectangle (p,q) is denoted as N(r,p,q,b), the background density Fb(r, p,q,b) of the small rectangle is $Fb(r,p,q,b)=\beta*N(r,p,q,b)/Spq,$ where r is any of directions "upward", "downward", "to the left", and "to the right", $1 \leq p \leq P$, $1 \leq q \leq Q$, and $1 \leq b$.

Note that inappropriate feature elements such as those which vary much with the change in stroke, shape, etc. and those which do not vary much between different characters are not used. As a result, for example, the following 32 values are used as background density values when each of P and Q is 4:

Fb(up, 1,1,1), Fb(up, 2,1,1), Fb(up, 3,1,1), Fb(up, 4,1,1),
Fb(rt, 4,1,1), Fb(rt, 4,2,1), Fb(rt, 4,3,1), Fb(rt, 4,4,1),
Fb(dn, 1,4,1), Fb(dn, 2,4,1), Fb(dn, 3,4,1), Fb(dn, 4,4,1),
Fb(lt, 1,1,1), Fb(lt, 1,2,1), Fb(lt, 1,3,1), Fb(lt, 1,4,1),
Fb(up, 1,2,2), Fb(up, 2,2,2), Fb(up, 3,2,2), Fb(up, 4,2,2),
Fb(rt, 3,1,2), Fb(rt, 3,2,2), Fb(rt, 3,3,2), Fb(rt, 3,4,2),
Fb(dn, 1,3,2), Fb(dn, 2,3,2), Fb(dn, 3,3,2), Fb(dn, 4,3,2),
Fb(lt, 2,1,2), Fb(lt, 2,2,2), Fb(lt, 2,3,2), Fb(lt, 2,4,2).

Note that P and Q may be other than 4. Also, a circumscribed rectangle of a character image need not be divided equally.

Figure 21:
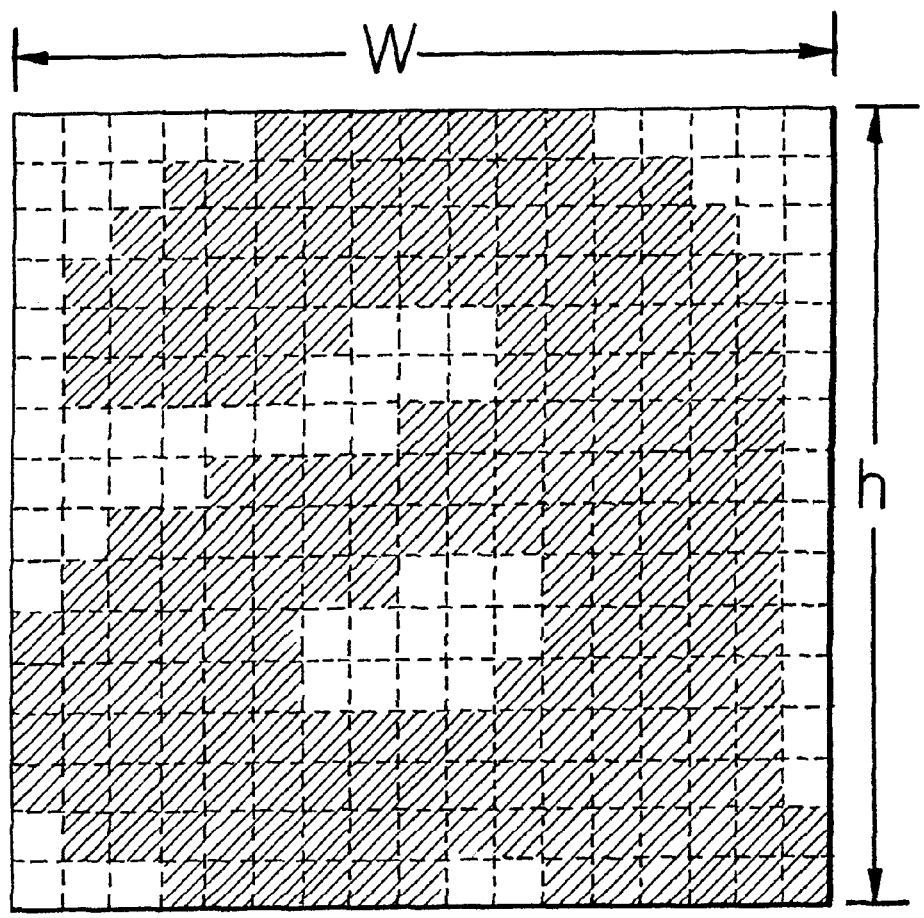
FIG. 21 is a figure used for explaining a width-height ratio determined by a width-height ratio computing unit of the character extracting unit in Second Embodiment.

Width-height ratio computing unit 1505, on being activated by feature linking unit 1506, reads character image 1601 from character image database 1302, obtains width-height ratio Fr of a circumscribed rectangle of a character image as shown in FIG. 21, then sends the obtained ratio to feature linking unit 1506 after multiplying the value by γ (e.g. 16) to make it an integer.

$Fr=\gamma*h/w$

Feature linking unit 1506, on receiving direction density Fd from direction density computing unit 1502, activates background value assigning unit 1503; and on receiving background density Fb from background density computing unit 1504, activates width-height ratio computing unit 1505. Feature linking unit 1506, on receiving width-height ratio Fr from width-height ratio computing unit 1505, arranges direction density Fd, background density Fb, and width-height ratio Fr in a predetermined order, stores the values, as character recognition features, into feature database 1304, and activates clustering unit 1305. In Second Embodiment, a character recognition feature, F, for a character includes 97 numerals.

Note that a character image reading unit may be incorporated for parallel processing. Then, the character image reading unit, on being activated by image inputting unit 1301, will read data from character image database 1302 and send the data to direction value assigning unit 1501, background value assigning unit 1503, and width-height ratio computing unit 1505.

Feature database 1304 comprises magnetic disks and stores sets of a character recognition feature, extracted by feature extracting unit 1303, and a related character code. Each of FIG. 22 to FIG. 25 shows a character recognition feature including 97 numerals stored in feature database 1304. FIG. 26 discloses what each numeral in FIG. 22 to FIG. 25 indicates.

Figures 22, 24:
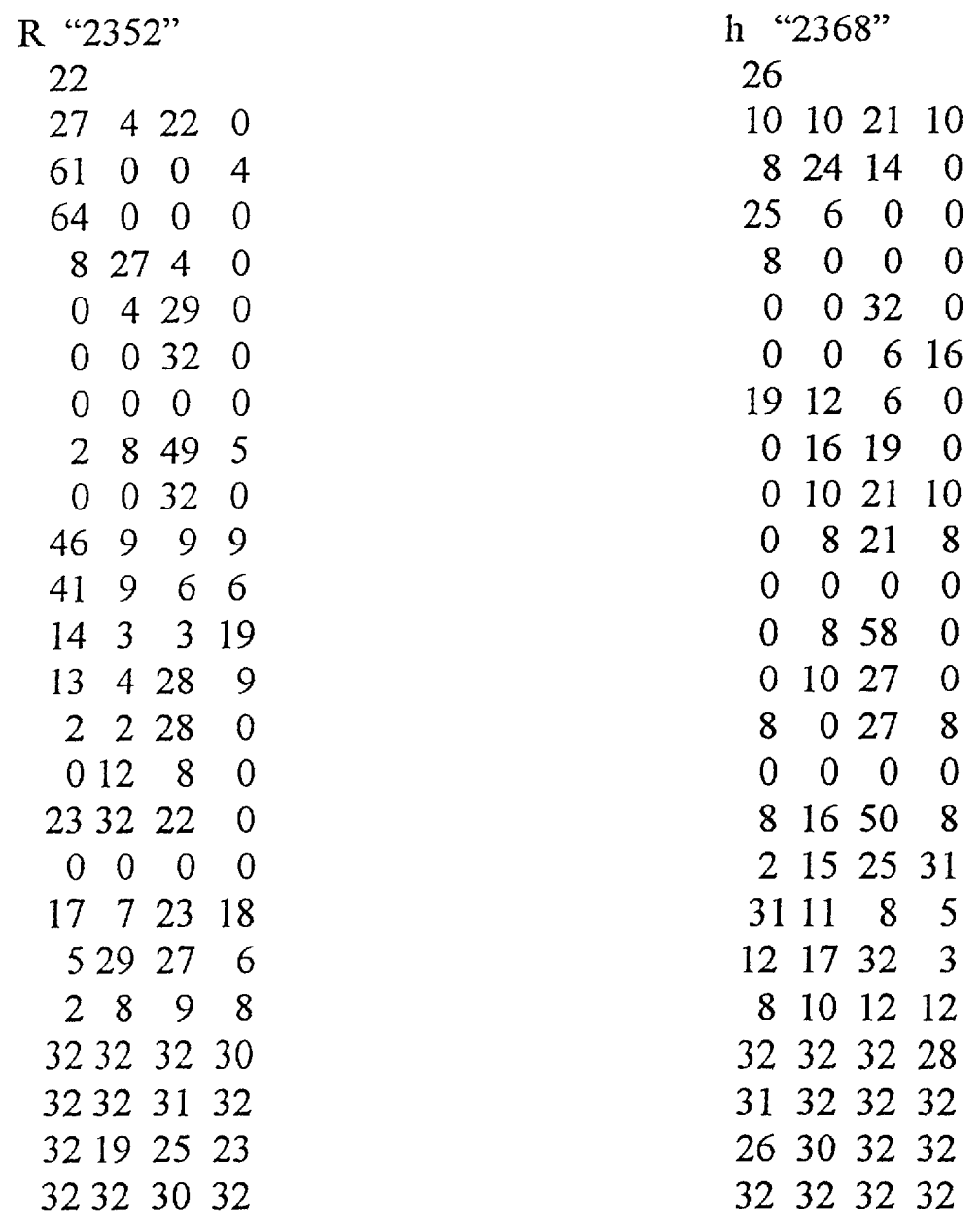

A value in the first row, "2352", of FIG. 22 is a JIS character code by hexadecimal notation for character "R"; numeral "22" of the second row a width-height ratio; and numerals "27,4,22,0" of the third row direction density values respectively corresponding to direction values "1,2,3,4" in small rectangle (1,1). Numerals of the fourth to 18th rows are also direction density values. Numerals "0,0,0,17" of the 19th row represent background density values, obtained by downward scanning, for background value "1" respectively for small rectangles (1,1), (2,1), (3,1), and (4,1). Numerals of the 20th to 26th rows are also background density values.

FIG. 23, FIG. 24, and FIG. 25 respectively show values of character recognition features for characters "i" "h", and "0".

Clustering unit 1305, on being activated by feature extracting unit 1303, reads character recognition features for a same character code in sequence from feature database 1304, and computes distance D between the character recognition features by Formula (16), the formula for obtaining the city-block distance.

Formula (16):

$$D = \sum_{k=1}^{N} |Fik - Fjk|$$

where Fik denotes the "k"th element of a character recognition feature for character "i"; and Fjk the "k"th element of a character recognition feature for character "j". N is 97 in Second Embodiment.

Clustering unit 1305, on computing distance D between two character recognition features for each combination for a same character code, stores the maximum distance value, $D_{MAX}$ in a buffer. In detail, when 100 character images are sent from image inputting unit 1301, clustering unit 1305 obtains 4950 ($_{100}C_2$) values for D, and stores the maximum value in the buffer.

Clustering unit 1305 repeats the same computation for all character codes and stores the maximum values in the buffer.

After completing computations for all the character codes, clustering unit 1305 reads the maximum distance values for each character code from the buffer, and select the minimum value among the maximum distance values. Then, a value of "cluster size criterion" is obtained from the minimum value $D_{MIN}$ by formula $k*D_{MIN}$, where k is a constant which is not less than 1.

After determining-the cluster size criterion, clustering unit 1305 reads character recognition features, which are regarded as clusters, in sequence from feature database 1304, and computes a distance between two clusters for each combination of the clusters by Formula 1. After computing the distance between clusters, clustering unit 1305 judges whether the minimum distance is not more than the cluster size criterion: if not, the two clusters with the minimum distance are linked together. After a linkage, the longest distance between pre-linkage clusters of a new cluster and another cluster is regarded as the distance between the new cluster and the cluster.

This cluster linkage continues until the minimum distance between clusters is more than the cluster size criterion. Therefore, all the character recognition features for a character code are linked together into a cluster if the maximum distance between character recognition features never exceeds the cluster size criterion; otherwise, two or more clusters remain. After the cluster linkage process completes for a character, clustering unit 1305 stores character recognition features included in each cluster into cluster database with the number of character recognition features in each cluster.

Clustering unit 1305 repeats the above processing for all the other character codes, then stores the total number of clusters at the start of the cluster data, and activates classifying dictionary generating unit 1307.

Note that while in Second Embodiment the furthest neighbor method of cluster analysis is used to analyze character recognition features in hierarchy for each character, another method like Ward method may be used. Also, while in Second Embodiment, the city-block distance is used for computing the distance between character recognition features or clusters, the Euclidean distance, expressed by Formula (17) may be used.

Formula (17):

$$D = \sum_{k=1}^{N} (Fik - Fjk)^2$$

Figure 27:
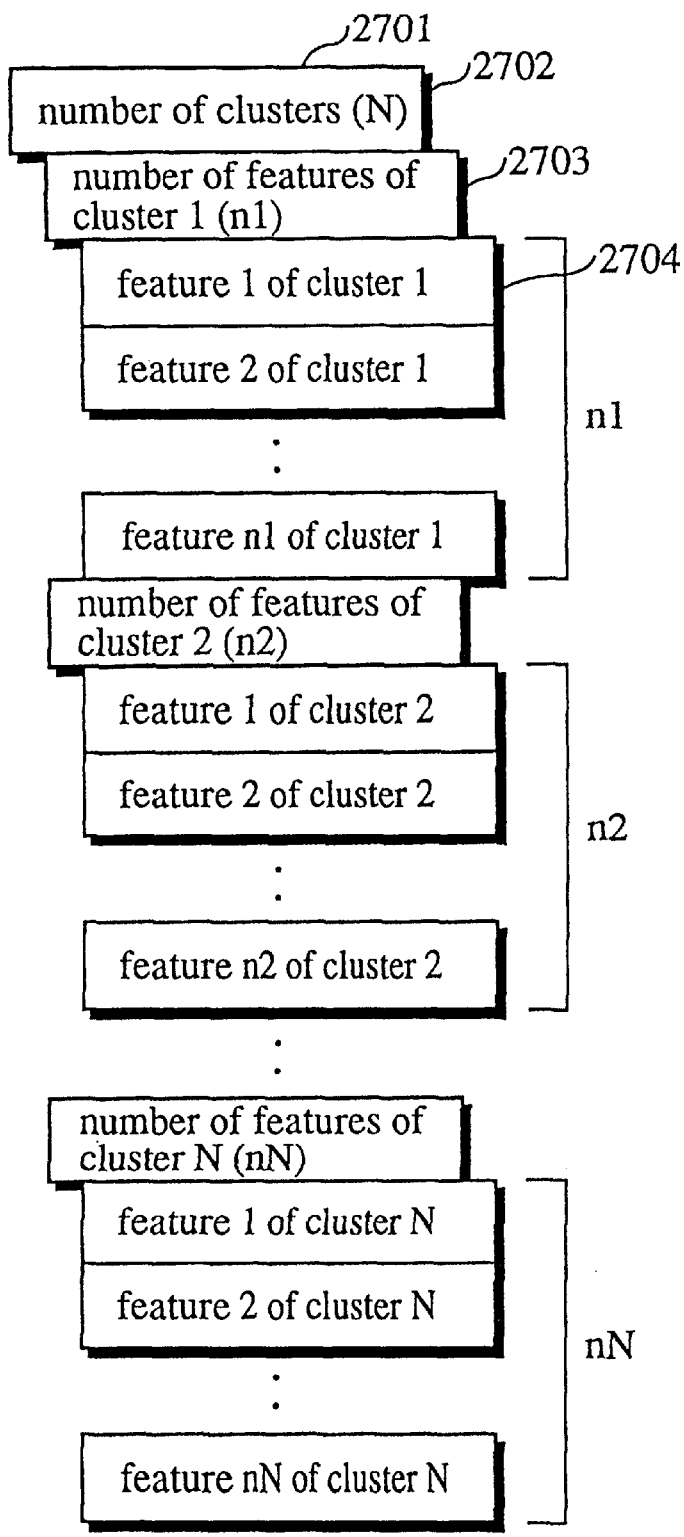
FIG. 27 shows the construction of cluster data in Second Embodiment.

Cluster database 1306, comprising magnetic disks, stores cluster data 2701 constructed as shown in FIG. 27. Cluster data 2701 comprises the number of clusters 2702, the number of character recognition features in a cluster 2703, and character recognition features of each cluster 2704. Character recognition features of each cluster 2704 are the same as those shown in FIG. 22 to FIG. 25.

Classifying dictionary generating unit 1307, on being activated by clustering unit 1305, reads cluster data 2701 from cluster database 1306, and obtains an average value for each element of character recognition features of each cluster, the results being an average feature of each cluster. The number of average features is equal to the number of clusters 2702.

Figure 34:
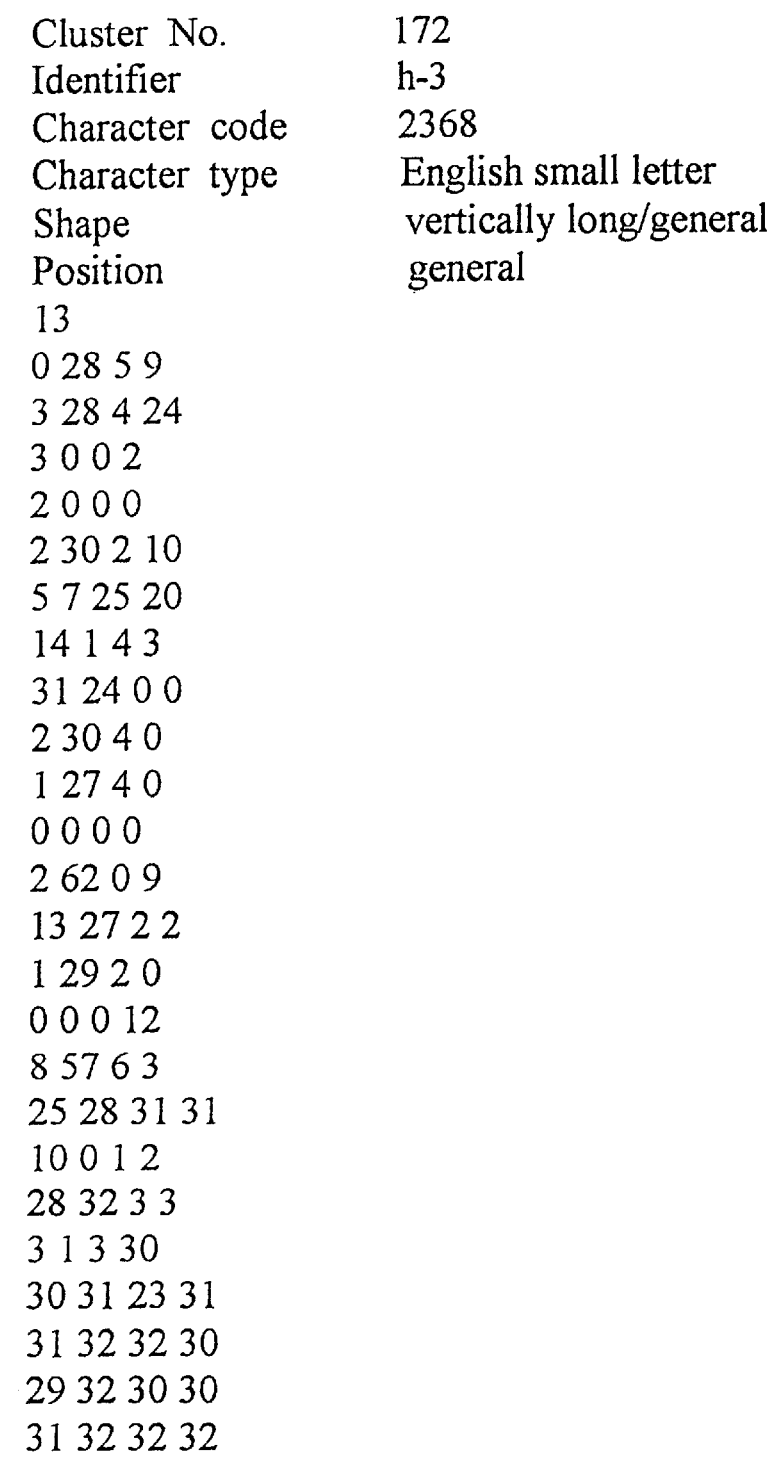

Classifying dictionary 1308, comprising magnetic disks, stores a lot of cluster data items 2906 constructed as shown in FIG. 28. FIG. 29 shows a cluster data item 2906 which comprises cluster number 2901, identifier 2902, character code 2903, attribute flag 2904, and average feature 2905. The cluster data item in FIG. 29 is of character "b". FIG. 30 and FIG. 31 also are cluster data items of character "b". FIGS. 32 to 34 are cluster data items of character "h". That means character "b" and "h" have three clusters respectively.

Cluster distance computing unit 1309, on being activated by classifying dictionary generating unit 1307, reads cluster data items 2906 from classifying dictionary 1308, and computes a distance between two clusters' average features 2905 for every combination of two clusters using Formula 1. Then, cluster distance computing unit 1309 sends cluster numbers of every pair of different character codes with the distance shorter than the cluster size criterion to identifying dictionary generating unit 1310.

Identifying dictionary generating unit 1310, on receiving a pair of cluster numbers from cluster distance computing unit 1309, reads the clusters' average feature values (2905) from classifying dictionary 1308, and computes a difference between an element of one of the average features and a same element of the other average feature for each combination of the same elements by using expression |Fik–Fjk| (absolute value), where Fik denotes element k of the average feature of cluster i; and Fjk element k of the average feature of cluster j. Since the number of average features is N, $1 \leq k \leq N$. N is 97 in Second Embodiment. Identifying dictionary generating unit 1310 stores the obtained difference values in order from greater values to smaller values with values k as identifiers.

Then, identifying dictionary generating unit 1310 reads character recognition features 2704 of the two clusters (having the cluster numbers sent from cluster distance computing unit 1309) from cluster database 1306. Identifying dictionary generating unit 1310 computes distances between the features and the average features of both clusters for the first element to the nth element in order of the stored values of identifier k. Here, it is supposed that a character recognition feature belongs to either of the clusters if the obtained distance is shorter than that with the other cluster. Thus, a ratio, r(n), of the number of character recognition features which belong to a right cluster is obtained.

The above computation process is repeated for various values for n in a range of $1 \leq n \leq N$, and a value n for the maximum value r(n) is obtained. Identifying dictionary generating unit 1310 registers the value n, values k for the first to the nth feature elements, and the two cluster numbers in identifying dictionary 1311.

Note that while in Second Embodiment a difference between average character recognition features is used as a standard value for evaluating character recognition features for identifying characters, the standard deviation for each element of character recognition features may also be used for the purpose.

Also, instead of obtaining a value n for the maximum value r(n) for every pair of clusters, a certain number of feature elements to be used for the computation may be predetermined.

After having generated data items of identifying dictionary 1311 for every pair of clusters of cluster numbers sent from cluster distance computing unit 1309, identifying dictionary generating unit 1310 activates rejecting dictionary generating unit 1312.

Figure 35:
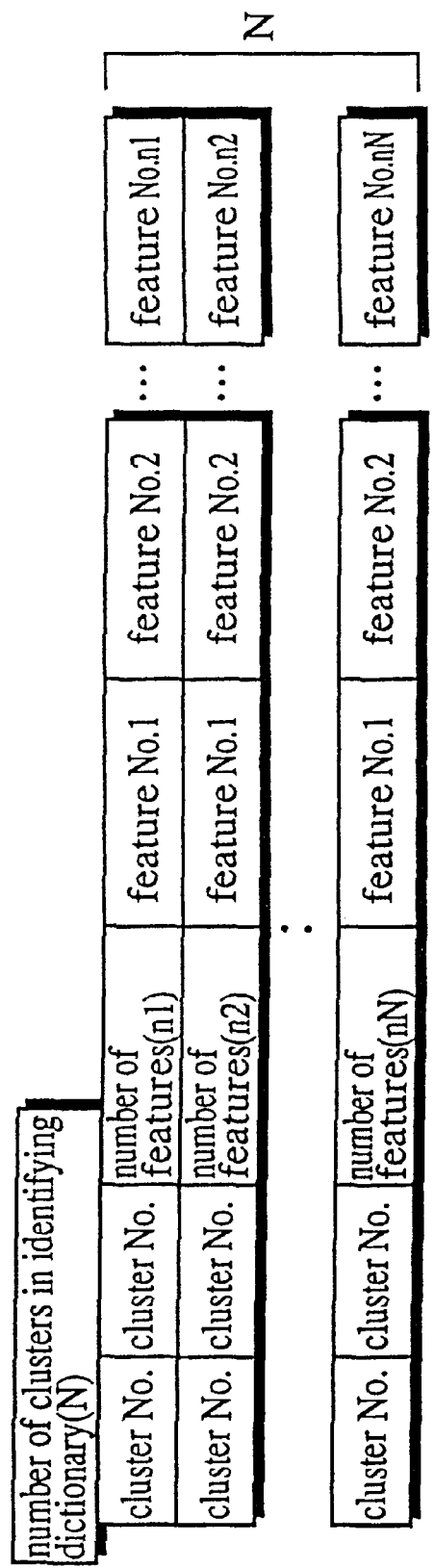
FIG. 35 shows the construction of data items stored in an identifying dictionary in Second Embodiment.

Identifying dictionary 1311, comprising magnetic disks, stores data items constructed as shown in FIG. 35. A data item shown in FIG. 36 indicates that the best feature elements (values k) for identifying characters "b" (cluster number 150) and "h" (cluster number 171) are 5, 52, 2, and 26 in order.

Rejecting dictionary generating unit 1312, on being activated by identifying dictionary generating unit 1310, obtains the maximum values and the minimum values of certain kinds of elements of character recognition features of each cluster, and registers the maximum values and the minimum values in rejecting dictionary 1313.

Note that the number of the certain kinds of feature elements, m, may be any value of $1 \leq m \leq 5N$. In Second Embodiment, since only a feature element "width-height ratio" is used, a value for m is "1".

Rejecting dictionary 1313, comprising magnetic disks, stores data items as shown in FIG. 37. FIG. 37 shows data items 3701, and the first row indicates that the minimum value and the maximum value for the width-height ratio of the 27th cluster are respectively 15 and 24.

Figure 38:
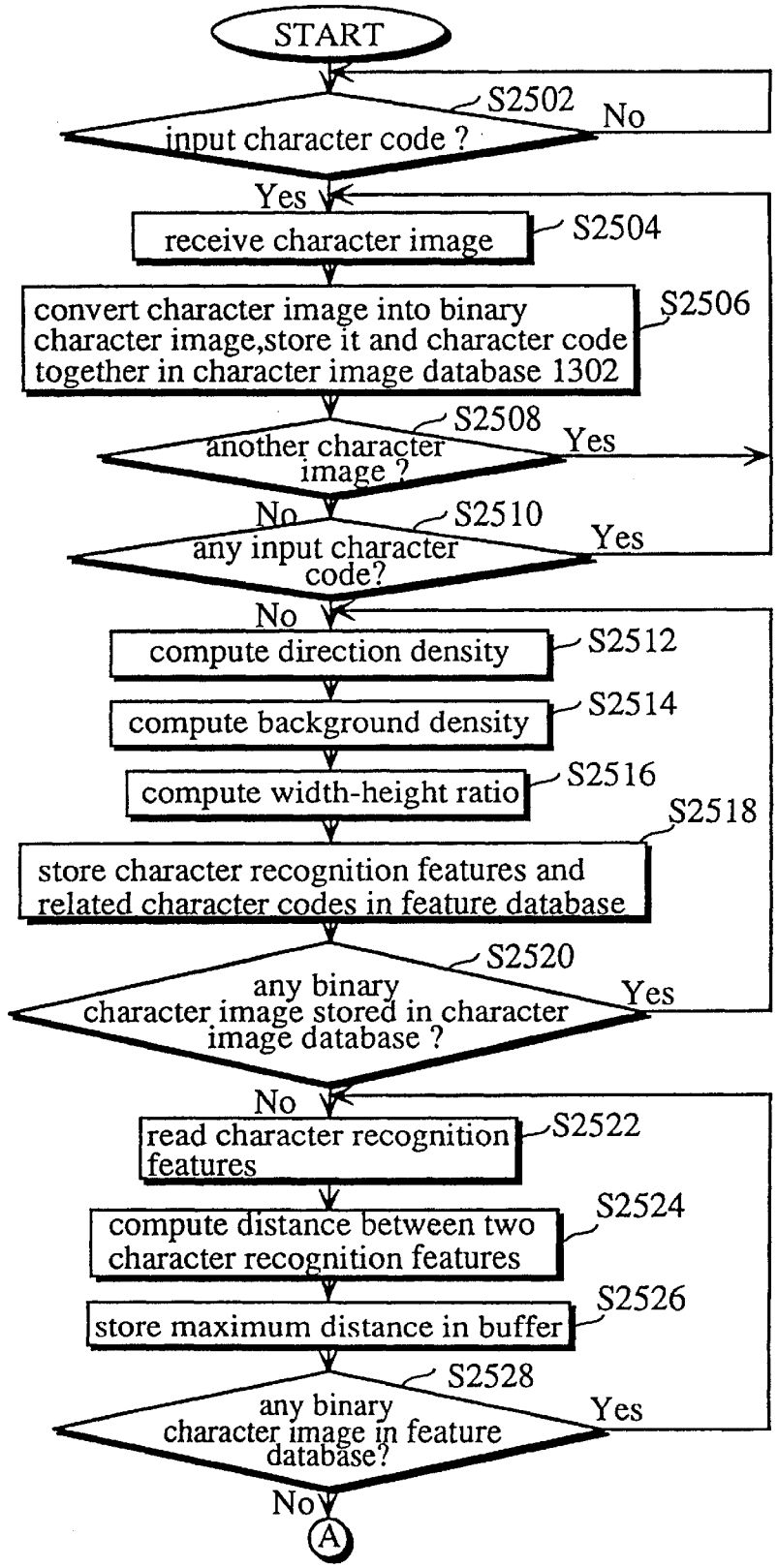
FIG. 38 is a flowchart showing the operation in Second Embodiment.
Figure 39:
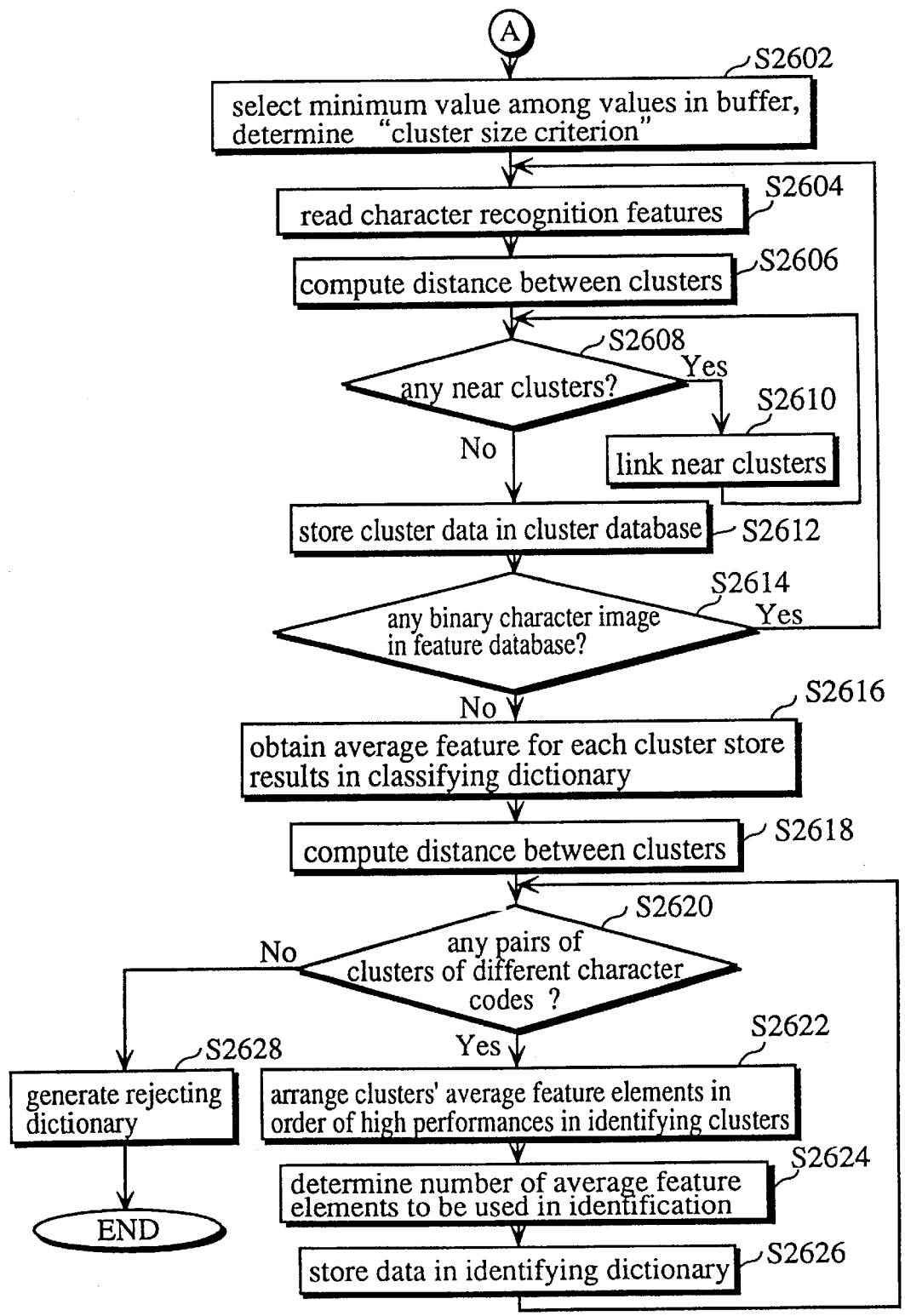
FIG. 39 is a flowchart showing the operation in Second Embodiment.

Now the operation of the present invention is described with reference to FIG. 38 and FIG. 39.

Inputting unit 1301 waits for a character code to be input by an operator (S2502): if a character code is input, receives a character image (S2504) then converts the character image into binary character image and stores it and the character code together in character image database 1302 (S2506). If another character image has been input, inputting unit 1301 returns to S2504, otherwise judges whether any character code has been input (S2510): if input, returns to S2504.

If any character code has not been input, feature extracting unit 1303 computes direction density from the binary character image (S2512), computes background density (S2514), computes width-height ratio (S2516), and stores these results, as a character recognition feature, and the related character code in feature database 1304 (S2518). Then, it is judged whether any binary character image is stored in character image database 1302 (S2520): if stored, control returns to S2512.

If any binary character image is not stored, clustering unit 1305 reads character recognition features in sequence for a same character code from feature database 1304, and computes a distance between two character recognition features for every combination by a certain formula (S2524), then stores the maximum distance in a buffer (S2526). Steps S2522 to S2526 are repeated until there is no character recognition feature in feature database (S2528), and "cluster size criterion" is determined by selecting the minimum value of the maximum distances stored in the buffer (S2602).

Then, clustering unit 1305 reads character recognition features as clusters (S2604), and computes the distance between clusters (S2606). Clustering unit 1305 judges whether there are pairs of clusters with the distances smaller than the cluster size criterion (S2608): if there are, links the clusters (S2610), and returns to S2608; and if not, stores the features as cluster data in cluster database 1306 (S2612). Steps S2604 to S2612 are repeated until there is no character recognition feature in feature database (S2614).

Classifying dictionary generating dictionary 1307 obtains an average feature for each cluster from the cluster data stored in cluster database 1306, and stores the results in classifying dictionary 108 as its data items (S2616).

Cluster distance computing unit 1309 reads average features of clusters, and computes distances between clusters (S2618). Identifying dictionary generating unit 1310 judges whether there are any pairs of clusters of different character codes with the distance shorter than the cluster size criterion (S2620): if there are, arranges the clusters' average feature elements in order of high performances in identifying the clusters (S2622). Then, identifying dictionary generating unit 1310 determines the number of the average feature elements to be used in the identification, stores data to be used in the identification in identifying dictionary 1311 (S2625), and returns to S2620.

If there are not any pairs of such clusters at S2620, rejecting dictionary generating unit 1312 generates rejecting dictionary 1313 containing data of an allowed range of certain feature elements.

<Third Embodiment>

Figure 40:
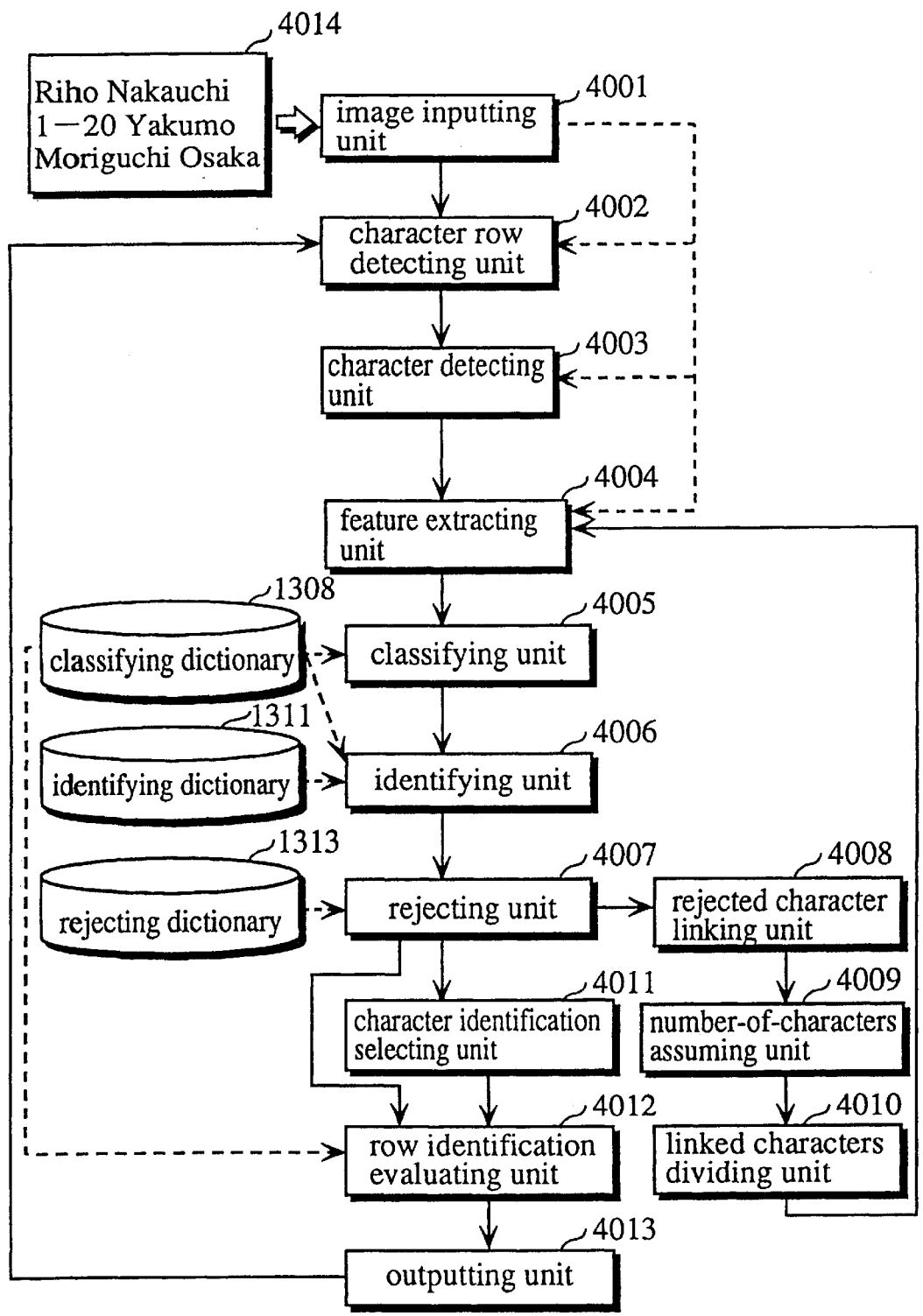
FIG. 40 is a block diagram showing a construction of Third Embodiment of the present invention, namely a character recognition apparatus.

FIG. 40 is a block diagram showing a construction of Third Embodiment of the present invention, namely a character recognition apparatus.

The apparatus comprises image inputting unit 4001, character row detecting unit 4002, character detecting unit 4003, feature extracting unit 4004, classifying unit 4005, identifying unit 4006, rejecting unit 4007, rejected character linking unit 4008, number-of-characters assuming unit 4009, linked characters dividing unit 4010, character identification selecting unit 4011, row identification evaluating unit 4012, outputting unit 4013, classifying dictionary 1308, identifying dictionary 1311, and rejecting dictionary 1313.

Inputting unit 4001, comprising a scanner, receives text image 4014, converts the text image to binary text image and sends it to character row detecting unit 4002, character detecting unit 4003, and feature extracting unit 4004.

Character row detecting unit 4002 detects coordinate values of character row 4101 from the binary text image, and sends the coordinate values to character detecting unit 4003. Character row detecting unit 4002 repeats the above processing for the remaining character rows (4102 and others) each time it is activated by recognition result outputting unit 4031.

Character detecting unit 4003, on receiving coordinate values of character rows from character row detecting unit 4002, detects coordinate values of characters included in the character rows such as 4103, 4104, etc., and sends the coordinate values to feature extracting unit 4004.

Feature extracting unit 4004, constructed almost the same as feature extracting unit 1303 of Second Embodiment, receives coordinate values from character detecting unit 4003 or linked characters dividing unit 4010, then extracts features to be used in character recognition from the binary text image sent from image inputting unit 4001. Feature extracting unit 4004 extracts direction density, background density, and width-height ratio as explained in Second Embodiment, arranges the data in certain order, and sends the data and the related coordinate values to classifying unit 4005.

Classifying unit 4005, on receiving character recognition features from character extracting unit 4004, computes distances (city-block distance D) between the character recognition features and the average features of clusters stored in classifying dictionary 1308, as in Second Embodiment, by Formula 1, then computes similarity R from the obtained D values by equation R=C/D. Classifying unit 4005 selects candidate clusters which have higher similarity R (shorter distance D), sends sets of a candidate cluster, a similarity, and coordinate values to identifying unit 4006.

Constant C is any value satisfying $1 \leq R \leq 100$.

FIG. 42 shows candidate clusters, similarities, and the like selected by classifying unit 4005 from character row 4101.

When character types such as subscript, capital letter, small letter, and Chinese character are specified, attribute flags may be checked first, and distances may be obtained for only certain kinds of clusters.

It is found from FIG. 42 that although the actually input characters are "Riho . . . ", characters by the first candidate clusters are "Ribo . . . ."

Identifying unit 4006, on receiving candidate clusters from classifying unit 4005, judges whether the candidate clusters include any pair of clusters stored in identifying dictionary 1311: if they do not include, sends the candidate clusters and the related coordinate values to rejecting unit 4007. If the candidate clusters include any pair of clusters, identifying unit 4006 computes distance D for each of the candidate clusters by Formula 1 concerning the feature elements used in the cluster identification stored in identifying dictionary 1311. Then, if a candidate cluster with lower similarity has shorter distance D, the similarity of the candidate cluster is raised. After the similarity change, the candidate clusters of higher similarity and the related coordinate values are sent to rejecting unit 4007.

In detail, identifying unit 4006, on receiving candidate clusters from classifying unit 4005, judges that the first-rank cluster b (cluster number 150) and the second-rank cluster h (cluster number 171) are stored in identifying dictionary 1311. Therefore, identifying unit 4006 computes a distance (denoted by D(150)) between the character recognition feature of character 4105 and candidate cluster 150 and a distance (denoted by D(171)) between the same character recognition feature and candidate cluster 171 concerning the feature elements used in cluster identification stored in identifying dictionary 1311. Then, if D(150)$\leq$D(171), the similarity is not changed; and if
D(150)$\leq$D(171), the similarity of candidate cluster 171 is raised.

For raising the similarity of cluster 171, one of the simplest method is to replace the similarity with that of cluster 150. When the similarity values of clusters 150 and 171 before the change are respectively R(150) and R(171); and after the change R'(150) and R'(171),

R'(150)=R(171)
R'(171)=R(150).

With the change of the similarity, the ranks of the candidate clusters also change.

FIG. 43 shows candidate clusters after the change.

Another method for raising the similarity of cluster 171 is as follows:

First, value ΔR, representing a value to be added in the raise, is obtained from values D(150) and D(171) by a certain formula, then the value ΔR is added to the similarity of cluster 171, as shown by

R'(150)=R(150)
R'(171)=R(171)+ΔR.

ΔR is obtained, for example, by the following formula:

When D(171)<0.5*D(150), ΔR=R(150)−R(171); and when 0.5*D(150)≦D(171)<D(150),

ΔR=2(R(150)−R(171))*(1−D(171)/D(150)).

By this method, the ranks by similarity does not change, and the ranks of the candidate clusters also do not change. If the similarity of the first rank candidate cluster agree with that of the second rank one, the ranks are determined after the recognition results are output.

Rejecting unit 4007, on receiving candidate clusters and the coordinate values from identifying unit 4006, judges the validity of each of the first-rank candidate clusters 4301 by the following conditions:

1. Similarity value 4302 of the first-rank candidate cluster is a certain value or more.
2. Values of all of or more than a predetermined number of the predetermined feature elements obtained by feature extracting unit 4004 do not exceed the range of the values of the same elements of the first-rank cluster stored in rejecting dictionary 1313.

Figure 41:
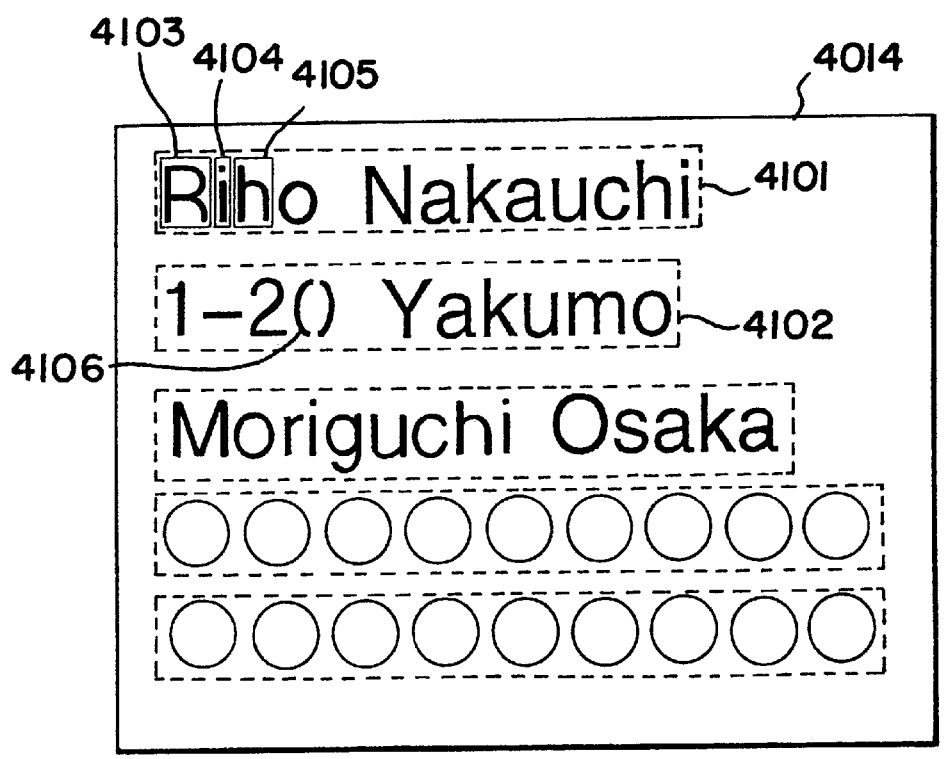
FIG. 41 shows a piece of input image used in Third Embodiment.

If all the first-rank candidate clusters meet both of the above conditions, rejecting unit 4007 sends a recognition result that all the first-rank candidate clusters for character image 4014 are valid to row identification evaluating unit 4012. If any of the first-rank candidate clusters does not meet both or either of the conditions, rejecting unit 4007 sends the coordinate values of the invalid cluster to rejected character linking unit 4008. Even if a parenthesis is nominated as a first-rank candidate cluster and is judged to be valid, its coordinate values are sent to rejected character linking unit 4008, because it may be an obscure character 4106 as shown in FIG. 41. While in Third Embodiment only the width-height ratio is used as the feature elements in condition 2, other feature elements may be used as well. If rejecting unit 4007 receives same coordinate values again, judges the validity of the first-rank candidate cluster for the later coordinate values and sends the result to character identification selecting unit 4011.

Rejected character linking unit 4008, on receiving coordinate values of parentheses or invalid candidate clusters from rejecting unit 4007, links the coordinate values if they close together, and activates number-of-characters assuming unit 4009. Number-of-characters assuming unit 4009, on being activated by rejected character linking unit 4008, determines the number of characters from coordinate values of the following:

(1) a parenthesis and a succeeding invalid cluster
(2) an invalid cluster and a succeeding parenthesis
(3) two invalid clusters
(4) an independent character
(5) two clusters linked into one by rejected character linking unit 4008.

Then, number-of-characters assuming unit 4009 sends the determined number and the related coordinate values to linked characters dividing unit 4010.

The number of characters is obtained by dividing the target width by an average character width. For example, the average character width is an average width of valid candidate clusters.

Character identification selecting unit 4011, on receiving a result from rejecting unit 4007, rejects an earlier result and sends a later result to row identification evaluating unit 4012 if the result is "valid"; and rejects a later result and sends an earlier result to row identification evaluating unit 4012 if the result is "invalid".

Row identification evaluating unit 4012, on receiving results of all the characters in a character row from rejecting unit 4007 and character identification selecting unit 4011, counts the number of "fragment" characters such as ";", ";", ".", and "," by referring to classifying dictionary 1308 using the cluster numbers as reference keys. If a ratio of the number of fragment characters in a character row exceeds a certain value, row identification evaluating unit 4012 judges that the row is not a character row, and rejects the recognition result; and if it does not exceeds the value, sends the recognition result to outputting unit 4013.

Outputting unit 4013 outputs the recognition result sent by row identification evaluating unit 4012. The recognition result include candidate clusters' in higher rank(s), the related character codes, and the similarities.

Figure 44:
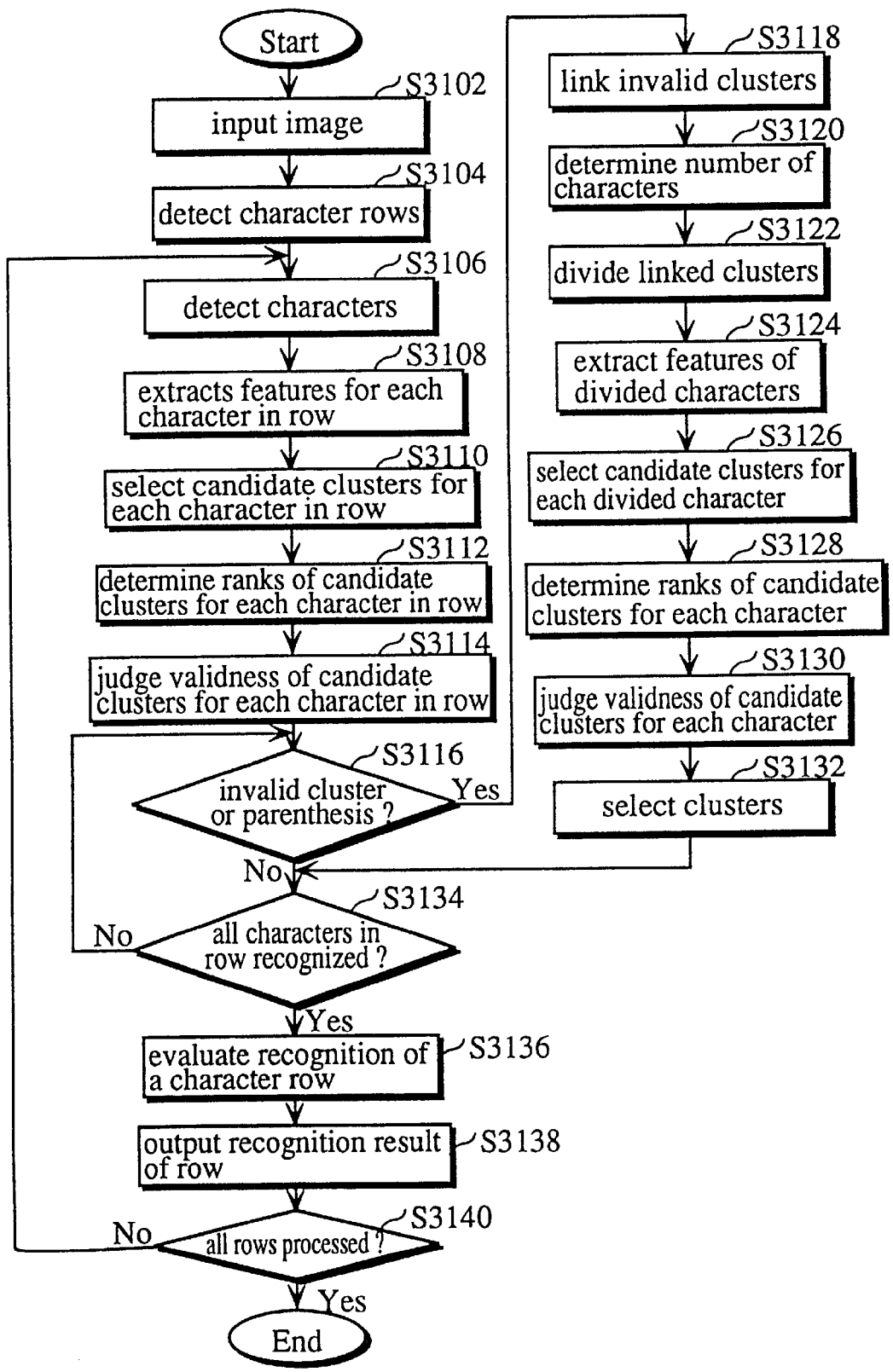
FIG. 44 is a flowchart showing the operation of Third Embodiment.

Now, the operation of Third Embodiment is described with reference to FIG. 44.

Receiving text image 4014 from a user, inputting unit 4001 converts the text image to binary text image and sends it to character row detecting unit 4002, character detecting unit 4003, and feature extracting unit 4004 (S3102).

Character row detecting unit 4002 detects coordinate values of a row from the binary text image (S3104). Character detecting unit 4003 detects coordinate values of characters included in the row (S3106). Feature extracting unit 4004 extracts character recognition features of the characters in the row (S3108).

Classifying unit 4005 computes distances between each character recognition feature and the average features of clusters stored in classifying dictionary 1308, then computes similarity R from the obtained distance values, and selects candidate clusters which have higher similarity (S3110).

Identifying unit 4006 judges whether the candidate clusters include any pair of clusters stored in identifying dictionary 1311: if they include any pair of clusters, identifying unit 4006 computes distance D for each of the candidate clusters concerning the feature elements used in the cluster identification stored in identifying dictionary 1311. Then, if a candidate cluster with lower similarity has shorter distance D, the similarity of the candidate cluster is replaced with that of a candidate cluster with higher similarity. This process is repeated for all the candidate clusters in the row (S3112).

Rejecting unit 4007 judges that a first-rank candidate cluster is valid if the similarity is a certain value or more and values of all of or more than a predetermined number of the predetermined feature elements do not exceed the range of the values of the same elements of the first-rank cluster stored in rejecting dictionary 1313; and judges that the first-rank candidate cluster is invalid if it does not meet any of the conditions (S3114). The above process is repeated for all the first-rank candidate clusters in the row.

Rejecting unit 4007 judges whether each of the first-rank candidate clusters in the row is invalid or a parenthesis (S3116). If invalid clusters or parenthesis clusters are close together, rejected character linking unit 4008 links their coordinate values (S3118). Number-of-characters assuming unit 4009 determines the number of characters in an area of invalid clusters or parentheses (S3120). Linked characters dividing unit 4010 obtains coordinate values based on the number of characters (S3122). Feature extracting unit 4004 extracts character recognition features of the characters in the row (S3124). Classifying unit 4005 computes distances D between each character recognition feature and the average features of clusters stored in classifying dictionary 1308, then computes similarity R from the obtained distance values, and selects candidate clusters which have higher similarity (S3126).

Identifying unit 4006 judges whether the candidate clusters include any pair of clusters stored in identifying dictionary 1311: if they include any pair of clusters, identifying unit 4006 computes distance D for each of the candidate clusters concerning the feature elements used in the cluster identification stored in identifying dictionary 1311. Then, if a candidate cluster with lower similarity has shorter distance D, the similarity of the candidate cluster is replaced with that of a candidate cluster with higher similarity (S3128). Rejecting unit 4007 judges whether the first-rank candidate clusters are valid by referring to dictionary 1313 (S3130). Character identification selecting unit 4011 rejects an earlier result and selects a later result if the result is "valid"; and rejects a later result and selects an earlier result if the result is "invalid" (S3132). It is judged whether all the characters in the row has been recognized (S3134): if not, control returns to S3116. If rejecting unit 4007 judges that the row does not include any invalid clusters or parentheses at S3116, control moves to S3134 again. If it is judged at S3134 that every character in the row has been recognized, row identification evaluating unit 4012 evaluates the character recognition of the row by obtaining a ratio of "fragment" characters in the row and comparing the ratio with a certain value (S3136).

Outputting unit 4013 outputs the character recognition result of the row (S3138), and judges whether all the rows of the text have been processed (S3140): if not, returns to S3106.

Note that while this invention deals with horizontally written texts in these Embodiments, it can also deal with vertically written texts by replacing the X-coordinate values and widths with the Y-coordinate values and heights, and the Y-coordinate values and heights with the X-coordinate values and widths.

Linked characters dividing unit 4010, based on the number of characters and the related coordinate values sent by number-of-characters assuming unit 4009, obtains coordinate values of independent invalid characters and characters incorporated in linked characters to the right in sequence, then sends the obtained coordinate values to feature extracting unit 4004. Coordinate values of linked characters are obtained by dividing the width of the target area by a supposed number of characters. The coordinate values of linked characters may also be obtained by vertically projecting the black pixels around intermediate positions of divided widths, and detecting positions of disconnected parts of the projections.

<Fourth Embodiment>

Figure 45:
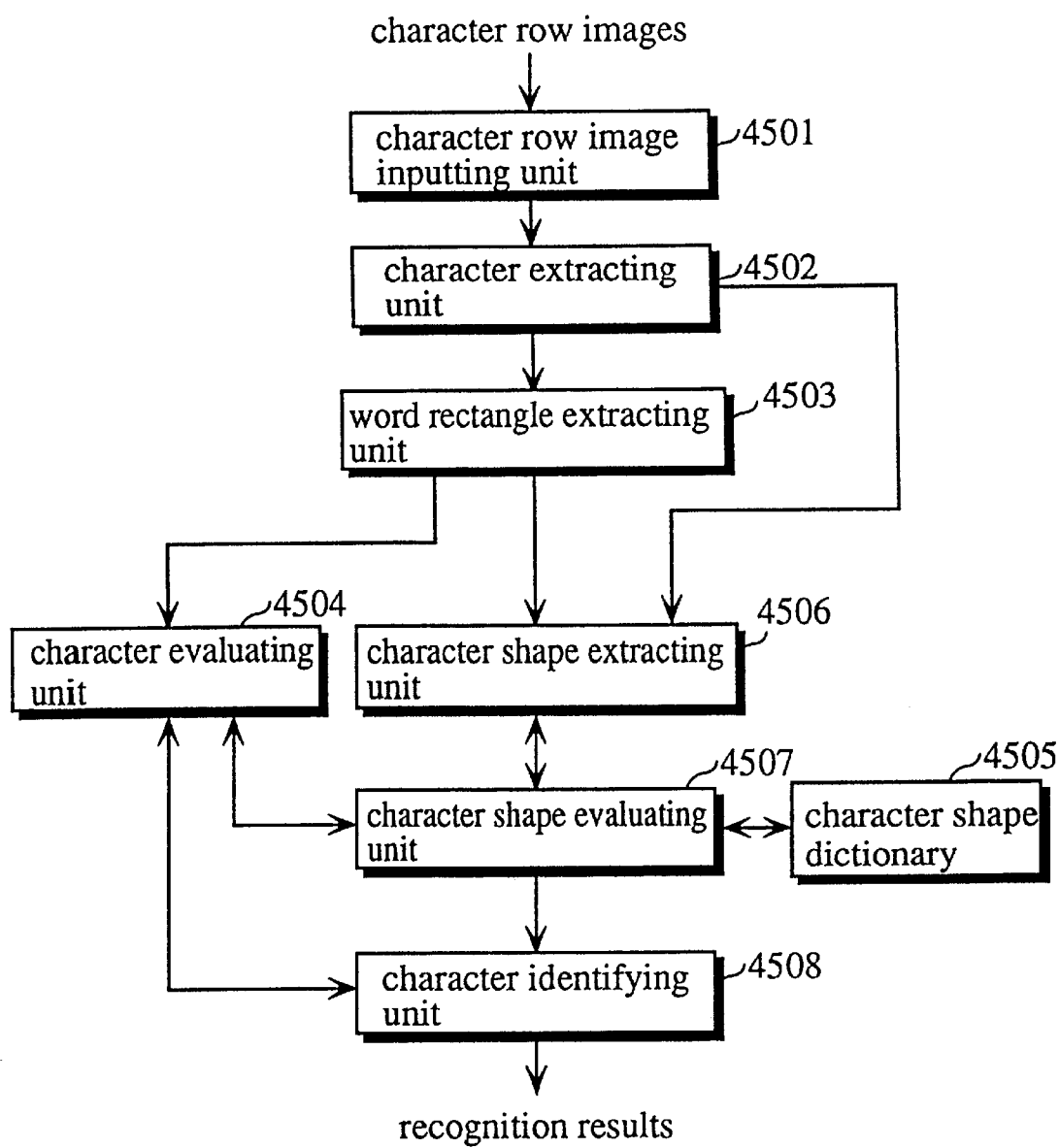
FIG. 45 is a block diagram showing a construction of Fourth Embodiment of the present invention, namely a character recognition apparatus.

FIG. 45 shows a construction of Fourth Embodiment of the present invention, namely a character recognition apparatus. The character recognition apparatus comprises character row image inputting unit 4501, character extracting unit 4502, word rectangle extracting unit 4503, character evaluating unit 4504, character shape dictionary 4505, character shape extracting unit 4506, character shape evaluating unit 4507, and character identifying unit 4508.

Figure 46A:
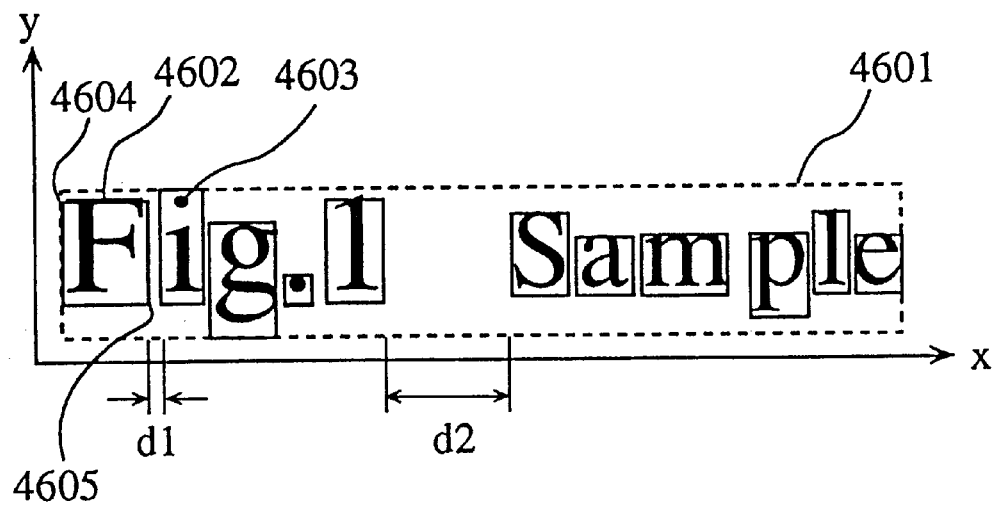
FIG. 46A shows a character row image input in Fourth Embodiment.

Character row image inputting unit 4501 receives character row images extracted from a text image read by a reading apparatus such as a scanner. FIG. 46A shows a received character row image 4601.

Character extracting unit 4502 extracts character images from the character row images received by character row image inputting unit 4501, and detects position data of circumscribed rectangles of the character images (hereinafter called character rectangles), such as 4602, 4603, ... as shown in FIG. 46A. The position data includes coordinate values of the upper-left-corner and lower-right-corner points of character rectangles, such as $(x_1,y_1)$ and $(x_r,y_r)$ which are coordinate values of points 4604 and 4605 of character rectangle 4602 as shown in FIG. 46A.

Figure 46B:
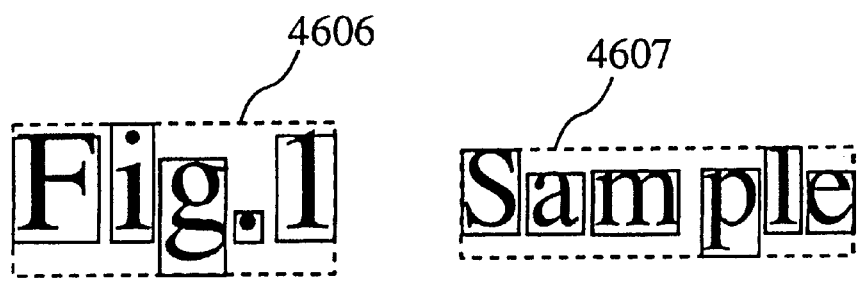
FIG. 46B shows word rectangles in Fourth Embodiment.

Word rectangle extracting unit 4503 computes a x-coordinate distance between two neighboring character rectangles for every combination by using x-coordinate values of the position data. For example, word rectangle extracting unit 4503 computes distance d1 between character rectangles 4602 and 4603 by using values $x_1$ and $x_r$. Then, word rectangle extracting unit 4503 compares each obtained distance with threshold value d. The threshold value d is, for example, a half of the height of a standard character rectangle. If an obtained value is equal to the threshold value d or more, the character row image is divided into parts having the distance in between, and circumscribed rectangles of the parts (hereinafter called word rectangles) are respectively extracted. For example, distance d2 between character images "1" and "S" is more than threshold value d as shown in FIG. 46A, and word rectangles 4606 and 4607 are extracted from character row image 4601 as shown in FIG. 46B.

Figures 47, 48:
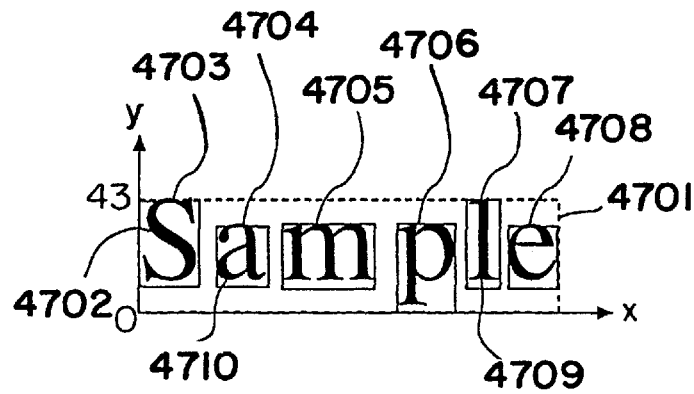
FIG. 47 shows character images, character rectangles, and word rectangles in Fourth Embodiment.
FIG. 48 shows data values obtained by a character evaluating unit.

Character evaluating unit 4504 has a character recognition dictionary in which standard character features for character recognition are registered. Character evaluating unit 4504 compares each character image in the word rectangles with each feature in the dictionary, obtains a recognition evaluation value A according to each comparison result, and nominates candidate characters that have the highest recognition evaluation values A. For example, character evaluating unit 4504 obtains candidate characters and their recognition evaluation values A. For example of character images 4702, ... of word rectangle 4701, as shown in FIG. 48. In this example, the smaller recognition evaluation value A, the higher the rank of candidate character. That is, the first rank candidate character for character image 4702 is "s" with evaluation value "428", the second rank candidate character "S" with "430", and the third rank candidate character "G" with "510".

Character evaluating unit 4504 is described in detail in Kazuo Nakata, "Pattern Recognition and its Application", Corona Co., 1078, and Japanese Laid-Open Patent Application No.61-188681.

Character shape dictionary 4505 prestores character shape data which is standard data concerning the shape of a character rectangle. The characters stored in the dictionary are capitol letters and small letters of alphabets and Arabian figures, the same as the recognition dictionary of character evaluating unit 4504. The character shape data consists of uppermost y-coordinate value $U_0$, lowest y-coordinate value $L_0$, height $H_0$ which is a difference between $U_0$ and $L_0$, and width $W_0$, as shown in FIG. 49. In this example, height $H_0$ is the maximum height of circumscribed rectangles of capitol letters, and lowest y-coordinate value $L_0$ is an average value of lowest values of capitol letters.

Figure 50:
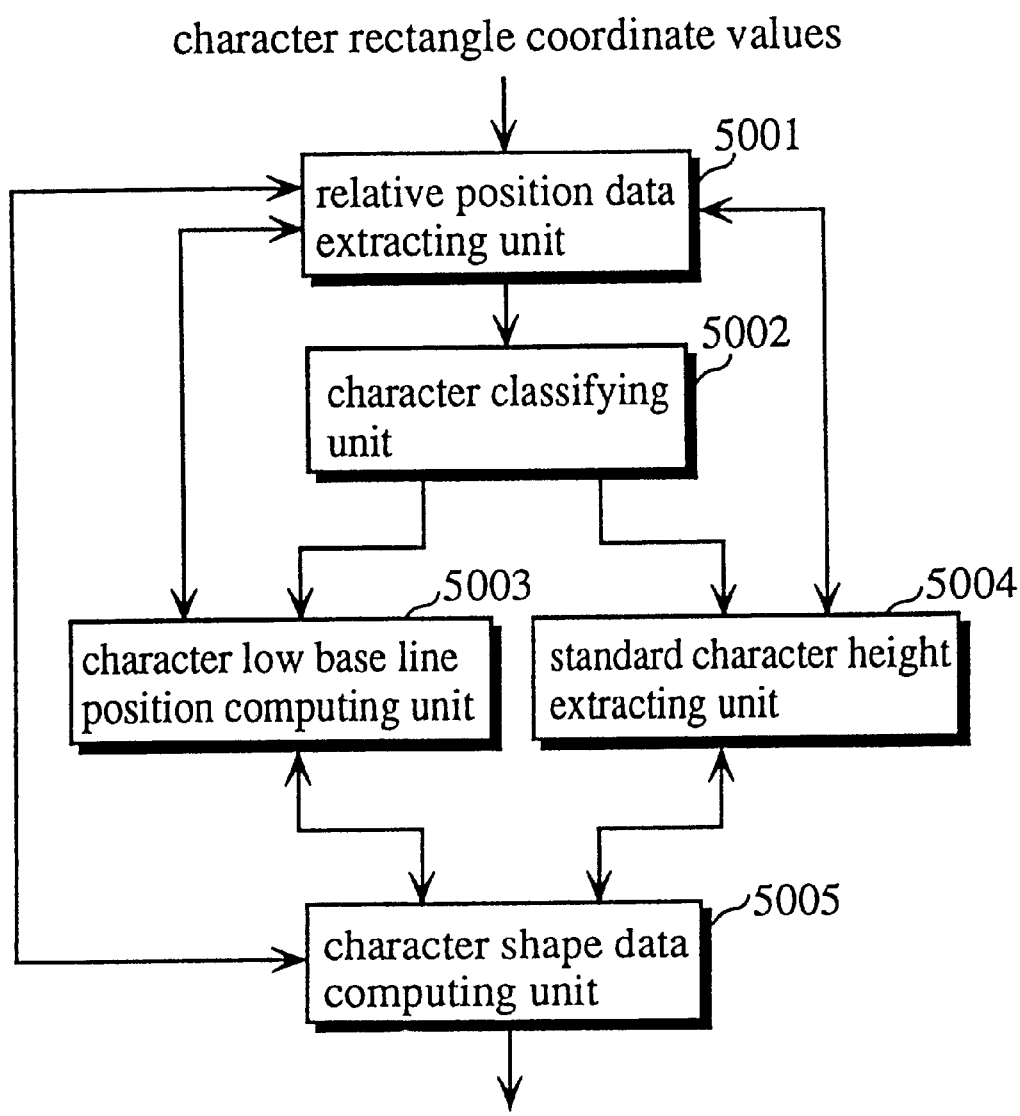
FIG. 50 is a block diagram showing a construction of a character shape extracting unit in Fourth Embodiment.

Character shape extracting unit 4506 comprises relative position data extracting unit 5001, character classifying unit 5002, base line position computing unit 5003, standard character height extracting unit 5004, and character shape data computing unit 5005 as shown in FIG. 50.

Relative position data extracting unit 5001 reads from character extracting unit 4502 coordinate values $(x_r,y_r)$ of the lower-right-corner points of character rectangles in word rectangle 4701, and extracts the minimum value $y_r$ values as a standard value $y_0$. The standard value $y_0$ is the x axis of word rectangle 4701 Then, relative position data extracting unit 5001 reads from character extracting unit 4502 coordinate values $(x_1,y_1)$ of upper-left-corner points of character rectangles 4703, 4704, . . . 4708, and obtains the uppermost y-coordinate value $Y_U$ by the following formula:

$$Y_U = y_1 - y_0.$$

Then, relative position data extracting unit 5001 reads from character extracting unit 4502 coordinate values $(x_r,y_r)$ of lower-right-corner points of character rectangles 4703, 4704, . . . 4708, and obtains the lowest y-coordinate value $Y_L$ by the following formula:

$$Y_L = y_r - y_0.$$

Then, relative position data extracting unit 5001 obtains height h of character rectangles 4703, 4704, . . . 4708 by the following formula:

$$h = y_1 - y_r,$$

and obtains width w by the following formula:

$$w = x_r - x_1.$$

Relative position data extracting unit 5001 stores the calculation results as shown in FIG. 51 as character shape data of character rectangles, and on completing calculations of a word rectangle, activates character classifying unit 5002.

Character classifying unit 5002, on being activated by relative position data extracting unit 5001, extracts the maximum value of the uppermost y-coordinate values $Y_U$ stored in relative position data extracting unit 5001, and if the lowest y-coordinate value $Y_L$ is under a threshold value (e.g. 20% of the maximum value), classifies the character image into a lower extension character, otherwise classifies into an upper character. Then, the classifying symbols, "up" for upper characters and "low" for lower extension characters, are additionally recorded with character shape data stored in relative position data extracting unit 5001 as shown in FIG. 51. Then, base line position computing unit 5003 and standard character height extracting unit 5004 are activated. If all the character image in a word rectangle are classified into lower extension characters, the character images are classified into upper characters again.

Base line position computing unit 5003, on being activated by character classifying unit 5002, obtains a character row bale line position $Y_L$, which is an average value of the lowest y-coordinate values $Y_L$ of character rectangles with "up". For example, the result obtained from figures in FIG. 51 is, $Y_0 = (14+15+14+14+13)/5 = 14$. On obtaining the character row base line position, base line position computing unit 5003 activates character shape data computing unit 5005.

Standard character height extracting unit 5004, on being activated by character classifying unit 5002, reads height h of character shape data stored in relative position data extracting unit 5001, and extracts the greatest value as a standard height H. In case of character shape data shown in FIG. 51, value "29" for height h of character rectangles 4706 and 4707 is regarded as the standard height H.

Character shape data computing unit 5005, on being activated by base line position computing unit 5003, extracts the character row base line position $Y_0$ from base line position computing unit 5003 and the standard height H from standard character height extracting unit 5004, reads character shape data stored in relative position data extracting unit 5001 for each character shape, and obtains normalized character shape data by performing computations by the following formulae:

Formula 18:

$$\text{uppermost Y-coordinate value } U = 100 * (Y_U - Y_0)/H$$

Formula 19:

$$\text{lowest Y-coordinate value } L = 100 * (Y_L - Y_0)/H$$

Formula 20:

$$\text{height } H^* = 100 * h/H$$

Formula 21:

$$\text{width } W = 100 * w/H$$

Character shape data computing unit 5005, on storing the uppermost y-coordinate value U, the lowest y-coordinate value L, height $H^*$, and width W for each character rectangle and completing the calculation of normalized character shape data for each character rectangle in a word rectangle, activates character shape evaluating unit 4507.

In the above calculations, x- and y-coordinate values used in word rectangle extracting unit 4503 are converted to X- and Y-coordinate values. This arrangement is made so that the values can be compared with character shape data registered in character shape dictionary 4505.

For example, when the character shape data as shown in FIG. 51 is stored in relative position data extracting unit 5001, character shape data computing unit 5005 extracts the character row base line position $Y_0$ from base line position computing unit 5003 and the standard height H from standard character height extracting unit 5004, and obtains normalized character shape data as shown in FIG. 52 by performing computations by formulae (18) to (21).

Character shape evaluating unit 4507, on being activated by character shape extracting unit 4506, reads character shape data of candidate characters extracted by 4504 from character shape dictionary 4505 and also reads normalized character shape data of a character rectangle extracted by 4506. Then, character shape evaluating unit 4507 obtains shape evaluation value B by substituting the obtained result values into Formula (22).

Formula (22):

$$B = |U - U_0| + |L - L_0| + |H^* - H_0| + |W - W_0|$$

The obtained shape evaluation value B is stored for each candidate character. After the above calculation have been performed for all the character images, character identifying unit 4508 is activated.

For example, for character image 4702 in FIG. 47, the shape evaluation values B for the first rank candidate character "s", the second rank candidate character "S", and the third rank candidate character "G" are respectively "63.3", "27.7", and "39.7".

Character identifying unit 4508, on being activated by character shape evaluating unit 4507, reads recognition evaluation value A for each candidate character for a character image obtained by character evaluating unit 4504 and also reads shape evaluation value B for the same obtained by character shape evaluating unit 4507, and obtains total evaluation value C by Formula (23).

Formula (23):

$$C = A + b \cdot B,$$

where b is a predetermined coefficient (e.g. b=1.0). A candidate character with the minimum value of the obtained total evaluation values C is determined to be a finally recognized character. After recognizing all the characters, the recognition results are output.

For example, since recognition evaluation values A for the first rank candidate character "s", the second rank candidate character "S", and the third rank candidate character "G" are respectively "428", "430", and "510", and the shape evaluation values B for the same are respectively "63.3", "27.7", and "39.7", the total evaluation values C are respectively "491.3", "457.7", and "549.7". As a result, the second rank candidate character "S" is determined as the character recognition result.

Similarly, for character image 4709 with character rectangle 4707 in FIG. 47, since recognition evaluation values A for the first rank candidate character "I", the second rank candidate character "1", and the third rank candidate character "t" are respectively "378", "380", and "410", and the shape evaluation values B for the same are respectively "7.9", "4.9", and "33.9", the total evaluation values C are respectively "385.9", "384.9", and "443.9". As a result, the second rank candidate character "1" is determined as the character recognition result.

Figure 53:
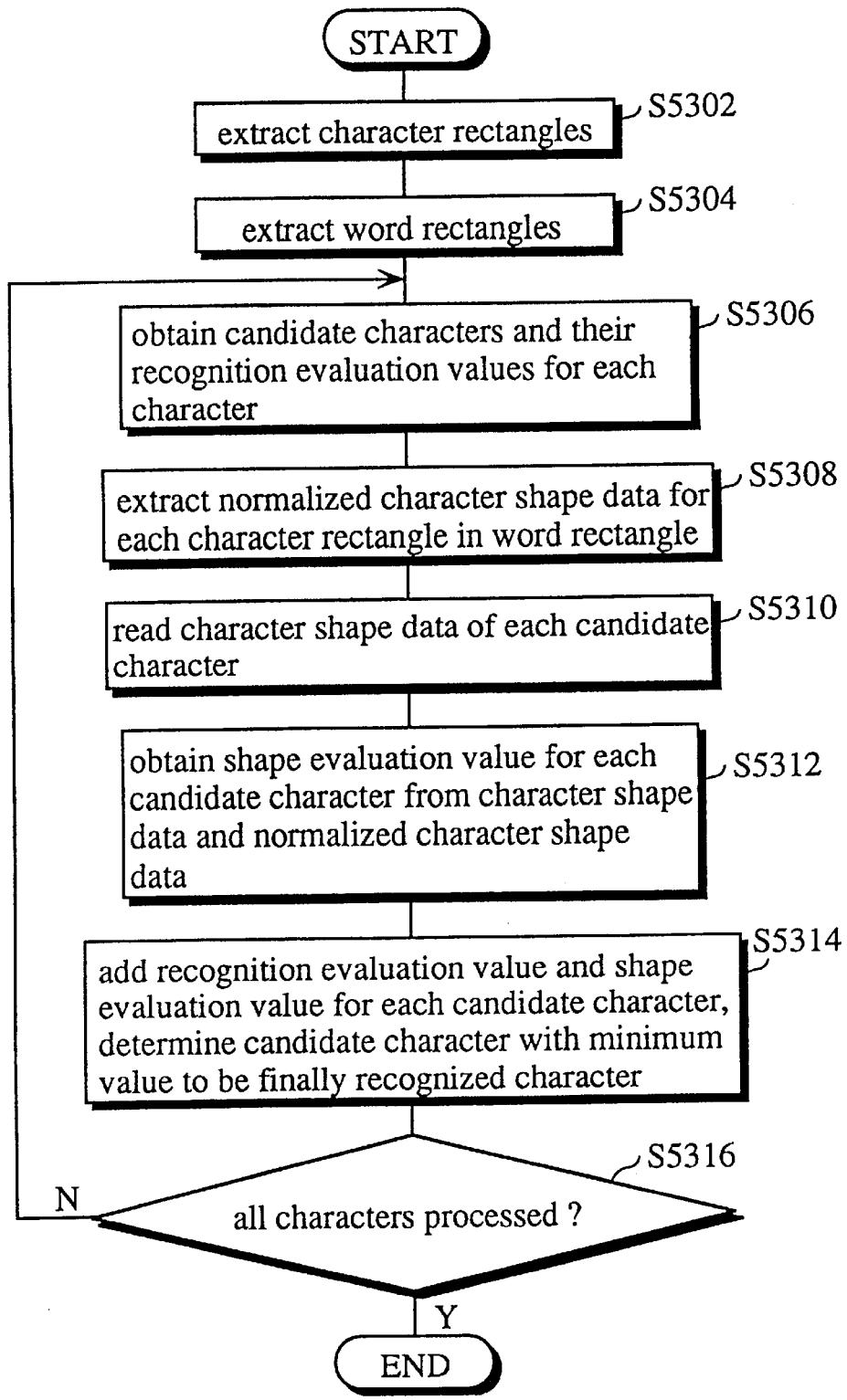
FIG. 53 is a flowchart of Fourth Embodiment.

Now the operation of Fourth Embodiment apparatus is described with reference to a flowchart shown in FIG. 53.

Character extracting unit 4502 extracts character images and their character rectangles (S5302). Word rectangle extracting unit 4503 extracts word rectangles (S5304). Character evaluating unit 4504 obtains candidate characters and their recognition evaluation values for each character (S5306).

Character shape extracting unit 4506 extracts normalized character shape data for each character rectangle in a word rectangle (S5308). Character shape evaluating unit 4507 reads character shape data of candidate characters from character shape dictionary 4505 (S5310), and obtains a shape evaluation value for each candidate character from character shape data and normalized character shape data (S5312).

Character identifying unit 4508 adds recognition evaluation value and shape evaluation value for each candidate character, and determines a candidate character with the minimum result value to be a finally recognized character (S5314). It is judged whether all the characters have been processed (S5316): if processed, ends processing; and if not, control returns to S5306.

The character shape evaluating unit may comprise a character similarity information storage unit which stores information telling whether a recognition standard character has similar characters. As shown in FIG. 54, each of recognition standard characters (A to Z, a to z, and 0 to 9) has information which consists of "yes" for similar characters, and "no" for no similar character.

Then, the character shape evaluating unit will refer to the character similarity information storage unit to see whether there are any candidate characters having similar characters. If there are, shape evaluation values are obtained for the candidate characters as shown in Fourth Embodiment. Otherwise, shape evaluation values of the candidate characters are set to zero.

The character shape evaluating unit may check whether there are any candidate characters having similar characters only for the first rank candidate characters.

For example, since the first rank candidate character "s" of character image 4702 has similar characters as shown in FIG. 54, the character shape evaluating unit will obtain the shape evaluation value for the character. On the other hand, since the first rank candidate character "a" of character image 4710 doe not have similar characters, the shape evaluation values of all the candidate characters are set to zero. As a result, character identifying unit 4508 determines the first rank candidate character of character evaluating unit 4504 as the recognition result.

Also, the character identifying unit may obtain the total evaluation value C by obtaining multiplication result of evaluation values A and B.

<Fifth Embodiment>

Figure 55:
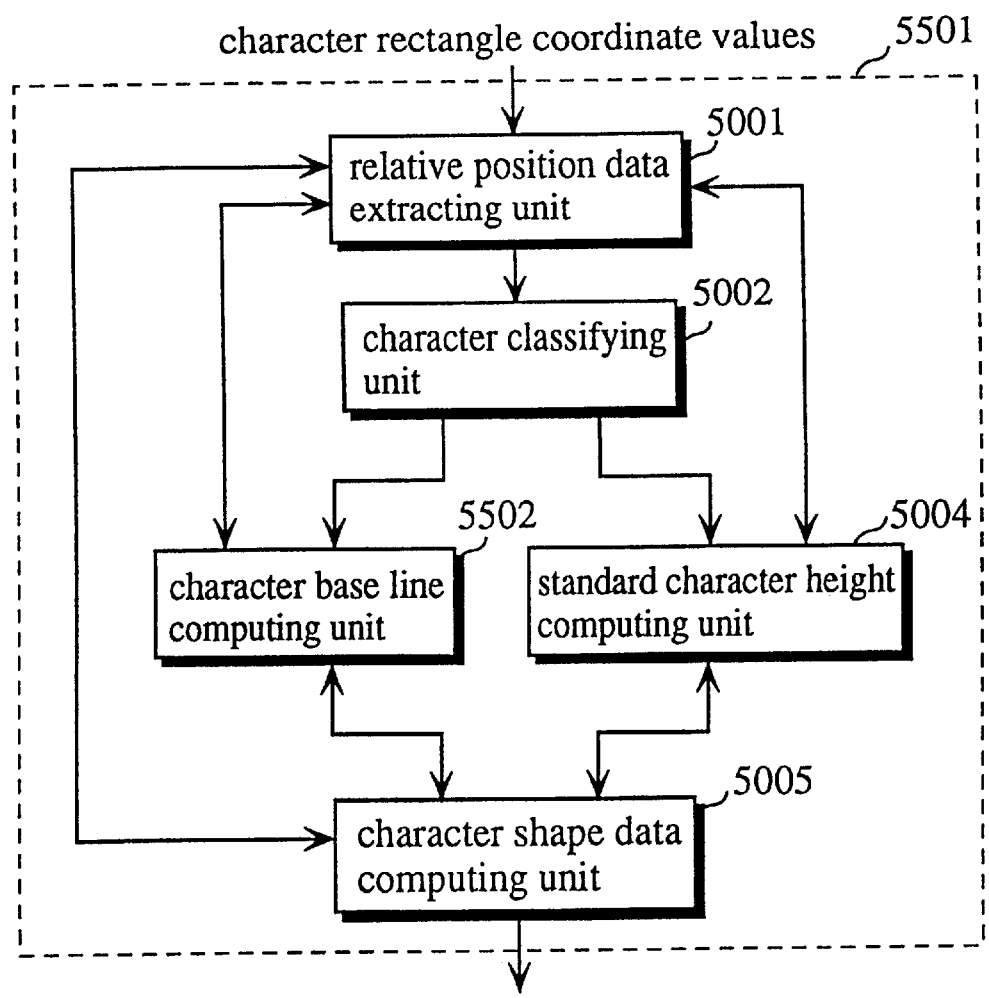
FIG. 55 shows a construction of a character shape extracting unit which is a component of Fifth Embodiment of the present invention, namely a character recognition apparatus.

FIG. 55 shows a construction of a character shape extracting unit which is a component of Fifth Embodiment of the present invention, namely a character recognition apparatus. Since the character recognition apparatus of Fifth Embodiment constructs almost the same as that of Fourth Embodiment, only different parts are described. The same components have the same numbers as Fourth Embodiment.

Character recognition apparatus of Fifth Embodiment differs from that of Fourth Embodiment in that it comprises character shape extracting unit 5501 instead of 4506. Character shape extracting unit 5501 comprises relative position data extracting unit 5001, character classifying unit 5002, base line position computing unit 5502, standard character height extracting unit 5004, and character shape data computing unit 5005.

Figures 56, 57:
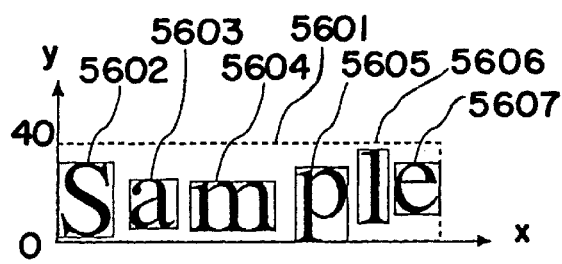
FIG. 56 shows a word rectangle and character rectangles in Fifth Embodiment.
FIG. 57 shows data values used to explain a standard lowest position computing unit in Fifth Embodiment.

FIG. 56 shows word rectangle 5601 extracted by word rectangle extracting unit 4503. Character rectangles 5602, 5603, . . . 5607 of word rectangle 5601 are skewed, that is, the righthand side is raised because the text has been scanned aslant by the scanner of character row image inputting unit 4501.

FIG. 57 shows character shape data for character rectangles 5602, . . . , 5607 extracted by character shape extracting unit 5501 and character classifying unit 5002. The lowest y-coordinate values $Y_L$ of character rectangles 5602 to 5607 increases to the right except character rectangle 5605, which is of a lower extension character. Therefore, correct normalized character shape data is not obtained if the base line position $Y_0$ is calculated the same as base line position computing unit 5003 of Fourth Embodiment.

Base line position computing unit 5502, on being activated by character classifying unit 5002, obtains a threshold value for computing a corrected lowest position $Y_0'$. The threshold value is, for example, 10% of the height of word rectangle 5601. The height of word rectangle 5601 is a difference between the maximum value of uppermost y-coordinate value $Y_U$ and the minimum value of lowest y-coordinate value $Y_L$ of character rectangles 5602 to 5607. For example, in case of character shape data shown in FIG. 57, the height of word rectangle 5601 is 40−0=40, and the threshold value is "4".

The corrected lowest position $Y_0'$ is obtained for each of character rectangles 5602 to 5607, and the initial value $Y_L'$ is defined as the lowest y-coordinate value $Y_L$ of character rectangle 5603 which is the first upper character starting from 5602. Therefore, the initial value $Y_L'$ of the corrected lowest position $Y_0'$ is "9".

Base line position computing unit 5502 extracts the lowest y-coordinate value $Y_L$ of character rectangle 5602 of word rectangle 5601, obtains the difference between it and the initial value $Y_L'$ of the corrected lowest position $Y_0'$, and judges whether the difference value is less than a threshold value. If less, the lowest y-coordinate value $Y_L$ of character rectangle 5602 is replaced by the corrected lowest position $Y_0'$. In this example, since the initial value $Y_L'$ of the corrected lowest position $Y_0'$ is "9", and the lowest y-coordinate value $Y_L$ is "7", the difference between them is "2" which is less than threshold value "4". Therefore, the corrected lowest position $Y_0'$ is "7".

If the difference value is not less than the threshold value, the corrected lowest position $Y_0'$ of the preceding character rectangle is used as the corrected lowest position $Y_0'$ of the present character rectangle. As shown in FIG. 57, the corrected lowest position $Y_0'$, "9", of character rectangle 5605 is such a case. The corrected lowest position $Y_0'$ of the first character rectangle such as 5602 is taken from the value of the second character rectangle.

Base line position computing unit 5502, then, obtains the difference between the lowest y-coordinate value $Y_L$ of character rectangle 5603 and the corrected lowest position $Y_0'$ of the preceding character rectangle, and judges whether the difference value is less than the threshold value. If less, the lowest y-coordinate value $Y_L$ of character rectangle 5603 is replaced by the corrected lowest position $Y_0'$. The process is repeated until the corrected lowest position $Y_0'$ of character rectangle 5607 is obtained. Then, character shape data computing unit 5005 is activated.

Character shape data computing unit 5005 performs the same as that in Fourth Embodiment except that it extracts corrected lowest position $Y_0'$ for each of character rectangles 5602 to 5607. Therefore, in calculating uppermost Y-coordinate value U and lowest Y-coordinate value L, $Y_0'$ instead of $Y_0$ is used. FIG. 58 shows the obtained normalized character shape data. Since the other components and the operation are the same as Fourth Embodiment, they are omitted in the present description.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A character recognition dictionary production apparatus, comprising:

an image inputting means for receiving a plurality of source character images for each character code;

a feature value extracting unit for extracting a set of feature values from each source character image received by the image inputting means;

a clustering means for classifying the sets of feature values received by the image inputting means into clusters for each character code;

a classifying dictionary registering means for obtaining a set of average cluster feature values for each cluster from the feature values extracted by the feature value extracting unit, and registering the sets of average cluster feature values as classifying data related to character codes in the classifying dictionary registering means itself;

a distance computing means for computing distances between two sets of average cluster feature values registered in the classifying dictionary registering means; and an identifying dictionary registering means for extracting a set of clusters, belonging to different character codes, with the distance in between computed by the distance computing means smaller than a predetermined value, selecting one or more elements with highest identification level from the average cluster feature values for each set of clusters, and registering the elements and related identifiers of the clusters as identifying data in the identifying dictionary registering means itself.

2. The character recognition dictionary production apparatus of claim 1, wherein the clustering means comprises:

a distance computing unit for computing a distance between two sets of feature values for each combination in each character code;

a criterion determining unit for determining a cluster size criterion based on a minimum value among maximum values for the distance computed by the distance computing unit; and a linking unit for linking clusters whose sizes are smaller than the cluster size criterion determined by the criterion determining unit.

3. The character recognition dictionary production apparatus of claim 2, wherein the identifying dictionary registering means comprises:

a value determining unit for using the cluster size criterion determined by the criterion determining unit as the predetermined value.

4. The character recognition dictionary production apparatus of claim 3, wherein the feature value extracting unit comprises:

a circumscribed rectangle obtaining unit for obtaining circumscribed rectangles of the character images;

a direction density computing unit for assigning a direction value to each boundary first pixel of a character image based on a direction to an adjacent boundary first pixel, dividing a circumscribed rectangle of the character image into blocks by dividing it into L pieces in row direction and M pieces in column direction, counting a number of first pixels for each direction value for each block, and obtaining an outline direction density of each block by dividing the counted number of first pixels by a total number of pixels in the block for each block;

a background density computing unit for obtaining a background value for each pixel by scanning the circumscribed rectangle from a side to an opposite side incrementing "1" for each encounter with a first pixel making up the character image, dividing a circumscribed rectangle of the character image into blocks by dividing it into P pieces in row direction and Q pieces in column direction, counting a number of pixels for each background value for each block, and obtaining a background density of each block by dividing the counted number of pixels by a total number of pixels in the block for each block; and a width-height ratio computing unit for obtaining a width-height ratio of the circumscribed rectangle.

5. The character recognition dictionary production apparatus of claim 4, wherein one piece of the identifying data registered in the identifying dictionary registering means is the width-height ratio obtained by the width-height ratio computing unit.

6. The character recognition dictionary production apparatus of claim 2, wherein the feature value extracting unit comprises:

a circumscribed rectangle obtaining unit for obtaining circumscribed rectangles of the character images;

a direction density computing unit for assigning a direction value to each boundary first pixel of a character image based on a direction to an adjacent boundary first pixel, dividing a circumscribed rectangle of the character image into blocks by dividing it into L pieces in row direction and M pieces in column direction, counting a number of first pixels for each direction value for each block, and obtaining an outline direction density of each block by dividing the counted number of first pixels by a total number of pixels in the block for each block;

a background density computing unit for obtaining a background value for each pixel by scanning the circumscribed rectangle from a side to an opposite side incrementing "1" for each encounter with a first pixel making up the character image, dividing a circumscribed rectangle of the character image into blocks by dividing it into P pieces in row direction and Q pieces in column direction, counting a number of pixels for each background value for each block, and obtaining a background density of each block by dividing the counted number of pixels by a total number of pixels in the block for each block; and a width-height ratio computing unit for obtaining a width-height ratio of the circumscribed rectangle omitted.

7. The character recognition dictionary production apparatus of claim 1, wherein the feature value extracting unit comprises:

a circumscribed rectangle obtaining unit for obtaining circumscribed rectangles of the character images;

a direction density computing unit for assigning a direction value to each boundary first pixel of a character image based on a direction to an adjacent boundary first pixel, dividing a circumscribed rectangle of the character image into blocks by dividing it into L pieces in row direction and M pieces in column direction, counting a number of first pixels for each direction value for each block, and obtaining an outline direction density of each block by dividing the counted number of first pixels by a total number of pixels in the block for each block;

a background density computing unit for obtaining a background value for each pixel by scanning the circumscribed rectangle from a side to an opposite side incrementing "1" for each encounter with a first pixel making up the character image, dividing a circumscribed rectangle of the character image into blocks by dividing it into P pieces in row direction and Q pieces in column direction, counting a number of pixels for each background value for each block, and obtaining a background density of each block by dividing the counted number of pixels by a total number of pixels in the block for each block; and a width-height ratio computing unit for obtaining a width-height ratio of the circumscribed rectangle omitted.

8. A character recognition apparatus, comprising:

an image inputting means for receiving text images;

a character row coordinate value detecting means for detecting coordinate values of character rows in a text image received by the image inputting means;

a character coordinate value detecting means for detecting coordinate values of character images in the character row images:

a feature value extracting means for extracting a set of feature values from each of the character images;

a classifying dictionary for prestoring standard characters with their character codes, each of the standard characters having clusters of a certain size, and each of the clusters having sets of average cluster feature values;

a classifying means for computing a first distance between the set of feature values extracted by the feature value extracting means and the set of average cluster feature values for each cluster, computing similarities from the computed first distances, and selecting a plurality of clusters with high similarities as candidate clusters;

an identifying dictionary for prestoring identifiers of near clusters whose distance is smaller than a certain distance value, and prestoring one or more elements of average cluster feature values which have high identification level, the near clusters being related to the elements;

an identifying means for, if a pair of the identifiers stored in the identifying dictionary are included in identifiers of the candidate clusters selected by the classifying means, computing a second distance between the set of feature values extracted by the feature value extracting means and the set of average cluster feature values for each of the near clusters only for the elements, and raising a similarity of a candidate cluster whose second distance is shorter than the other; and an outputting means for outputting character codes of the candidate clusters selected by the classifying means reflecting the similarity raised by the identifying means.

9. The character recognition apparatus of claim 8, wherein the certain cluster size used for the classifying dictionary and the certain distance value used for the identifying dictionary are both determined based on a minimum value among maximum distance values, each of the maximum distance values being a maximum value of distances between the feature values for each character code.

10. The character recognition apparatus of claim 9 further comprises:

a rejecting dictionary for prestoring minimum values and maximum values of certain elements in the feature values, the minimum values and the maximum values being related to the identifiers of the clusters;

an identification judging means for judging a character identification valid if a cluster selected by the classifying means has a highest similarity exceeding a certain value, and if a range of the minimum values and the maximum values of certain elements stored in the rejecting dictionary includes feature values of the certain elements in the set of feature values extracted by the feature value extracting means;

a rejected cluster linking means for linking continuous rejected clusters, the rejected clusters being candidate clusters judged invalid by the identification judging means;

a number-of-characters assuming means for obtaining a number of characters which is supposed to be included in a range of one of an invalid candidate cluster which does not have any neighboring invalid clusters and a set of linked rejected clusters, the range being specified by coordinate values;

a linked-characters dividing means for dividing the range by the number of characters obtained by the number-of-characters assuming means and obtaining coordinate values of new character images;

a second feature value extracting means for extracting a set of feature values from each of the new character images;

a second classifying means for computing distances between the sets of feature values extracted by the second feature value extracting means and the sets of average cluster feature values, computing similarities from the computed distances, and selecting a plurality of clusters with high similarities as candidate clusters;

a second identifying means for, if a pair of the identifiers stored in the identifying dictionary are included in identifiers of the candidate clusters selected by the second classifying means, computing the second distance between the set of feature values extracted by the second feature value extracting means and the sets of average cluster feature values of the near clusters only by the element, and raising a similarity of a candidate cluster whose second distance is shorter than the other;

a second identification judging means for judging a character identification valid if a cluster selected by the second classifying means has a highest similarity exceeding a certain value, and if a range of the minimum values and the maximum values of certain elements stored in the rejecting dictionary includes feature values of the certain elements in the set of feature values extracted by the second feature value extracting means;

an identification selecting means for rejecting a candidate cluster selected by the classifying means reflecting the similarity raised by the identifying means, and selecting the character identification judged valid by the second identification judging means; and an identified character outputting means for outputting character codes of candidate clusters reflecting the character identification selected by the identification selecting means.

11. The character recognition apparatus of claim 10, wherein the rejected cluster linking means comprises:

a parenthesis linking unit for linking continuous parentheses, the parentheses being candidate clusters with highest similarities after the identifying means has processed; and a rejected cluster and parenthesis linking unit for linking a continuous set of rejected clusters judged invalid by the identification judging means and parentheses being candidate clusters with highest similarities.

12. The character recognition apparatus of claim 11, wherein the feature value extracting unit comprises:

a circumscribed rectangle obtaining unit for obtaining circumscribed rectangles of the character images;

a direction density computing unit for assigning a direction value to each boundary first pixel of a character image based on a direction to an adjacent boundary first pixel, dividing a circumscribed rectangle of the character image into blocks by dividing it into L pieces in row direction and M pieces in column direction, counting a number of first pixels for each direction value for each block, and obtaining an outline direction density of each block by dividing the counted number of first pixels by a total number of pixels in the block for each block;

a background density computing unit for obtaining a background value for each pixel by scanning the circumscribed rectangle from a side to an opposite side incrementing "1" for each encounter with a first pixel making up the character image, dividing a circumscribed rectangle of the character image into blocks by dividing it into P pieces in row direction and Q pieces in column direction, counting a number of pixels for each background value for each block, and obtaining a background density of each block by dividing the counted number of pixels by a total number of pixels in the block for each block; and a width-height ratio computing unit for obtaining a width-height ratio of the circumscribed rectangle.

13. The character recognition apparatus of claim 12 further comprises:

a ratio computing means for computing a ratio of character codes of predetermined specific symbols for a character row based on one of the character identification judged by the identification judging means and the character identification selected by the identification selecting means; and a character row judging means for judging a character row invalid if the ratio of the character row computed by the ratio computing means exceeds a certain ratio value, and sending the judgement to the outputting means.

14. The character recognition apparatus of claim 11 further comprises:

a ratio computing means for computing a ratio of character codes of predetermined specific symbols for a character row based on one of the character identification judged by the identification judging means and the character identification selected by the identification selecting means; and a character row judging means for judging a character row invalid if the ratio of the character row computed by the ratio computing means exceeds a certain ratio value, and sending the judgement to the outputting means.

15. The character recognition apparatus of claim 10, wherein the feature value extracting unit comprises:

a circumscribed rectangle obtaining unit for obtaining circumscribed rectangles of the character images;

a direction density computing unit for assigning a direction value to each boundary first pixel of a character image based on a direction to an adjacent boundary first pixel, dividing a circumscribed rectangle of the character image into blocks by dividing it into L pieces in row direction and M pieces in column direction, counting a number of first pixels for each direction value for each block, and obtaining an outline direction density of each block by dividing the counted number of first pixels by a total number of pixels in the block for each block;

a background density computing unit for obtaining a background value for each pixel by scanning the circumscribed rectangle from a side to an opposite side incrementing "1" for each encounter with a first pixel making up the character image, dividing a circumscribed rectangle of the character image into blocks by dividing it into P pieces in row direction and Q pieces in column direction, counting a number of pixels for each background value for each block, and obtaining a background density of each block by dividing the counted number of pixels by a total number of pixels in the block for each block; and a width-height ratio computing unit for obtaining a width-height ratio of the circumscribed rectangle.

16. The character recognition apparatus of claim 15 further comprises:

a ratio computing means for computing a ratio of character codes of predetermined specific symbols for a character row based on one of the character identification judged by the identification judging means and the character identification selected by the identification selecting means; and a character row judging means for judging a character row invalid if the ratio of the character row computed by the ratio computing means exceeds a certain ratio value, and sending the judgement to the outputting means.

17. The character recognition apparatus of claim 10 further comprises:

a ratio computing means for computing a ratio of character codes of predetermined specific symbols for a character row based on one of the character identification judged by the identification judging means and the character identification selected by the identification selecting means; and a character row judging means for judging a character row invalid if the ratio of the character row computed by the ratio computing means exceeds a certain ratio value, and sending the judgement to the outputting means omitted.

18. The character recognition apparatus of claim 9, wherein the feature value extracting unit comprises:

a circumscribed rectangle obtaining unit for obtaining circumscribed rectangles of the character images;

a direction density computing unit for assigning a direction value to each boundary first pixel of a character image based on a direction to an adjacent boundary first pixel, dividing a circumscribed rectangle of the character image into blocks by dividing it into L pieces in row direction and M pieces in column direction, counting a number of first pixels for each direction value for each block, and obtaining an outline direction density of each block by dividing the counted number of first pixels by a total number of pixels in the block for each block;

a background density computing unit for obtaining a background value for each pixel by scanning the circumscribed rectangle from a side to an opposite side incrementing "1" for each encounter with a first pixel making up the character image, dividing a circumscribed rectangle of the character image into blocks by dividing it into P pieces in row direction and Q pieces in column direction, counting a number of pixels for each background value for each block, and obtaining a background density of each block by dividing the counted number of pixels by a total number of pixels in the block for each block; and a width-height ratio computing unit for obtaining a width-height ratio of the circumscribed rectangle omitted.

19. The character recognition apparatus of claim 8 further comprises:

a rejecting dictionary for prestoring minimum values and maximum values of certain elements in the feature values, the minimum values and the maximum values being related to the identifiers of the clusters;

an identification judging means for judging a character identification valid if a cluster selected by the classifying means has a highest similarity exceeding a certain value, and if a range of the minimum values and the maximum values of certain elements stored in the rejecting dictionary includes feature values of the certain elements in the set of feature values extracted by the feature value extracting means;

a rejected cluster linking means for linking continuous rejected clusters, the rejected clusters being candidate clusters judged invalid by the identification judging means;

a number-of-characters assuming means for obtaining a number of characters which is supposed to be included in a range of one of an invalid candidate cluster which does not have any neighboring invalid clusters and a set of linked rejected clusters, the range being specified by coordinate values;

a linked-characters dividing means for dividing the range by the number of characters obtained by the number-of-characters assuming means and obtaining coordinate values of new character images;

a second feature value extracting means for extracting a set of feature values from each of the new character images;

a second classifying means for computing distances between the sets of feature values extracted by the second feature value extracting means and the sets of average cluster feature values, computing similarities from the computed distances, and selecting a plurality of clusters with high similarities as candidate clusters;

a second identifying means for, if a pair of the identifiers stored in the identifying dictionary are included in identifiers of the candidate clusters selected by the second classifying means, computing the second distance between the set of feature values extracted by the second feature value extracting means and the sets of average cluster feature values of the near clusters only by the element, and raising a similarity of a candidate cluster whose second distance is shorter than the other;

a second identification judging means for judging a character identification valid if a cluster selected by the second classifying means has a highest similarity exceeding a certain value, and if a range of the minimum values and the maximum values of certain elements stored in the rejecting dictionary includes feature values of the certain elements in the set of feature values extracted by the second feature value extracting means;

an identification selecting means for rejecting a candidate cluster selected by the classifying means reflecting the similarity raised by the identifying means, and selecting the character identification judged valid by the second identification judging means; and an identified character outputting means for outputting character codes of candidate clusters reflecting the character identification selected by the identification selecting means.

20. The character recognition apparatus of claim 19, wherein the rejected cluster linking means comprises:

a parenthesis linking unit for linking continuous parentheses, the parentheses being candidate clusters with highest similarities after the identifying means has processed; and a rejected cluster and parenthesis linking unit for linking a continuous set of rejected clusters judged invalid by the identification judging means and parentheses being candidate clusters with highest similarities omitted.

21. The character recognition apparatus of claim 20, wherein the feature value extracting unit comprises:

a circumscribed rectangle obtaining unit for obtaining circumscribed rectangles of the character images;

a direction density computing unit for assigning a direction value to each boundary first pixel of a character image based on a direction to an adjacent boundary first pixel, dividing a circumscribed rectangle of the character image into blocks by dividing it into L pieces in row direction and M pieces in column direction, counting a number of first pixels for each direction value for each block, and obtaining an outline direction density of each block by dividing the counted number of first pixels by a total number of pixels in the block for each block;

a background density computing unit for obtaining a background value for each pixel by scanning the circumscribed rectangle from a side to an opposite side incrementing "1" for each encounter with a first pixel making up the character image, dividing a circumscribed rectangle of the character image into blocks by dividing it into P pieces in row direction and Q pieces in column direction, counting a number of pixels for each background value for each block, and obtaining a background density of each block by dividing the counted number of pixels by a total number of pixels in the block for each block; and a width-height ratio computing unit for obtaining a width-height ratio of the circumscribed rectangle.

22. The character recognition apparatus of claim 21 further comprises:

a ratio computing means for computing a ratio of character codes of predetermined specific symbols for a character row based on one of the character identification judged by the identification judging means and the character identification selected by the identification selecting means; and a character row judging means for judging a character row invalid if the ratio of the character row computed by the ratio computing means exceeds a certain ratio value, and sending the judgement to the outputting means omitted.

23. The character recognition apparatus of claim 8, wherein the feature value extracting unit comprises:

a circumscribed rectangle obtaining unit for obtaining circumscribed rectangles of the character images;

a direction density computing unit for assigning a direction value to each boundary first pixel of a character image based on a direction to an adjacent boundary first pixel, dividing a circumscribed rectangle of the character image into blocks by dividing it into L pieces in row direction and M pieces in column direction, counting a number of first pixels for each direction value for each block, and obtaining an outline direction density of each block by dividing the counted number of first pixels by a total number of pixels in the block for each block;

a background density computing unit for obtaining a background value for each pixel by scanning the circumscribed rectangle from a side to an opposite side incrementing "1" for each encounter with a first pixel making up the character image, dividing a circumscribed rectangle of the character image into blocks by dividing it into P pieces in row direction and Q pieces in column direction, counting a number of pixels for each background value for each block, and obtaining a background density of each block by dividing the counted number of pixels by a total number of pixels in the block for each block; and a width-height ratio computing unit for obtaining a width-height ratio of the circumscribed rectangle omitted.

24. A computer-readable recording medium storing a program which allows a computer to function as a character recognition dictionary production apparatus, the character recognition dictionary production apparatus comprising:

an image inputting means for receiving a plurality of source character images for each character code;

a feature value extracting unit for extracting a set of feature values from each source character image received by the image inputting means;

a clustering means for classifying the sets of feature values received by the image inputting means into clusters for each character code;

a classifying dictionary registering means for obtaining a set of average cluster feature values for each cluster from the feature values extracted by the feature value extracting unit, and registering the sets of average cluster feature values as classifying data related to character codes in the classifying dictionary registering means itself;

a distance computing means for computing distances between two sets of average cluster feature values registered in the classifying dictionary registering means; and an identifying dictionary registering means for extracting a set of clusters, belonging to different character codes, with the distance in between computed by the distance computing means smaller than a predetermined value, selecting one or more elements with highest identification level from the average cluster feature values for each set of clusters, and registering the elements and related identifiers of the clusters as identifying data in the identifying dictionary registering means itself.

25. A computer-readable recording medium storing a program which allows a computer to function as a character recognition apparatus, the computer-readable recording medium storing:

a classifying dictionary for prestoring standard characters with their character codes, each of the standard characters having clusters of a certain size, and each of the clusters having sets of average cluster feature values; and an identifying dictionary for prestoring identifiers of near clusters whose distance is smaller than a certain distance value, and prescoring one or more elements of average cluster feature values which have high identification level, the near clusters being related to the elements, wherein the character recognition apparatus comprises:

an image inputting means for receiving text images;

a character row coordinate value detecting means for detecting coordinate values of character rows in a text image received by the image inputting means;

a character coordinate value detecting means for detecting coordinate values of character images in the character row images;

a feature value extracting means for extracting a set of feature values from each of the character images;

a classifying means for computing a first distance between the set of feature values extracted by the feature value extracting means and the set of average cluster feature values for each cluster, computing similarities from the computed first distances, and selecting a plurality of clusters with high similarities as candidate clusters;

an identifying means for, if a pair of the identifiers stored in the identifying dictionary are included in identifiers of the candidate clusters selected by the classifying means, computing a second distance between the set of feature values extracted by the feature value extracting means and the set of average cluster feature values for each of the near clusters only for the elements, and raising a similarity of a candidate cluster whose second distance is shorter than the other; and an outputting means for outputting character codes of the candidate clusters selected by the classifying means reflecting the similarity raised by the identifying means.

* * * * *